(12) United States Patent
Magagna et al.

(10) Patent No.: US 12,025,253 B2
(45) Date of Patent: Jul. 2, 2024

(54) CLAMPING DEVICES, SYSTEMS AND METHODS

(71) Applicants: Timothy L. Magagna, Pocatello, ID (US); Stanford L. Caldwell, Pocatello, ID (US); Shea S. Caldwell, Pocatello, ID (US); Kary R. Christopherson, Ridgefield, WA (US); Craig L. Sandstrom, Pocatello, ID (US)

(72) Inventors: Timothy L. Magagna, Pocatello, ID (US); Stanford L. Caldwell, Pocatello, ID (US); Shea S. Caldwell, Pocatello, ID (US); Kary R. Christopherson, Ridgefield, WA (US); Craig L. Sandstrom, Pocatello, ID (US)

(73) Assignee: TKO CLAMPING SYSTEMS, LLC, Pocatello, ID (US)

( * ) Notice: Subject to any disclaimer, the term of this patent is extended or adjusted under 35 U.S.C. 154(b) by 181 days.

(21) Appl. No.: 17/346,246

(22) Filed: Jun. 13, 2021

(65) Prior Publication Data
US 2021/0301958 A1 Sep. 30, 2021

Related U.S. Application Data

(60) Division of application No. 16/439,708, filed on Jun. 13, 2019, now Pat. No. 11,079,048, which is a
(Continued)

(51) Int. Cl.
*F16L 33/06* (2006.01)
*F16B 2/06* (2006.01)
(Continued)

(52) U.S. Cl.
CPC .............. *F16L 33/06* (2013.01); *F16B 2/065* (2013.01); *F16B 2/10* (2013.01); *F16L 33/035* (2013.01); *F16L 33/12* (2013.01)

(58) Field of Classification Search
CPC .......... F16L 33/06; F16L 33/035; F16L 33/12; F16L 3/1075; F16L 23/06; F16L 23/08;
(Continued)

(56) References Cited

U.S. PATENT DOCUMENTS

| 1,148,472 A | 7/1915 | Adams |
| 2,459,251 A * | 1/1949 | Stillwagon ............... F16L 17/04 285/104 |

(Continued)

FOREIGN PATENT DOCUMENTS

| CN | 103097793 A | 5/2013 |
| DE | 19835320 B4 | 2/2000 |

(Continued)

OTHER PUBLICATIONS

Alibaba.com, Clamps, at least of Mar. 31, 2018, https://www.alibaba.com/product-detail/china-supplier-plastic-adjustable-pipe-clamps _ . . . see attachment.
(Continued)

*Primary Examiner* — Robert Sandy
*Assistant Examiner* — Rowland Do
(74) *Attorney, Agent, or Firm* — Flaig Law Office, PLLC; Jason E. Flaig

(57) ABSTRACT

At least one adjustable clamp device is disclosed that includes a catch member, a base member, a latch member, and a fine adjustment mechanism and is designed to clamp to a targeted object in a secure fashion. At least one quick release clamp device is disclosed that includes a catch member, a base member, a latch member, and a quick release mechanism and is designed to clamp to a targeted object in a secure fashion and to be quickly removable from the targeted object. At least one method for using the adjustable clamp device is disclosed that includes: wrapping an adjustable clamp device around a targeted object; placing a tool
(Continued)

around the adjustable clamp device; squeezing the tool and thereby squeezing the adjustable clamp device around the targeted object; and causing the latch member to operably connect to the catch member in a locked position.

20 Claims, 34 Drawing Sheets

Related U.S. Application Data continuation-in-part of application No. 29/660,820, filed on Aug. 22, 2018, now Pat. No. Des. 885,174, and a continuation-in-part of application No. 29/660,824, filed on Aug. 22, 2018, now Pat. No. Des. 885,877, and a continuation-in-part of application No. 29/653,158, filed on Jun. 13, 2018, now Pat. No. Des. 885,173.

(60) Provisional application No. 62/734,286, filed on Sep. 21, 2018.

(51) Int. Cl.
   *F16B 2/10* (2006.01)
   *F16L 33/035* (2006.01)
   *F16L 33/12* (2006.01)

(58) Field of Classification Search
   CPC .. F16B 2/10; F16B 2/065; F16B 2/185; F16B 7/1418; Y10T 24/1418; Y10T 24/1424
   See application file for complete search history.

(56) References Cited

U.S. PATENT DOCUMENTS

| | | | | |
|---|---|---|---|---|
| 2,689,141 | A * | 9/1954 | Kiekhaefer | F16L 23/06 |
| | | | | 285/410 |
| 2,752,174 | A * | 6/1956 | Frost | F16L 23/06 |
| | | | | 24/270 |
| 2,775,806 | A | 1/1957 | Love | |
| 3,429,985 | A | 2/1969 | Czigler | |
| 3,705,737 | A | 12/1972 | Westerlund et al. | |
| 3,883,128 | A | 5/1975 | Breese | |
| 3,967,837 | A | 7/1976 | Westerlund et al. | |
| 4,408,788 | A * | 10/1983 | Beukema | F16L 23/08 |
| | | | | 285/112 |
| 4,453,289 | A | 6/1984 | Kleykamp et al. | |
| 4,492,005 | A | 1/1985 | Begley et al. | |
| 4,573,717 | A | 3/1986 | Peacock | |
| 4,639,979 | A | 2/1987 | Polson | |
| 4,643,460 | A | 2/1987 | Lieberg | |
| 4,702,499 | A * | 10/1987 | deRaymond | F16L 17/04 |
| | | | | 285/912 |
| 4,852,840 | A | 8/1989 | Marks | |
| 5,037,141 | A * | 8/1991 | Jardine | F16L 23/04 |
| | | | | 285/369 |
| 5,380,052 | A | 1/1995 | Hendrickson | |
| 6,953,314 | B2 | 10/2005 | Magagna | |
| D584,604 | S | 1/2009 | Baldwin | |
| 7,828,340 | B2 | 11/2010 | Heelan, Jr. et al. | |
| 8,006,711 | B2 * | 8/2011 | Pietrzak | A45B 9/00 |
| | | | | 135/65 |
| 8,398,351 | B2 * | 3/2013 | Hohmann | F16B 37/0821 |
| | | | | 411/432 |
| D703,033 | S | 4/2014 | Karlsson | |
| D708,053 | S * | 7/2014 | Marini | D8/394 |
| D735,025 | S | 7/2015 | Mathien | |
| 9,169,952 | B2 * | 10/2015 | Horgan | F16B 5/0275 |
| 9,194,516 | B2 * | 11/2015 | Beagen, Jr. | F16L 21/065 |
| 9,482,368 | B1 | 11/2016 | Hung | |
| D780,860 | S | 3/2017 | Jones | |
| D780,861 | S | 3/2017 | Jones | |
| D798,699 | S | 10/2017 | Roiser | |
| 9,863,573 | B2 | 1/2018 | May | |
| 10,288,195 | B2 | 5/2019 | Crouzy | |
| D855,920 | S | 8/2019 | Schenone et al. | |
| 10,571,054 | B2 * | 2/2020 | Cheng-Sheng | F16L 17/04 |
| D885,173 | S | 5/2020 | Magagna et al. | |
| D885,174 | S | 5/2020 | Magagna et al. | |
| D885,877 | S | 6/2020 | Magagna et al. | |
| 2004/0061335 | A1 | 4/2004 | Mills | |
| 2004/0208727 | A1 | 10/2004 | Magagna | |
| 2006/0081744 | A1 | 4/2006 | Konold | |
| 2008/0019794 | A1 | 1/2008 | van Walraven | |
| 2008/0287271 | A1 | 11/2008 | Jones | |
| 2010/0038903 | A1 | 2/2010 | Linhorst et al. | |
| 2011/0272888 | A1 | 11/2011 | Irizzary et al. | |
| 2014/0130306 | A1 | 5/2014 | Andel | |
| 2014/0294496 | A1 | 10/2014 | Gardiner | |
| 2016/0186902 | A1 * | 6/2016 | Lee | F16L 21/06 |
| | | | | 285/420 |
| 2018/0056458 | A1 | 3/2018 | McClure | |
| 2019/0032825 | A1 * | 1/2019 | McNamara | F16L 43/00 |
| 2020/0332934 | A1 * | 10/2020 | Duncan | F16L 23/08 |

FOREIGN PATENT DOCUMENTS

| | | |
|---|---|---|
| DE | 10022338 B4 | 11/2001 |
| DE | 102004051234 A1 | 5/2006 |
| DE | 202009015554 U1 | 4/2010 |
| EP | 0292408 A1 | 11/1988 |
| EP | 0872677 A2 | 10/1998 |
| EP | 1431641 A2 | 6/2004 |
| EP | 2985500 B1 | 2/2016 |
| GB | 2352475 A | 1/2001 |
| KR | 20090006003 U | 6/2009 |
| KR | 101014385 B1 | 2/2011 |
| KR | 20110100071 A | 9/2011 |
| KR | 101190245 B1 | 10/2012 |
| KR | 20130028606 A | 3/2013 |
| KR | 20150101227 A | 9/2015 |
| KR | 101578329 B1 | 12/2015 |
| KR | 101595111 B1 | 2/2016 |
| KR | 101670646 B1 | 12/2016 |
| KR | 20170139773 A | 12/2017 |
| WO | WO2010085905 A1 | 8/2010 |

OTHER PUBLICATIONS

Alibaba.com, Clamps, at least of Mar. 31, 2018, https://www.alibaba.com/product-detail/kkmark-wholesale-adjustable-pipe-clamps-tuv_60751931288.html ?. . . see attachment.

Alibaba.com, Clamps, at least of Mar. 31, 2018, https://www.alibaba.com/product-detail/Right-Angle-Adjustable-Tube-Clamps-for_ . . . see attachment.

Qaworldwide, Cable Tie Replacement! The Patented Cable Clamp Pro®, at least of Mar. 31, 2018, http://www.cableclamp.com/, . . . see attachment.

Denniskirk, Memphis Shades Adjustable Fork Clamps for 48-55mm Forks—MEM9954, at least of Mar. 31, 2018, https://www.denniskirk.com/memphis-shades/ . . . see attachment.

Notice of References provided in Notice of Allowance in U.S. Appl. No. 29/653,158, Oct. 10, 2019, see attachment for details.

Issue Classification provided in Notice of Allowance in U.S. Appl. No. 29/653,158, Oct. 10, 2019, see attachment for details.

Search Notes provided in Notice of Allowance in U.S. Appl. No. 29/653,158, Oct. 10, 2019, see attachment for details.

Bibliography Data provided in Notice of Allowance in U.S. Appl. No. 29/653,158, Oct. 10, 2019, see attachment for details.

Non-Final Office Action, Sep. 18, 2020, in U.S. Appl. No. 16/439,708.

Amazon.com, Omix-Ada 17115.01 Radiator Hose Clamp, at least of Feb. 19, 2018, https://www.amazon.com/Omix-Ada-17115-01-Radiator-Hose-Clamp/dp/B000FQ973A, see attachment.

Viper Parts of America, . . . , at least of Feb. 19, 2018, https://www.viperpartsrackamerica.com/index.php/products/1992-2010-dodge-viper-radiator-hose-clamp-52006750, see attachment.

Vwtuningmag, Prolock Hose Clamps—Get a Grip!, at least of Mar. 30, 2018, http://www.vwtuningmag.com/prolock-hose-clamps-get-a-grip/, see attachment.

(56) References Cited

OTHER PUBLICATIONS

Clampco: Worldwide Clamping Specialist, Barrel Hardware Clamps, at least of Mar. 30, 2018, http://www.clampco.com/products/barrel.asp, see attachment.
Clampco: Worldwide Clamping Specialist, Latches, Fasteners & Handles, at least of Mar. 30, 2018, http://www.clampco.com/products/latches.asp, see attachment.
Clampco: Worldwide Clamping Specialist, Flanges, at least of Mar. 30, 2018, http://www.clampco.com/products/flanges-no-gasket.asp, see attachment.
Clampco: Worldwide Clamping Specialist, V-Band Clamps/Couplings, at least of Mar. 30, 2018, http://www.clampco.com/products/v-band.asp, see attachment.
Theonania.Club, Radiator Hose Clamps Radiaor Loose, at least of Mar. 30, 2018, http://theonania.club/radiator-hose-clamps/radiator-hose-clamps-radiaor-loose/, see attachment.
Theonania.Club, Radiator Hose Clamps Types, at least of Mar. 30, 2018, http://theonania.club/radiator-hose-clamps/radiator-hose-clamps-types/, see attachment.
Zoro.com, Heavy Duty Clamp, T304 Stainless Steel, at least of Mar. 30, 2018, https://www.zoro.com/zoro-select-heavy-duty-clamp-t304-stainless-steel-13mhhm75/ . . . see attachment.
Frs.Sports, P2M Pipe Aluminum Hose Clamp—Black 2.00, at least of Mar. 30, 2018, https://frsport.com/p2m-p2-ahc200blk-kmi-pipe-aluminum-hose . . . see attachment.
Bavarian Autosport, Plastic Hose Support—Genuine BMW, at least of Mar. 30, 2018, https://www.bavauto.com/catalog/product/view/id/163994/?utm_source =. . . see attachment.
Autohausaz.com, Genuine Mini Hose Clamp SKU: 1505234-MI-17127639895, at least of Mar. 30, 2018, https://www.autohausaz.com/pn/14325056-MI-17127639895?. . . see attachment.
Sweetwater, Gibraltar SC-GCARA Road Series Chrome Adjustable Right-angle Clamp, at least of Mar. 30, 2018, https://www.sweetwater.com/store/detail/SCGCARA-- . . . see attachment.
Denniskirk, Memphis Shades Adjustable Fork Clamps for 48-55mm Forks—MEM9954, at least of Mar. 30, 2018, https://www.denniskirk.com/memphis-shades/adjustable - . . . see attachment.
Thomann, Global Truss 10403 Beam Clamp 2,0t, at least of Mar. 30, 2018, https://www.thomann.de/lu/global_truss_10403_beam_clamp_20t.htm, other details . . . see attachment.
PSSL Prosound and Stage Lighting, Solena Professional Adjustable Lighting O-Clamp, at least of Mar. 31, 2018, http://www.pssl.com/Solena - . . . see attachment.
AGL Manufacturing Ltd., CF Style Adjustable Clamp, at least of Mar. 31, 2018, http://www.aglmfg.com/Products/Concrete-Pump-Parts/ACME_Style_Adjustable_Clamp . . . see attachment.
Direct Industry, plastic cable clamp / adjustable, at least of Mar. 31, 2018, http://www.directindustry.com/prod/reiku-drossbach/product-103293 - . . . see attachment.
Emarine Systems, .75"-1.25" Adjustable Rail Clamps (Pair), at least of Mar. 31, 2018, https://www.emarineinc.com/75-inch-1-25-inch-Adjustable - . . . see attachment.
Applicant-Initiated Interview Summary, Jan. 21, 2021, in U.S. Appl. No. 16/439,708.
Notice of Allowance, Mar. 24, 2021, in U.S. Appl. No. 16/439,708.
Applicant-Initiated Interview Summary, Jun. 14, 2021, in U.S. Appl. No. 16/439,708.
Response to Rule 312 Communication, Jul. 6, 2021, in U.S. Appl. No. 16/439,708.

\* cited by examiner

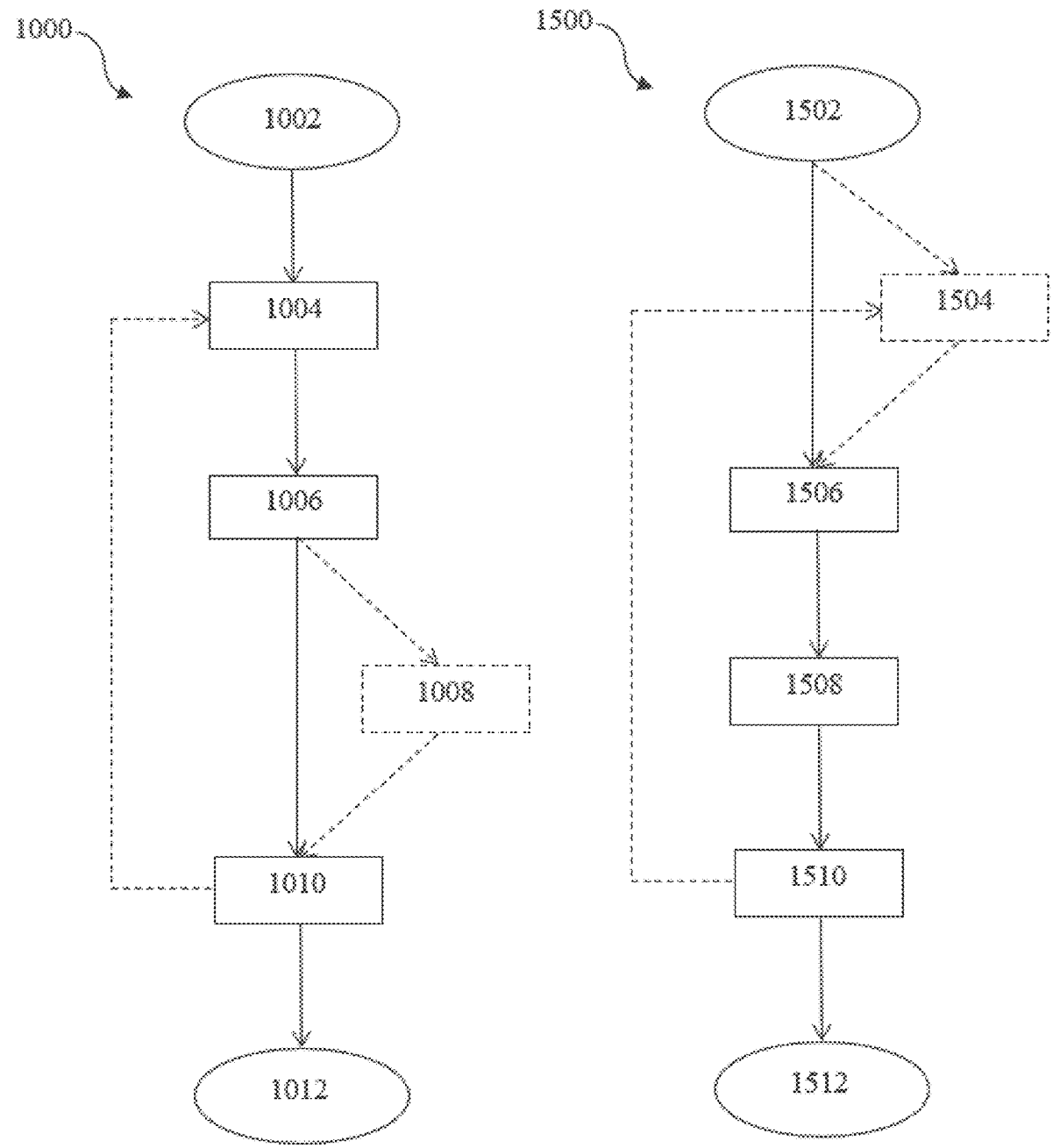

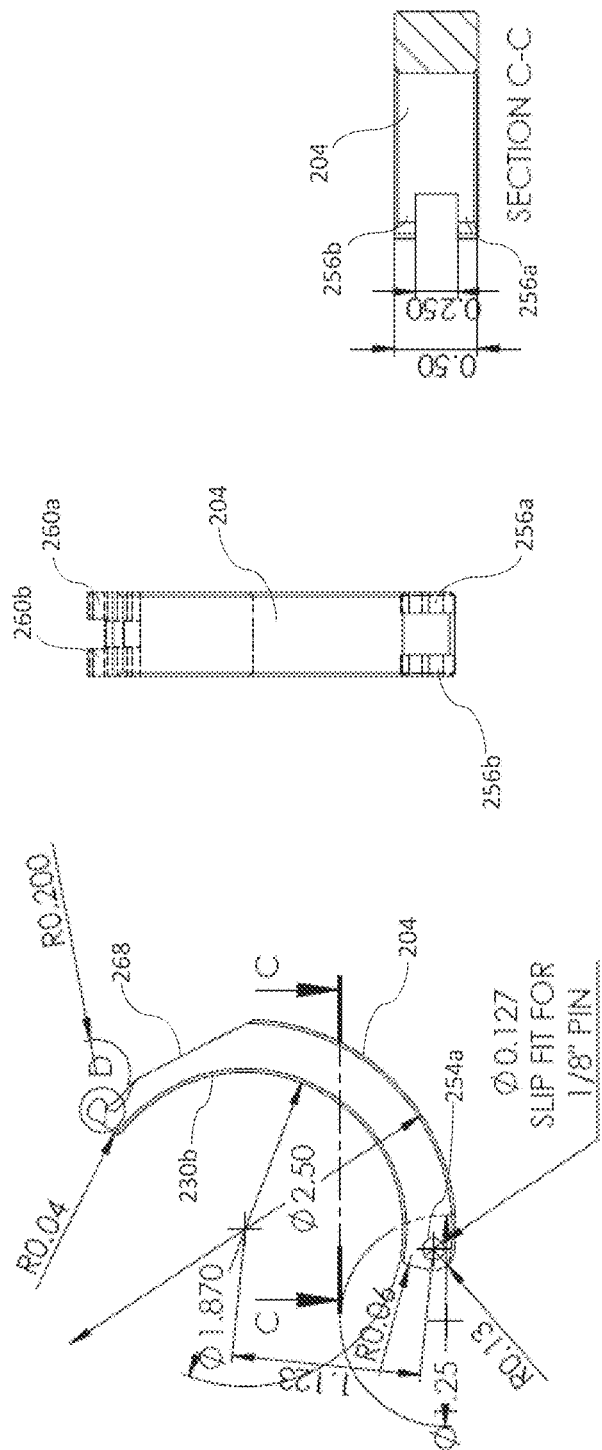
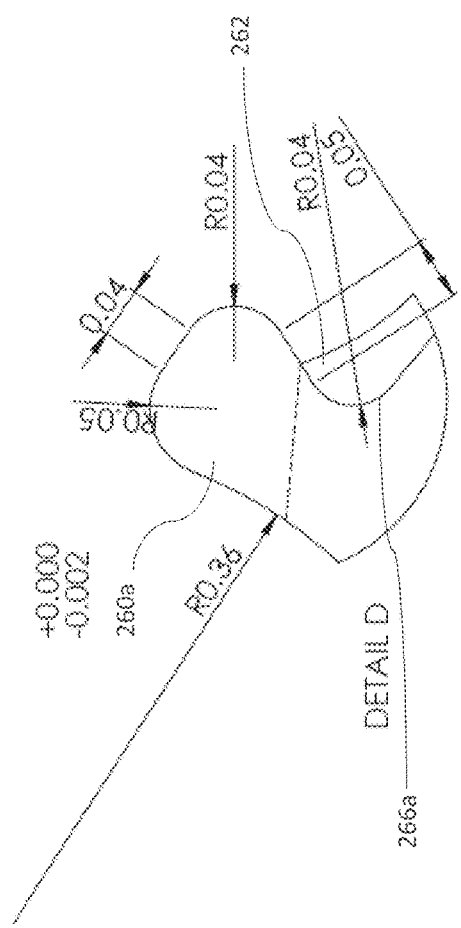
FIG. 41

CLAMPING DEVICES, SYSTEMS AND METHODS

CROSS-REFERENCES TO RELATED APPLICATIONS

This application claims the benefit of and priority to and is a divisional of U.S. patent application Ser. No. 16/439,708, entitled "CLAMPING DEVICES, SYSTEMS AND METHODS" (hereafter "Patent App. 708") and which was filed on Jun. 13, 2019.

Patent App. 708 claimed the benefit of and priority to and was a continuation-in-part of U.S. Design patent application Ser. No. 29/653,158, entitled "CLAMPS" (hereafter "Design Patent App. 158"). Design Patent App. 158 was filed on Jun. 13, 2018 and was later issued as U.S. Design Patent No. D885,173 S on May 26, 2020 and entitled "CLAMP" (hereafter "Design Patent 173").

Patent App. 708 also claimed the benefit of and priority to and was a continuation-in-part of U.S. Design patent application Ser. No. 29/660,824, entitled "ADJUSTABLE CLAMPS" (hereafter "Design Patent App. 824"). Design Patent App. 824 was filed on Aug. 22, 2018 and was a continuation-in-part application of Design Patent App. 158 and was later issued as U.S. Design Patent No. D885,877 S on Jun. 2, 2020 and entitled "ADJUSTABLE CLAMP" (hereafter "Design Patent 877").

Patent App. 708 also claimed the benefit of and priority to and was a continuation-in-part of U.S. Design patent application Ser. No. 29/660,820, entitled "QUICK RELEASE CLAMPS" (hereafter "Design Patent App. 820"). Design Patent App. 820 was filed on Aug. 22, 2018 and was later issued as U.S. Design Pat. No. D885,174 S on May 26, 2020 and entitled "QUICK RELEASE CLAMP" (hereafter "Design Patent 174").

Patent App. 708 also claimed the benefit of and priority to U.S. Provisional Utility Patent Application No. 62/734,286, entitled "CLAMPING DEVICES, SYSTEMS AND METHODS," which was filed on Sep. 21, 2018 (hereafter "Provisional App. 286").

The entire contents of Patent App. 708, Design Patent App. 158, Design Patent 173, Design Patent App. 824, Design Patent 877, Design Patent App. 820, Design Patent 174, and Provisional App. 286 are hereby incorporated herein by reference as if set forth in full as part of this application.

BACKGROUND

Technical Field

The disclosure relates at least to clamping devices, systems, and methods.

Discussion of Related Field

In general terms, some clamps that secure engine hoses and other targeted objects are not user friendly in that they cannot be easily installed or removed, especially in tight or difficult places to work in and maneuver. Some clamps require a hose (or other targeted object) to be detached from whatever it is attached to prior to installing the clamp around the hose (or other targeted object), and once those clamps are installed, the hose (or other object) then must be reattached.

Some clamps, such as worm gear clamps, are top heavy and gravity causes the clamps to spin away from the user or out of its proper or desired position. In addition, when a user attempts to tighten a worm gear clamp, a user is required to insert a screwdriver into its tightening device and push or apply force against the tightening device while attempting to twist it at the same time. The force required to be exerted on the tightening device causes the worm gear clamp to rotate away from the user, thereby requiring the user to hold the worm gear clamp in place while at the same time attempting to tighten it. The combination of the worm gear clamp being top heavy and the force required to tighten it, makes a worm gear clamp difficult to secure. In addition, when the tightening device of a worm gear clamp is stripped or is otherwise inoperative or breaks, it is difficult to remove the clamp and not damage the hose or other object it is attached to when trying to remove the inoperative clamp.

Some types of clamps, such as banded clamps, require many revolutions of the tightening/loosening screw in order to be removed or installed. Some types of clamps, such as spring steel clamps, need a specialty tool or specifically designed installer device in order to squeeze tension out of the clamp in order to install or remove them. Some types of clamps, such as worm gear clamps and spring steel clamps, are not durable and their structural integrity is reduced after repeated uses. Some clamps are not aesthetically pleasing or appealing and detract from the appearance of the engine part or other things they are operably connected to.

In light of such, there is at least a need for improved clamping devices, methods or systems that provide at least one of the following: is user friendly; is easily installed or removed (including in tight or difficult places); does not require hoses or other targeted objects to be removed prior to installation of the clamp; is not top heavy and does not spin away from the user or out of its proper or desired position due to gravitational forces; is not at risk of rotating away from the user when the user is tightening the clamp; can be removed without undue damage to the object the clamp is operably attached to if it breaks or is otherwise inoperative; does not require extensive revolutions of a screw in order to be tightened or loosened; does not require a specialty tool or specifically designed installer device in order to install or remove the clamp; is durable; is reusable without compromising its structural integrity; and/or is aesthetically pleasing.

In general terms, people desire the ability to quickly remove clamps or adjust the location of the clamps on the targeted objects. For example, once a user has mounted a GoPro® onto one end of a clamp and installed the clamp around a roll bar of a RZR®, the user may wish to quickly remove the GoPro® from the roll bar or adjust its location on the roll bar for any number of reasons, such as to prevent theft or to change its view. Some clamps are not quickly removeable or are otherwise difficult to adjust their location on the targeted object. As such, there is at least a need for improved clamping devices, methods and systems that are at least quickly removable and/or are easy to adjust their location on the targeted object.

In general terms, people desire to mount accessories to various targeted objects. For example, a user may desire to operably connect fire extinguishers, GoPro's®, speakers, light bars, gas tanks, tools and equipment, storage boxes, flags, license plates, and numerous other accessories to RZR's®, Can-Am's® or other types of vehicles. As such, there is at least a need for improved clamping devices, methods and systems that enable users to mount accessories to various targeted objects.

SUMMARY

In one aspect an adjustable clamp device includes: a catch member pivotably connected to a base member by a first pin;

and a latch member adjustably connected to the base member by a fine adjustment mechanism and a camshaft; and the latch member is pivotably connected to the camshaft; and wherein the adjustable clamp device is designed to wrap around and clamp to a targeted object in a secure fashion.

Implementations may include one or more of the following features. The fine adjustment mechanism includes a threaded surface that corresponds with an opening in the base member that is designed to receive the threaded surface of the fine adjustment mechanism, such that when the fine adjustment mechanism is twisted, the distance between the latch member and the base member is reduced.

In another aspect a method for using an adjustable clamp device includes: possessing an adjustable clamp device that includes: a catch member pivotably connected to a base member by a first pin; and a latch member adjustably connected to the base member by a fine adjustment mechanism and a camshaft; and the latch member is pivotably connected to the camshaft; and wherein the adjustable clamp device is designed to wrap around and clamp a targeted object in a secure fashion; possessing a tool that is capable of squeezing the adjustable clamp device around a targeted object; and wrapping the adjustable clamp device around the targeted object; placing the tool around the adjustable clamp device; squeezing the tool and thereby squeezing the adjustable clamp device around the targeted object; and causing the latch member to operably connect to the catch member in a locked position.

In another aspect a quick release clamp includes: a catch member pivotably connected to a base member by a first pin; a latch member pivotably connected to the base member by a camshaft; and a quick release mechanism pivotably connected to the latch member by a second pin; and wherein the quick release clamp is designed to wrap around and clamp to a targeted object in a secure fashion and to be quickly removable from the targeted object.

Implementations may include one or more of the following features. The base member includes a mount member for operably connecting accessories to the quick release clamp.

In another aspect an adjustable clamp device includes: a catch member pivotably connected to a base member by a first pin; and a latch member adjustably and pivotably connected to the base member by a fine adjustment mechanism and a second pin; and wherein the adjustable clamp device is designed to clamp to a targeted object in a secure fashion.

Implementations may include one or more of the following features. The fine adjustment mechanism includes a threaded surface that corresponds with an opening in the base member that is designed to receive the threaded surface of the fine adjustment mechanism, such that when the fine adjustment mechanism is placed within the opening in the base member and twisted, the distance between the latch member and the base member is reduced. The adjustable clamp device is designed to pivot open so that it is easily placed around the targeted object without requiring the removal of the targeted object prior to installing the adjustable clamp device. The base member includes a first rib, the catch member includes a second rib, and the latch member includes a third rib; wherein each rib is elevated from the inside surface of their respective member at substantially an equal distance such that when the adjustable clamp device is in a locked position, the tops of each rib contact at least a portion of the targeted object. The first rib, the second rib, and the third rib each includes chamfers designed to reduce the likelihood of damage to the targeted object when the targeted object is gripped by the adjustable clamp device.

The catch member includes a first end that includes: a first lug, a second lug, a ramp, a landing, a right side surface, and a left side surface, all of which are situated on a top surface of the catch member. The catch member further includes a second end that includes a first wing and a second wing; wherein the first wing includes a first opening and the second wing includes a second opening; and wherein the first opening and the second opening are designed for receiving and pivoting about the first pin and being operably connected to the base member when the first opening and second opening of the second end of the catch member are aligned with an opening of the base member and the first pin is inserted through all three said openings. The latch member includes a first end that includes a first support member and a second support member, wherein the first support member includes a first opening and the second support member includes a second opening for receiving and pivoting about the second pin, wherein the second pin, when situated through the first opening and the second opening, allows the latch member to pivot about the second pin; and wherein the first end further includes a relief cut situated on a top surface of the latch member and runs between the first support member and the second support member on the top surface of the first end of the latch member, wherein the relief cut is designed to allow the fine adjustment mechanism to be inserted through an opening in the second pin when the second pin is seated in the first opening and the second opening of the first support member and the second support member, respectively, of the latch member. The latch member includes a second end and a middle section; wherein the second end of the latch member is designed as a handle that allows users to engage the latch member in order to lock and unlock the adjustable clamp device; wherein the middle section includes: a first groove, a second groove, a right protrusion, a left protrusion, a channel, and a ramp, all of which are situated on a bottom surface of the middle section of the latch member; and wherein the first groove of the middle section of the latch member corresponds with the first lug of the first end of the catch member and the second groove of the middle section of the latch member corresponds with the second lug of the first end of the catch member, such that when the latch member is pressed down on the catch member in the proper position, the first lug and the second lug go into the first groove and the second groove, respectively, and aid in securing the adjustable clamp device around the targeted object. The base member includes a first end that includes a first profile; wherein the latch member includes a first end that includes a second profile; and wherein at least some portion of the first profile of the first end of the base member complements at least some portion of the second profile of the first end of the latch member and aids in the latch member's ability to be pivotably connected to the base member.

In another aspect a method for using an adjustable clamp device includes: possessing an adjustable clamp device, that includes: a catch member pivotably connected to a base member by a first pin; and a latch member adjustably and pivotably connected to the base member by a fine adjustment mechanism and a second pin; and wherein the adjustable clamp device is designed to clamp to a targeted object in a secure fashion; possessing a tool that is capable of squeezing the adjustable clamp device around the targeted object; wrapping the adjustable clamp device around the targeted object; placing the tool around the adjustable clamp device; squeezing the tool and thereby squeezing the adjustable clamp device around the targeted object; and causing the latch member to operably connect to the catch member in a locked position.

In another aspect a quick release clamp device includes: a catch member pivotably connected to a base member by a first pin; a latch member adjustably and pivotably connected to the base member by a fine adjustment mechanism and a second pin; a quick release mechanism pivotably connected to the latch member by a third pin; and wherein the quick release clamp device is designed to clamp to a targeted object in a secure fashion and to be quickly removable from the targeted object.

Implementations may include one or more of the following features. The base member includes a mount member for operably connecting accessories to the quick release clamp device. The quick release clamp device is designed to pivot open so that it is easily placed around the targeted object without requiring the removal of the targeted object prior to installing the quick release clamp device. The quick release mechanism includes a base portion, an arm portion, and a handle portion; and wherein the handle portion includes a recess and an opening for receiving and operably connecting objects to the quick release clamp device. The catch member includes a first end that includes: a first lug, a second lug, a ramp, a landing, a right side surface, and a left side surface, all of which are situated on a top surface of catch member. The latch member includes a first end that includes: a first support member and a second support member; wherein the first support member includes a first opening and the second support member that includes a second opening for receiving and pivoting about the second pin; wherein the second pin, when situated through the first opening and the second opening, allows the latch member to pivot about the second pin; and wherein the first end further includes a relief cut situated on a top surface of the latch member and runs between the first support member and the second support member on the top surface of the first end of the latch member; wherein the relief cut is designed to allow the fine adjustment mechanism to be inserted through an opening in the second pin when the second pin is seated in the first opening and the second opening of the first support member and the second support member, respectively, of the latch member. The latch member includes a second end that includes: a first wing and a second wing; wherein the first wing includes a first opening and the second wing includes a second opening for receiving and pivoting about the third pin; wherein the quick release mechanism includes a base portion that includes an opening for receiving and pivoting about the third pin; wherein the first wing and the second wing operably connect to the base portion of the quick release mechanism when the first opening and the second opening of the first wing and the second wing, respectively, of the second end of the latch member are aligned with the opening of the base portion of the quick release mechanism and the third pin is inserted through all three said openings; and wherein the third pin, when situated through all three said openings, allows the latch member and the quick release mechanism to pivot about the third pin. The latch member includes a middle section that includes: a first groove, a second groove, a right protrusion, a left protrusion, a channel, and a ramp, all of which are situated on a bottom surface of the middle section of the latch member; and wherein the first groove of the middle section of the latch member corresponds with the first lug of the first end of the catch member and the second groove of the middle section of the latch member corresponds with the second lug of the first end of the catch member, such that when the latch member is pressed down on the catch member in the proper position, the first lug and the second lug go into the first groove and the second groove, respectively, and aid in securing the quick release clamp device around the targeted object. The fine adjustment mechanism includes a threaded surface that corresponds with an opening in the base member that is designed to receive the threaded surface of the fine adjustment mechanism, such that when the fine adjustment mechanism is placed within the opening in the base member and twisted, the distance between the latch member and the base member is changed.

These general and specific aspects may be implemented by using systems, apparatuses, devices, means, methods and structures or any combination thereof.

Certain implementations may provide one or more of the following advantages. Embodiments may not achieve any or all of the listed advantages. Further, this is not an exhaustive list of all possible advantages of the disclosure. One or more embodiments of the disclosure may be configured to be or provide users the following.

In one or more embodiments, the disclosure allows users to fine or micro adjust the grip it has on a hose or other targeted object while the disclosure is in the locked position. In one or more embodiments, the disclosure allows users to fine or micro adjust the size of the disclosure prior to installing it and placing it in the locked position. In one or more embodiments, the disclosure is user friendly and easy to install (put on) and remove (take off). In one or more embodiments, the disclosure does not require the hoses or other objects to be removed prior to or in order to install the disclosure. In one or more embodiments, the disclosure is designed to hinge open so it is easily placed on a hose. In one or more embodiments, the disclosure is designed to easily be placed on a hose without first requiring the hose to be removed before installing the clamp on the hose. In one or more embodiments, no installer or other device is required in order to install the disclosure. In one or more embodiments, the disclosure does not pull apart by the strength of a human arm(s) when in the locked position. In one or more embodiments, the disclosure does not puncture or rip hoses or other targeted surfaces. In one or more embodiments, the design of the disclosure reduces the indentation to hoses and other targeted surfaces when compared to other types of clamps. In one or more embodiments, the disclosure provides a means for fine or micro adjustments of the disclosure around a targeted surface or object. In one or more embodiments, the disclosure reduces or eliminates the risk of over or under tightening of the disclosure around a targeted object. In one or more embodiments, the disclosure reduces or eliminates the risk of over or under tightening while still giving the user the option to micro or fine adjust the disclosure if necessary. In one or more embodiments, the disclosure is aesthetically appealing. In one or more embodiments, the disclosure is sleek and modern looking. In one or more embodiments, the disclosure is strong and durable. In one or more embodiments, the disclosure is reusable. In one or more embodiments, the disclosure is capable of repeated use without any fatigue to it. In one or more embodiments, the disclosure is designed to be opened and shut many times. In one or more embodiments, the disclosure provides a lower fail rate as compared to other clamps. In one or more embodiments, the disclosure is customizable. In one or more embodiments, the disclosure is customizable by color, finish, metal type and specialty engravings, including picture art and fonts of various sizes. In one or more embodiments, the disclosure is machinable to exact specifications for a precise fit. In one or more embodiments, the disclosure is ultrasecure. In one or more embodiments, the disclosure is superior to spring clamps, worm gear clamps, tension type clamps and other clamps. In one or more embodiments, the disclosure is opened with any straight screwdriver or any flat tool. Other aspects and advantages may be apparent from the following detailed description, the accompanying drawings, or the claims.

BRIEF DESCRIPTION OF THE DRAWINGS

Various embodiments of the disclosure are discussed herein with reference to the appended drawings. It is appreciated that these drawings depict only typical embodiments of the disclosure and are not to be considered limiting its scope. Although the drawings may include shading to show surface characteristics, in one or more embodiments, the shading is removed from the illustrations and the disclosure assumes alternative or additional surface characteristics.

FIG. 23 shows a flow diagram that depicts one embodiment of a method for using a clamp;

FIG. 24 shows a flow diagram that depicts an alternative embodiment of a method for using a clamp;

FIG. 41 shows various views of one embodiment of a catch member;

DETAILED DESCRIPTION

Figure 1:
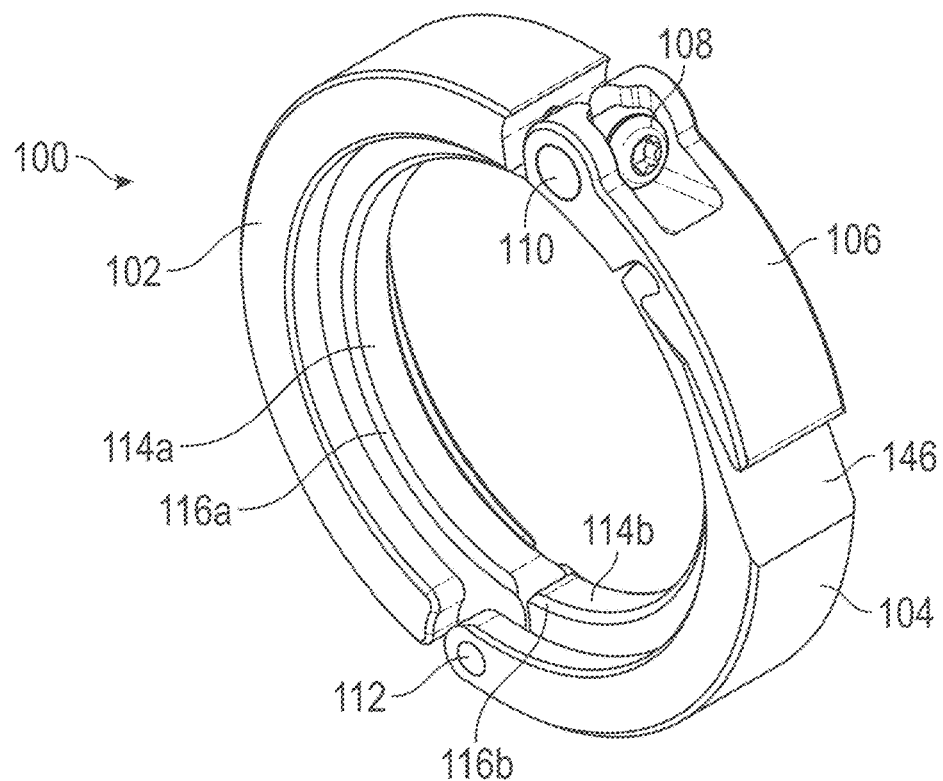
FIG. 1 shows a front perspective view of one embodiment of an adjustable clamp in a closed or locked position.

The following description illustrates principles of the disclosure which may be applied in various ways to provide different embodiments. There may be many different forms of embodiments of the disclosure, and as such, embodiments should not be limited to those set forth herein and shown in the accompanying drawings. While exemplary embodiments of the disclosure are shown and described herein, changes and modifications may be made without departing from its scope and concepts. That which is set forth herein and shown in the accompanying drawings is offered to illustrate the principles of the disclosure and not as limitations. Other variations of the disclosure may be included within the principles of the disclosure.

In some embodiments, the disclosure is configurable, adaptable, and customizable to meet the various needs of various users in various circumstances or to be compatible or used in conjunction with various systems, apparatuses, devices, means, methods, or structures.

The disclosure may be configured in various ways, by various means or various methods, with various parts, to various dimensions (such as shapes, lengths, widths, heights, depths, or sizes) or with or from various materials, or any combinations thereof. The specific parts, materials, members, devices, systems, or components of the disclosure may be configured together or separate or with other parts, materials, members, devices, systems or components, or any combinations thereof.

The drawings herein may but do not necessarily illustrate the disclosure to scale. The drawings herein may, but do not necessarily, depict the exact positions, shapes, sizes, layouts, designs, angles or other dimensions or configurations in which the disclosure may be implemented. In one or more embodiments, the components of the disclosures may be configured to various positions, shapes, sizes, layouts, designs, angles or other dimensions or configurations from various materials, for various reasons.

The disclosure is used for various uses for various purposes. For example, the disclosure is used in various industries, such as in the automotive industry (such as on vehicles of any nature, such as on cars, trucks, semitrucks, minivans, jeeps, SUV's, RZR's®, Can-Am's®, UTV vehicles, buggies, race cars, motorcycles, dirt bikes, and the like and other vehicles, as well as on parts and components thereof, such as on custom car builder segments, roll bars, engine hoses, etc.) as well as in the plumbing industry (such as on plumbing parts, such as hoses, pipes, etc.), boating industry, heavy machine industry, or any other industry or setting in which the disclosure can be used. The disclosure is used to engage various things, such as hoses, roll bars, pipes, tubes, polls, posts, bumpers, and other round, oval, or other shaped surfaces of various sizes. The disclosure is used to engage various things made from various materials, such as wood, plastic, rubber, metal, and other materials. The disclosure is used to engage things possessing various surface qualities, such as smooth, toothed, and other surface types.

In one or more embodiments, the disclosure is a multi-hinged or pivoting device for enabling it to be easily installed and removed from around its targeted object.

Aspects of the disclosure are formed from various materials. For example, in one or more embodiments, the material used to make at least some aspect of the disclosure includes 6061-T6 aluminum. In one or more embodiments, the material used to make at least some aspect of the disclosure includes at least one of the following: steel, aluminum, brass and/or other metals. In one or more embodiments, the disclosure is made in various ways. For example, various pieces or parts of the disclosure are machined from flat bar stock aluminum. In other embodiments, liquid aluminum is injected into molds to form the various pieces or parts of the disclosure.

In one or more embodiments, the material used to make at least some aspect of the disclosure includes at least one of the following: metals (such as aluminum, silver, gold, europium, neptunium, cobalt, iron, cooper, nickel, lead, lithium, calcium, titanium, tin, etc.), non-metals (such as carbon, sulfur, chlorine, argon, etc.), metalloids (such as boron, tellurium, etc.), ceramics (such as alumina, silicon, tungsten, granite, limestone, marble, slate, quartzite, etc.), polymers and plastics (such as natural rubbers, synthetic rubbers, polyvinyl chloride (PVC), PC, high density polyethylene (HDPE), oriented or stretch blown polyethylene terephthalate (PET), polypropylene (PP), acrylonitrile butadiene styrene (ABS), polycarbonate, etc.), alloys (such as alloys of metals and alloys of plastics), woods and natural products (such as hickory, aspen, maple, cedar, spruce, hemlock, pine, oak, walnut, elm, fir, mahogany, kunststoff, etc.), or the like or other materials are used to make aspects of the disclosure. Each type of material may have various characteristics. For example, the disclosure may be subject to various heat treatment techniques or various other treatments such as rhino lining, galvanization or other corrosion resistant treatments, or other treatments for various purposes. The disclosure may be water resistant or waterproof.

In one or more embodiments, the disclosure has a finish that may include being custom painted, polished, anodized, etc. In one or more embodiments, various pieces or parts of the disclosure may be customized by being engraved to individual preferences. In one or more embodiments, the disclosure is tumbled. In one or more embodiments, chamfers of the disclosure are rounded, angled, or otherwise modified from a 90-degree angle. In other embodiments, chamfers of the disclosure are substantially at a 90-degree angle.

In one or more embodiments, the sizes of the various components of the disclosure are made larger or smaller in order to fit numerous different sized hoses and other targeted objects. In one or more embodiments, the size of the disclosure is scaled up or down to meet the demands of a customer or to fit the intended object.

In one or more embodiments, the disclosure is in the form of a clamp (such as clamp 100 or clamp 200) for securing various objects.

FIGS. 1-22 show views of various embodiments of a clamp 100 and embodiments of aspects thereof that provide users the ability to micro or fine adjust clamp 100. Clamp 100 is adjustable before it is in a locked position around a targeted object. In other embodiments, clamp 100 is adjustable while it is in a locked position around a targeted object. In other embodiments, clamp 100 is adjustable before and while it is in a locked position around a targeted object.

Clamp 100 is designed to fit around various targeted objects (such as a radiator hose). In one or more embodiments, the sizes of the various components of clamp 100 are made larger or smaller in order to fit numerous different sized hoses and other targeted objects. The sizes of radiator hoses, for example, generally range from about $5/8$ of an inch to about $5\frac{1}{2}$ inches in diameter. Thus, in one or more embodiments, the size of clamp 100 is designed to properly fit around and secure radiator hoses that are about $5/8$ of an inch to about $5\frac{1}{2}$ inches in diameter. In one or more embodiments, clamp 100 is designed to be about $1\frac{1}{2}$ inches to about $2\frac{1}{4}$ inches in diameter. In one or more embodiments, clamp 100 is designed to fit around objects of any diameter between about 0.13 inches to about 96 inches.

In one or more embodiments, clamp 100 achieves at least one of the following: is user friendly; is easily installed or removed (including in tight or difficult places); does not require hoses or other targeted objects to be removed prior to the installation of clamp 100; is not top heavy and does not spin away from the user or out of its proper or desired position due to gravitational forces; is not at risk of rotating away from the user when the user is tightening clamp 100; can be removed without undue damage to the object clamp 100 is operably attached to if clamp 100 breaks or is otherwise inoperative; does not required extensive revolutions of a screw in order to be tightened or loosened; does not require a specialty tool or specifically designed installer device in order to install or remove clamp 100; is durable; is reusable without compromising its structural integrity; and/or is aesthetically pleasing.

FIG. 1 shows a front perspective view of one embodiment of adjustable clamp 100 in a closed or locked position. Clamp 100 includes a base member 102, a catch member 104, a latch member 106, a fine adjustment mechanism 108, a pin 110 and a pin 112. Clamp 100 is designed to hinge or pivot open so that it is easily placed around a hose or other object without requiring the removal of the hose or other object prior to installing clamp 100. Other types of clamps require the hose (or other objects) to be removed prior to installing the clamp. Once those clamps are installed, the hose (or other objects) then must be reattached. Clamp 100, on the other hand, is designed to hinge or pivot open wide enough so that the hose (or other objects) does not need to be removed prior to installing clamp 100. For example, as shown in FIG. 1, catch member 104 is operably connected to base member 102 via pin 112 in such a way that allows catch member 104 and base member 102 to pivot about pin 112 so that it can be easily placed around hoses or other objects without first requiring said hoses or objects to be removed before installing clamp 100. In other embodiments, catch member 104 is operably connected to base member 102 via something other than pin 112.

Latch member 106 is operably connected to base member 102 via fine adjustment mechanism 108 and pin 110 in such a way that allows latch member 106 to pivot about pin 110 so that it can be easily placed around hoses or other objects without first requiring said hoses or objects to be removed. In other embodiments, latch member 106 is operably connected to base member 102 via something other than fine adjustment mechanism 108 and pin 110.

Fine adjustment mechanism 108 provides users the ability to fine or micro adjust clamp 100 to ensure that clamp 100 fits tightly around the targeted object or surface. As shown in FIG. 1, fine adjustment mechanism 108 is in the form of a button head bolt. The fine or micro adjustment is achieved when a user twists or turns the fine adjustment mechanism 108, thereby allowing threads on the fine adjustment mechanism 108 (see FIG. 5) to move in or out of the threaded opening 124 (see FIG. 5) of base member 102, thereby allowing the diameter of or circumference of clamp 100 to expand or shrink in order to tighten or loosen clamp's 100 grip of a hose or other object. In other embodiments, fine adjustment mechanism 108 is in the form of something other than a bolt such that it provides users the ability to fine or micro adjust clamp 100 to ensure that clamp 100 fits tightly around a targeted object or surface. In one or more embodiments, fine adjustment mechanism 108 is turned into proper position prior to being installed, thereby reducing or eliminating the risk of clamp 100 rotating away from the user when clamp 100 is being tightened. In one or more embodiments, should fine adjustment mechanism 108 brake or otherwise become inoperative, clamp 100 is removable without damaging the hose or other object it is operably connected to. In one or more embodiments, a user is not required to make extensive revolutions of the fine adjustment mechanism 108 in order to install or remove it. In one or more embodiments, fine adjustment mechanism 108 does not require a specialty tool or specifically designed installer device in order to operate it or otherwise install or remove clamp 100. A common screwdriver or other flat device is sufficient to turn fine adjustment mechanism 108 and to disengage latch member 106 from catch member 104. A common vice grip, channel lock, needle nose pliers or other pliers or tool is sufficient to squeeze clamp 100 into place during its installation or adjustment.

In one or more embodiments, clamp 100 is machined to the size of the hose or other targeted object such that it cannot be over or under tightened. In one or more embodiments, pin 112 and pin 110 assume the form of dowels. In other embodiments, pin 112 and pin 110 assume the form of something other than dowels. In one or more embodiments, clamp 100 is not top heavy, but instead, possesses substantially an equal distribution of weight around its circumference, thereby, reducing or eliminating the risk of spinning away from a user or out of position due to gravitational forces.

Figure 2:
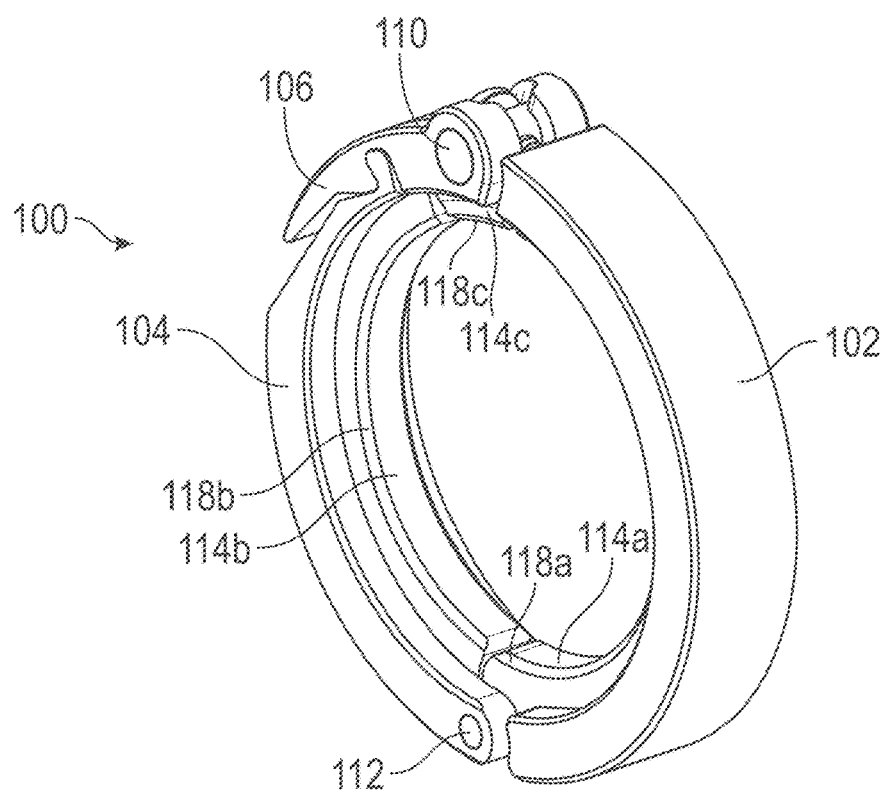
FIG. 2 shows a rear perspective view of the clamp of FIG. 1.

FIG. 2 shows a rear perspective view of the embodiment of clamp 100 of FIG. 1.

Figure 3:
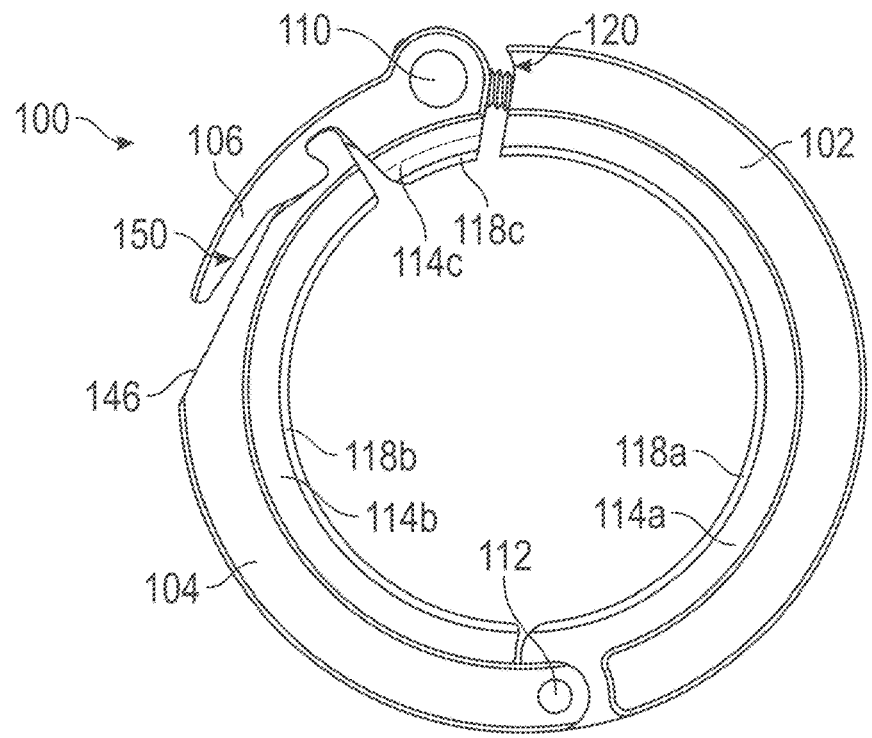
FIG. 3 shows a left side view of the clamp of FIG. 1.

FIG. 3 shows a left side view of the embodiment of clamp 100 of FIG. 1. Base member 102 includes a rib 114a, catch member 104 includes a rib 114b, and latch member 106 includes a rib 114c. Ribs 114a, 114b and 114c are situated on the inside surface of their respective members and each rib is elevated or protrudes from the inside surface of their respective member at substantially an equal distance such that, when clamp 100 is in a locked position, the top of ribs 114a, 114b and 114c form a circumference of at least a partial circle designed to contact and substantially encircle at least a portion of a hose or other targeted object. As a user turns or otherwise manipulates fine adjustment mechanism 108, the circumference of ribs 114a, 114b and 114c is designed to shrink, thereby, ultimately tightening clamp's 100 ability to grip the hose or other object. Clamp 100 is designed to compress around the hose or other object in such a way that does not rip or puncture the hose or other object, while at the same time ensuring its grip around the hose or other object.

Without ribs 114a, 114b and 114c, clamp 100 may not have as secure a grip on the hose or other object as clamp 100 does with the presence of ribs 114a, 114b and 114c. In one or more embodiments, when clamp 100 is wrapped around a hose or other targeted object in the locked position, ribs 114a, 114b and 114c create a clamping seal. Such configuration also assists in the installation process of clamp 100 because, unlike other clamps, clamp 100 is designed not to twist away from the user when clamp 100 is installed. In one or more embodiments, squeezing or positioning clamp 100 into place is made easier because ribs 114a, 114b and 114c cause only a small area of the hose or other targeted object to be displaced during the installation process.

Without ribs 114a, 114b and 114c, the hose or other targeted object may be damaged. For example, in the case of worm clamps, as a worm clamp tightens on a rubber hose, the rubber from the hose is pulled into the worm clamp's screw grooves and the hose is damaged. In the case of a spring steel clamp, the pressure and design of the spring steel clamp compress the hose and leave deforming indents that remain on the hose. Clamp 100 reduces or eliminates said risks by providing said protruding or elevated ribs 114a, 114b and 114c. In one or more embodiments, when contacting a hose or other object, ribs 114a, 114b and 114c push the hose or other object away from the clamp 100 and, thereby, allow clamp 100 to be installed easier and with less damage to the hose or other targeted object.

In one or more embodiments, at least some portion of ribs 114a, 114b and 114c assume a convex profile. In other embodiments, at least some portion of ribs 114a, 114b and 114c assume a concave profile. In other embodiments, at least some portion of ribs 114a, 114b and 114c assume different or the same profiles as compared to each other. In one or more embodiments, ribs 114a, 114b and 114c are machined in order to reduce the possibility of over or under tightening. In one or more embodiments, ribs 114a, 114b and 114c are cut on a machine lathe to produce a custom or precision fit.

Figure 4:
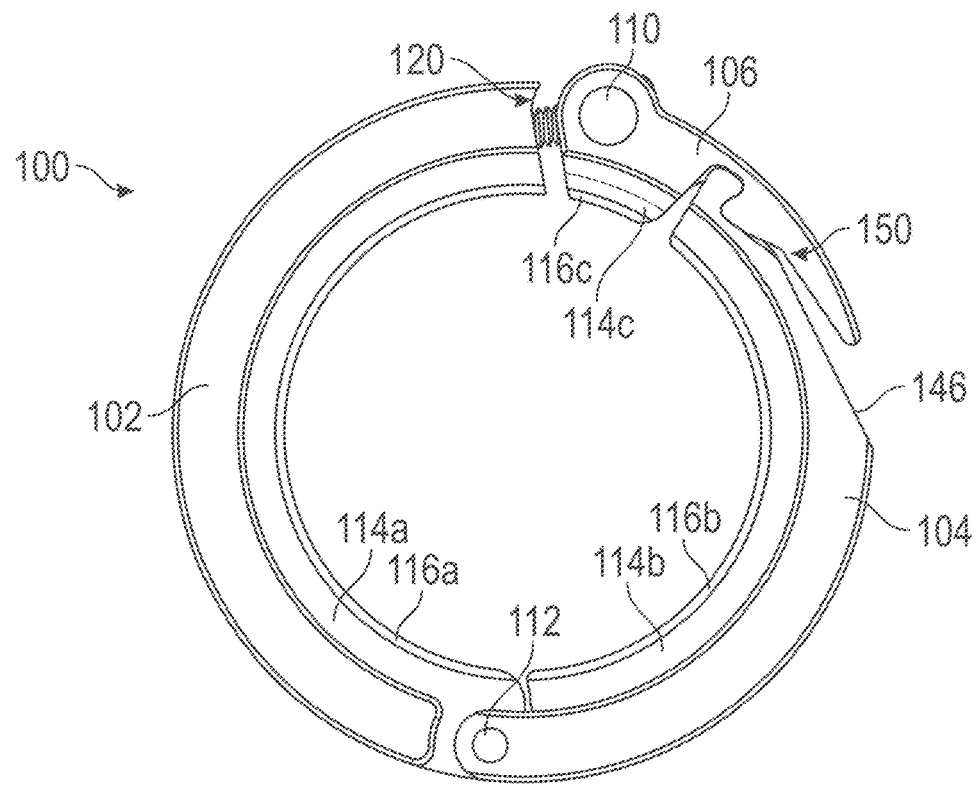
FIG. 4 shows a right side view of the clamp of FIG. 1.

FIG. 4 shows a right side view of the embodiment of clamp 100 of FIG. 1. Ribs 114a, 114b and 114c include angled chamfers that reduce the likelihood of damage to the hose or other objects when gripped by clamp 100. For example, as shown in the applicable FIGS. 1-4, rib 114a (of base member 102) includes an angled chamfer 116a and an angled chamfer 118a, rib 114b (of catch member 104) includes an angled chamfer 116b and an angled chamfer 118b, and rib 114c (of latch member 106) includes an angled chamfer 116c and an angled chamfer 118c. Angled chamfer 116a and angled chamfer 118a of base member 102 run substantially parallel to each other along rib 114a. Angled chamfer 116b and angled chamfer 118b of catch member 104 run substantially parallel to each other along rib 114b. Angled chamfer 116c and angled chamfer 118c of latch member 106 run substantially parallel to each other along rib 114c. In one or more embodiments, base member 102, catch member 104, and latch member 106 include other structural elements that reduce the likelihood of damage to the hose or other object when being gripped by clamp 100.

Figure 5:
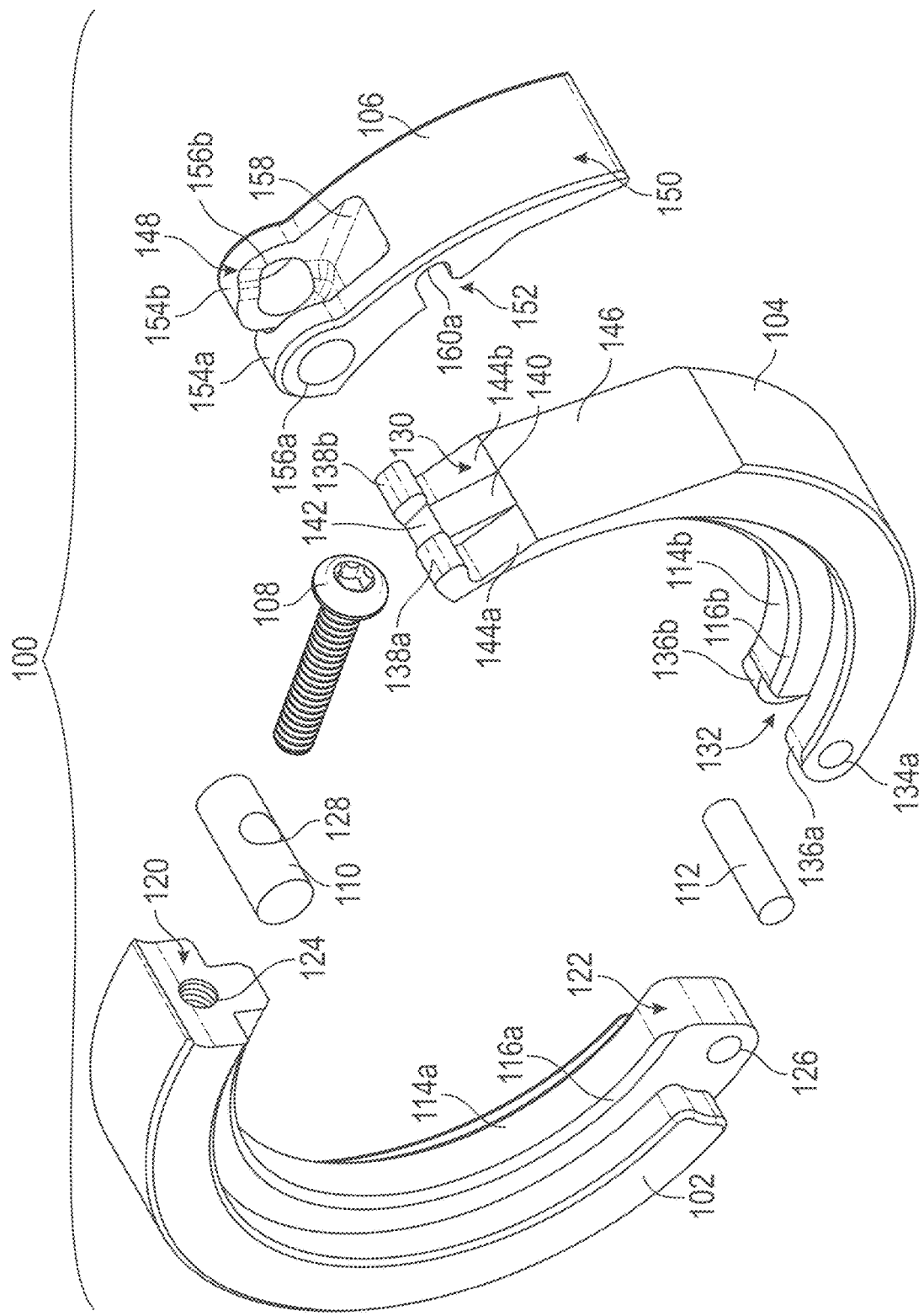
FIG. 5 shows an exploded front perspective view of the clamp of FIG. 1.

FIG. 5 shows an exploded front perspective view of the embodiment of clamp 100 of FIG. 1. Base member 102 includes a first end 120 and a second end 122. Base member 102 includes a threaded opening 124 situated on its first end 120 that receives and corresponds to threads on fine adjustment mechanism 108. Aspects of the profile of first end 120 complement aspects of the profile of latch member 106 (such as support members 154a and 154b). Base member 102 includes an opening 126 situated on the second end 122 for receiving and pivoting about pin 112.

Catch member 104 includes a first end 130 and a second end 132. Second end 132 of catch member 104 includes two wings—wing 136a and wing 136b. Wing 136a includes an opening 134a and wing 136b includes an opening 134b (see FIG. 6). Opening 134a and opening 134b are designed for receiving and pivoting about pin 112. Wing 136a and wing 136b operably connect to the second end 122 of base member 102 when the openings 134a and 134b of catch member 104 are aligned with the opening 126 of base member 102 and pin 112 is inserted through all three said openings. Pin 112, when situated through opening 134a, opening 134b and opening 126, allows catch member 104 and base member 102 to pivot about pin 112. Pin 112 assumes substantially a cylinder shape. In one or more embodiments, pin 112 assumes a shape other than substantially a cylinder shape. Openings 126, 134a and 134b assume substantially a circular shape. In one or more embodiments, openings 126, 134a and 134b assume a shape other than substantially a circular shape.

First end 130 of catch member 104 includes two rounded lugs (a lug 138a and a lug 138b), a ramp 140, a landing 142, a right side surface 144a, and a left side surface 144b, all of which are situated on the top surface of catch member 104. A releasing surface 146 is situated on the top surface of catch member 104 and assumes an angle or plane designed (see FIGS. 3 and 4) for providing a user the ability to place a screwdriver, flat tool, or other device in between the bottom surface of latch member 106 and top surface of catch member 104 in order to lift, pry or pop and unlock or release latch member 106 from catch member 104. Clamp 100 is designed to be capable of being repeatedly opened without damaging clamp 100. The structural integrity of traditional hose clamps is generally compromised with repeated use of the clamps. In one or more embodiments, clamp 100 is easy to repeatedly remove and install as often as required and its structural integrity is not compromised with repeated use.

As shown in FIG. 5, latch member 106 includes a first end 148, a second end 150 and a middle section 152. Latch member 106 operably connects to catch member 104 and base member 102. Latch member 106 is, by working in conjunction with other structural elements of clamp 100, the means by which clamp 100 is initially secured around a hose or other targeted object. First end 148 of latch member 106 includes two support members—a support member 154a and a support member 154b. Support member 154a includes an opening 156a and support member 154b includes an opening 156b for receiving and pivoting about pin 110. Pin 110, when situated through opening 156a and opening 156b, allows latch member 106 to pivot about pin 110. Pin 110 assumes substantially a cylinder shape. In one or more embodiments, pin 110 assumes a shape other than substantially a cylinder shape. Opening 156a and opening 156b assume substantially a circular shape. In one or more embodiments, opening 156a and opening 156b assume a shape other than substantially a circular shape.

Pin 110 includes an opening 128 through which fine adjustment mechanism 108 is inserted in order to interact with threaded opening 124 of base member 102.

First end 148 includes a relief cut 158 situated on the top surface of latch member 106. Relief cut 158 runs between support member 154a and support member 154b on the top surface of the first end 148 and into the top surface of the middle section 152 of latch member 106. Relief cut 158 provides space between support member 154a and support member 154b to allow fine adjustment mechanism 108 to be inserted through opening 128 of pin 110 when pin 110 is seated in opening 156a and opening 156b of latch member 106. Fine adjustment mechanism 108, when situated through pin 110, sits substantially perpendicular to pin 110 (see FIGS. 1 and 2). Such configuration allows latch member 106 to be adjustably connected to base member 102. Relief cut 158 is designed to allow latch member 106 to pivot about pin 110 when pin 110 is seated in opening 156a and opening 156b of latch member 106 and fine adjustment mechanism 108 is seated in opening 128 of pin 110. In one or more embodiments, latch member 106 acts as a cam transforming rotational movement into linear movement.

Second end 150 of latch member 106 is designed as a handle or arm that allows users to engage it in order to lock and unlock clamp 100. As shown in FIGS. 3 and 4, the angle of the bottom surface of second end 150 is such that the distance between the bottom surface of latch member 106 and the releasing surface 146 of catch member 104 increases in order to allow a user to place a screwdriver, flat tool or other device in between the bottom surface of latch member 106 and the releasing surface 146 of catch member 104 in order to lift, pry or pop and unlock or release latch member 106 from catch member 104.

Figure 6:
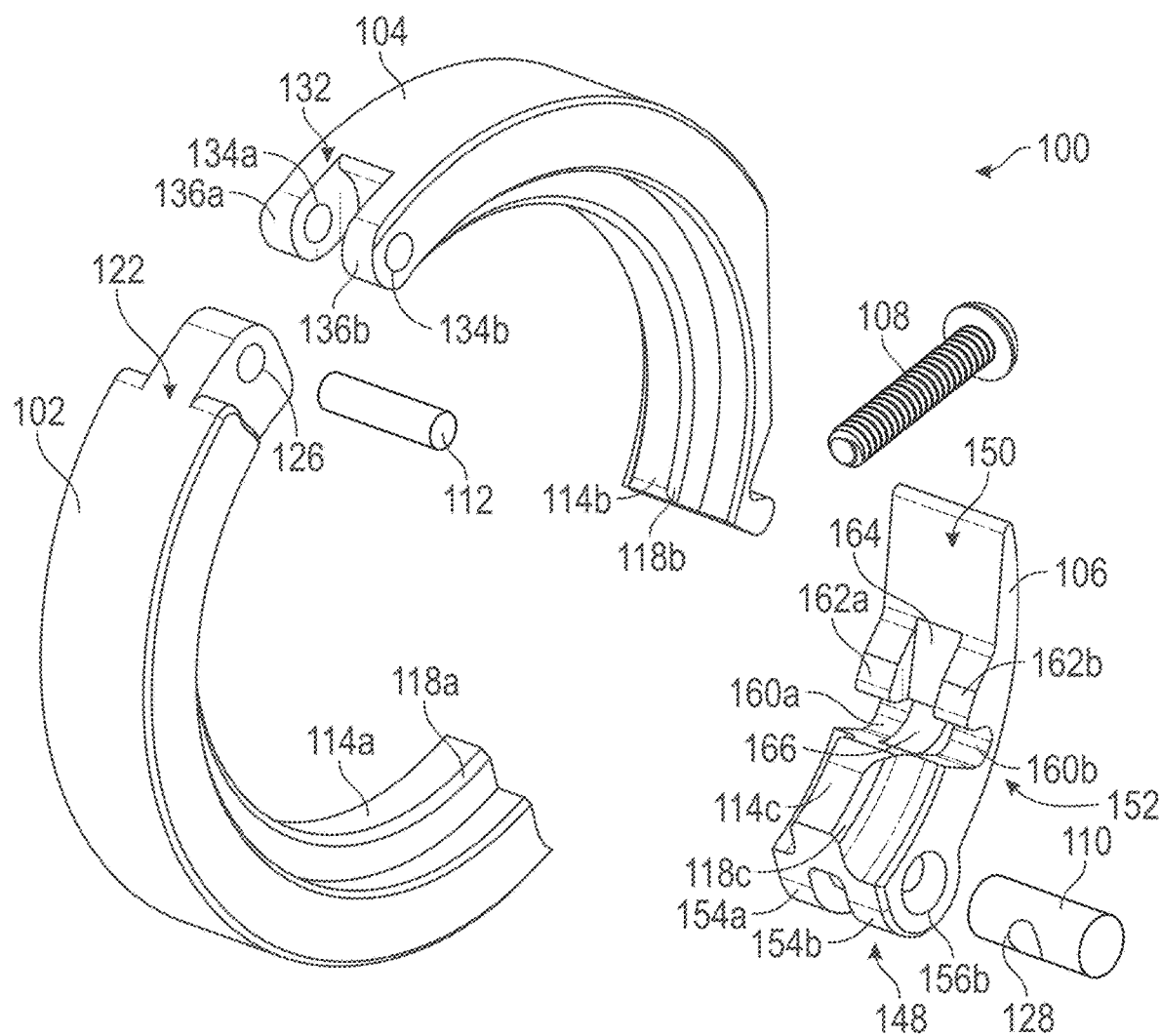
FIG. 6 shows an exploded bottom perspective view of the clamp of FIG. 1.

FIG. 6 shows an exploded bottom perspective view of the embodiment of clamp 100 of FIG. 1. Middle section 152 includes a groove 160a, a groove 160b, a right protrusion 162a, a left protrusion 162b, a channel 164, and a ramp 166, all of which are situated on the bottom surface of the middle section 152 of latch member 106. Groove 160a and lug 138a correspond with each other, and groove 160b and lug 138b correspond with each other, such that as grooves 160a and 160b are positioned over lugs 138a and 138b when latch member 106 is pressed down on catch member 104, lugs 138a and 138b go into grooves 160a and 160b and, when properly positioned, secure clamp 100 around the targeted object. When lugs 138a and 138b are secured into grooves 160a and 160b, lugs 138a and 138b apply opposing force against grooves 160a and 160b. For example, in order to have clamp 100 snuggly grip a targeted object in the locked position, a user needs to snap or otherwise secure latch member 106 onto catch member 104. When in the locked position, forces pull latch member 106 and catch member 104 in opposite directions. The design and interaction of groove 160a with lug 138a and groove 160b with lug 138b at least reduces the likelihood of or prevents clamp 100 from unlocking unless a user lifts or otherwise disengages latch member 106 from catch member 104. In one or more embodiments, the opposing force between lugs 138a and 138b and grooves 160a and 160b increases the more a user manipulates fine adjustment mechanism 108 to shrink the circumference of clamp 100 around the targeted object. In one or more embodiments, latch member 106 and catch member 104 lock by using negative angles that have an interference fit and once locked, outward pressure from the object being clamped by clamp 100 (such as a hose) causes the negative angles of latch member 106 and catch member 104 to tighten.

Ramp 140 corresponds with channel 164 such that ramp 140 fits into channel 164 when clamp 100 is in the locked position. Ramp 140 is raised from the top surface of the first end 130 of catch member 104 such that it rests in between right protrusion 162a and left protrusion 162b and at least reduces the likelihood of or prevents latch member 106 from moving horizontally or laterally when clamp 100 is in the locked position. Landing 142 is situated in between lug 138a and lug 138b and corresponds with ramp 166 such that ramp 166 fits in between lug 138a and lug 138b and onto landing 142 when clamp 100 is in the locked position and at least reduces the likelihood of or prevents latch member 106 from moving horizontally or laterally when clamp 100 is in the locked position. Right side surface 144a corresponds with right protrusion 162a such that right protrusion 162a is at least near right side surface 144a when clamp 100 is in the locked position. Left side surface 144b corresponds with left protrusion 162b such that left protrusion 162b is at least near left side surface 144b when clamp 100 is in the locked position. Rib 114c runs along the bottom surface of the first end 148 of latch member 106 to the middle section 152 of latch member 106.

Figure 7:
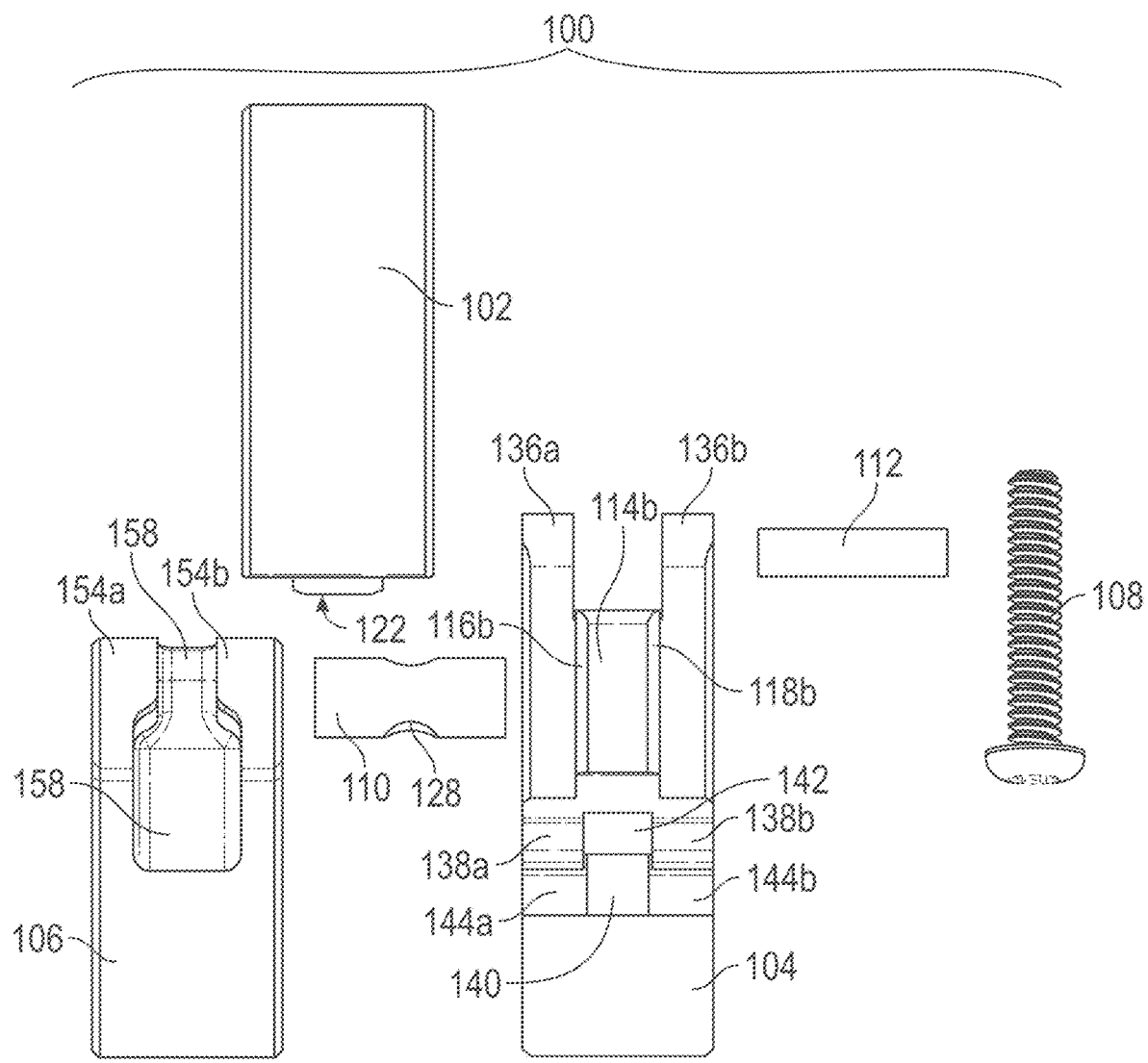
FIG. 7 shows an exploded top view of the clamp of FIG. 1.

FIG. 7 shows an exploded top view of the embodiment of clamp 100 of FIG. 1. The contours of support member 154a, support member 154b and relief cut 158 are designed to receive fine adjustment mechanisms 108 that are of various shapes, types, and sizes, including heads of various shapes, types, and sizes (see FIG. 15)

Figure 8:
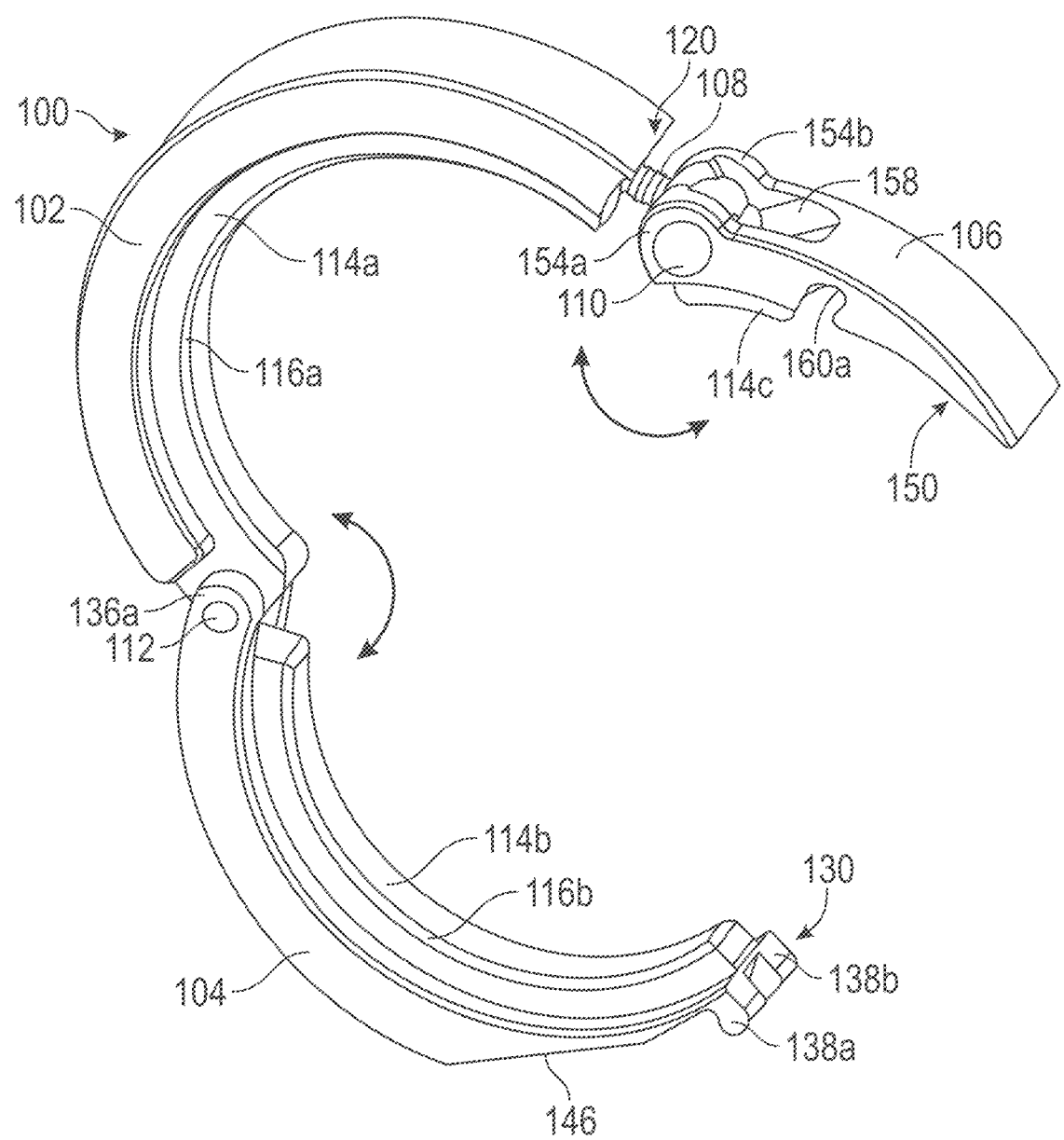
FIG. 8 shows a perspective view of the clamp of FIG. 1 in an opened or unlocked position.

FIG. 8 shows a perspective view of the embodiment of clamp 100 of FIG. 1 in an opened or unlocked position, wherein catch member 104 is operably connected to base member 102 and is pivoting about pin 112 and latch member 106 is operably connected to base member 102 and is pivoting about pin 110.

Figure 9:
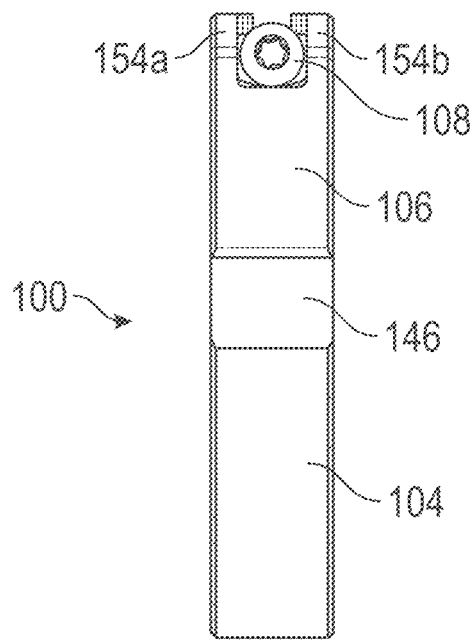
FIG. 9 shows a front view of the clamp of FIG. 1.

FIG. 9 shows a front view of the embodiment of clamp 100 of FIG. 1.

Figure 10:
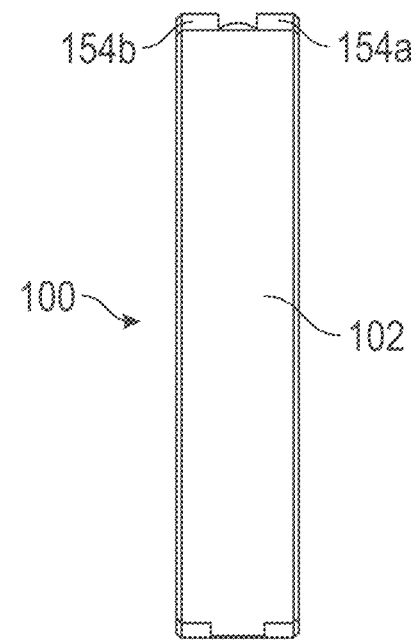
FIG. 10 shows a rear view of the clamp of FIG. 1.

FIG. 10 shows a rear view of the embodiment of clamp 100 of FIG. 1.

Figure 11:
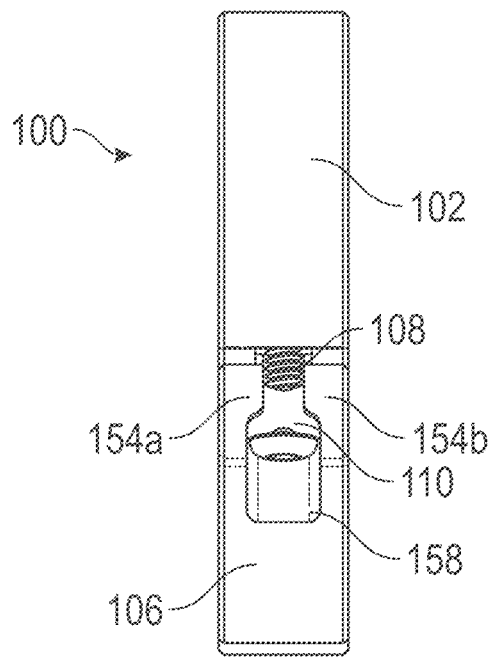
FIG. 11 shows a top view of the clamp of FIG. 1.

FIG. 11 shows a top view of the embodiment of clamp 100 of FIG. 1.

Figure 12:
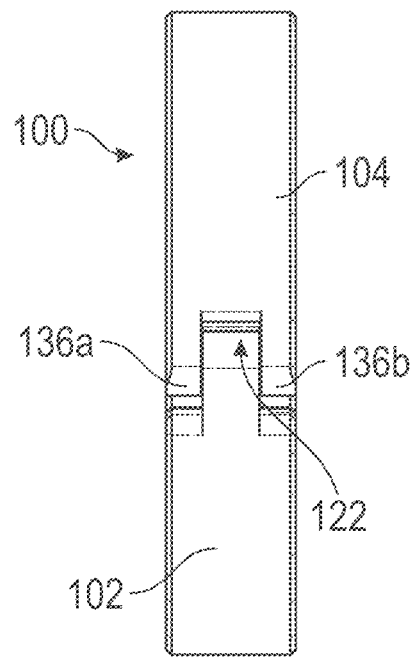
FIG. 12 shows a bottom view of the clamp of FIG. 1.

FIG. 12 shows a bottom view of the embodiment of clamp 100 of FIG. 1.

Figure 13:
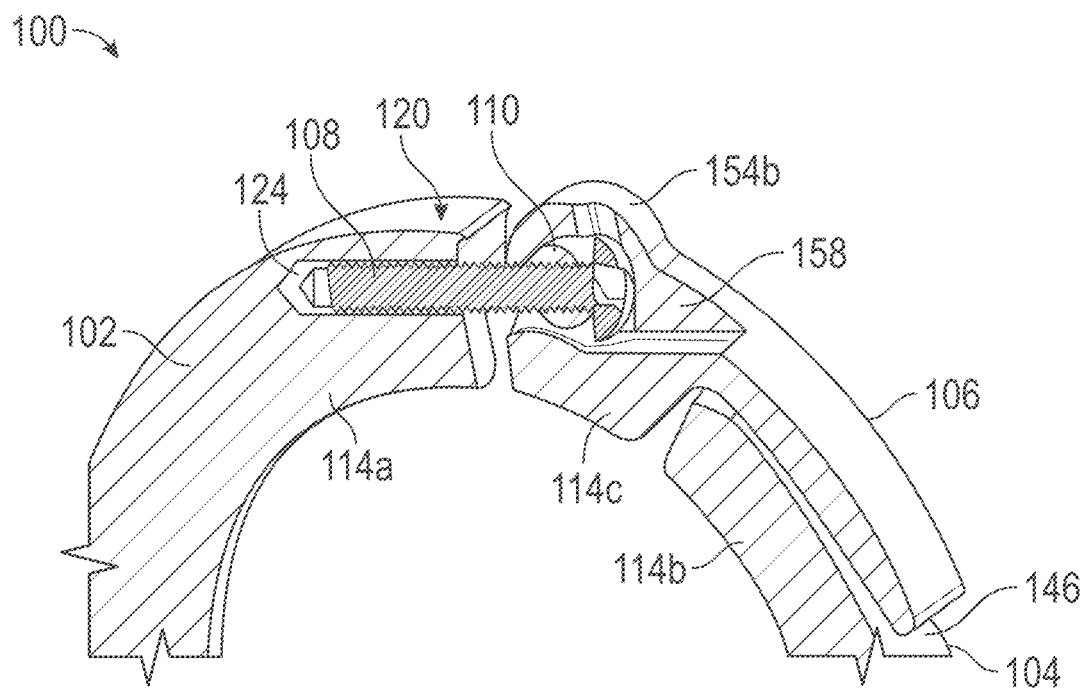
FIG. 13 shows a sectional view of various aspects of an alternative embodiment of an adjustable clamp.

FIG. 13 shows a sectional view of various aspects of an alternative embodiment of adjustable clamp 100. In particular, FIG. 13 shows a section view of embodiments of aspects of base member 102, catch member 104, latch member 106, pin 110 and fine adjustment mechanism 108 in a closed or locked position.

Figure 14:
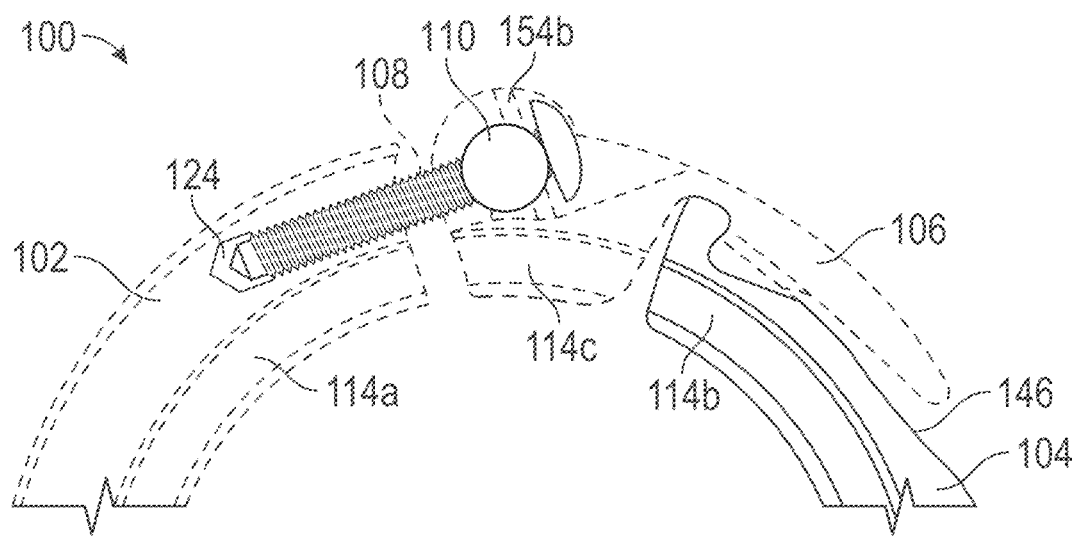
FIG. 14 shows a transparent view of various aspects of an alternative embodiment of an adjustable clamp.

FIG. 14 shows a transparent view of various aspects of an alternative embodiment of adjustable clamp 100. In particular, FIG. 14 shows a transparent view of embodiments of aspects of base member 102 and latch member 106 in a closed or locked position.

Figure 15:
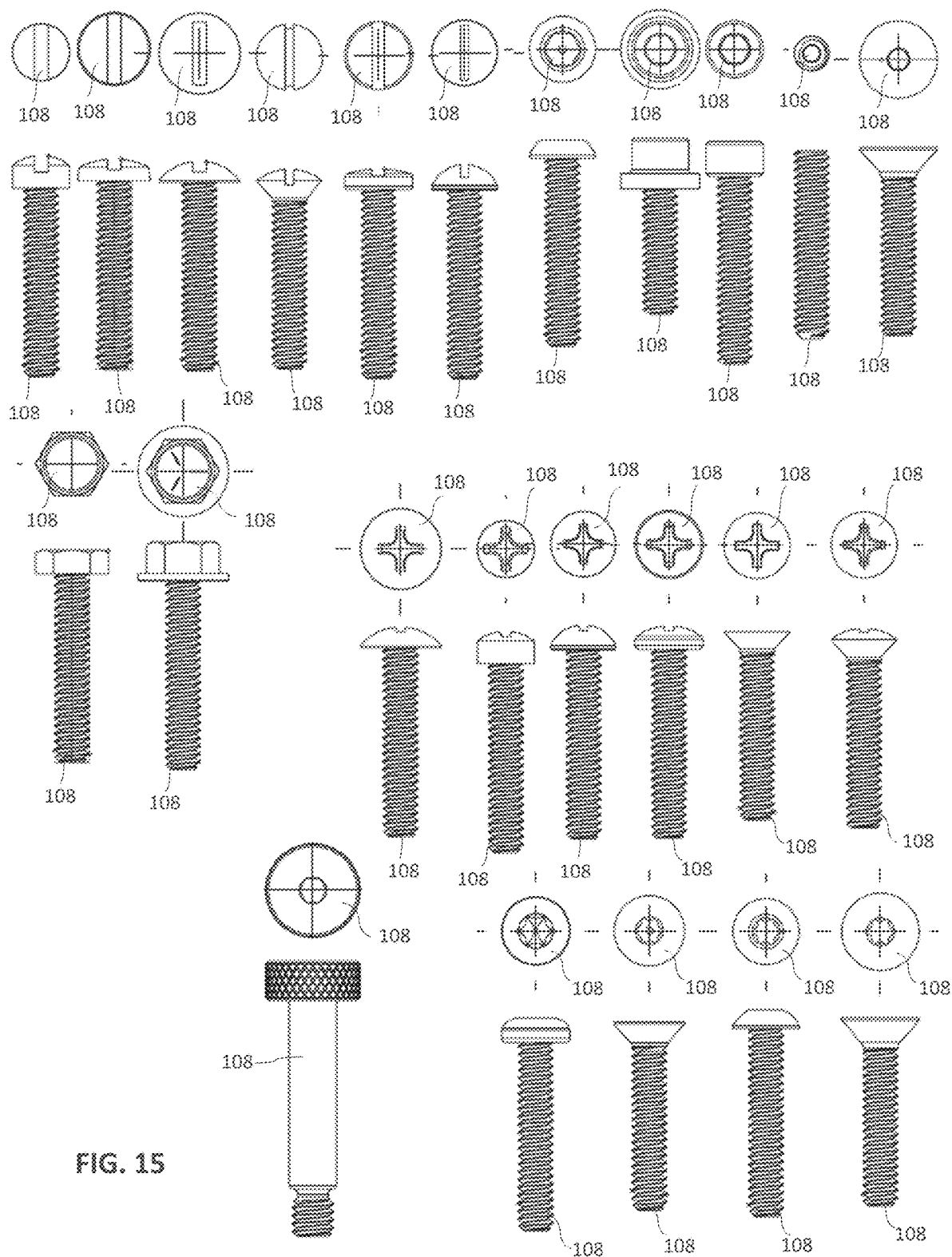
FIG. 15 shows views of different embodiments of fine adjustment mechanisms.

FIG. 15 shows views of different embodiments of fine adjustment mechanism 108. Although the fine adjustment mechanism 108 is shown in other figures herein in the form of a particular bolt possessing a particular head, in other embodiments, as shown in FIG. 15, the type of bolt and the type of head associated with the bolt may vary. In one or more embodiments, fine adjustment mechanism 108 is in the form of at least one of the following: a screw or other devices that provide users the ability to adjust clamp 100 and ensure that it fits tightly around the targeted object or surface.

Figure 16:
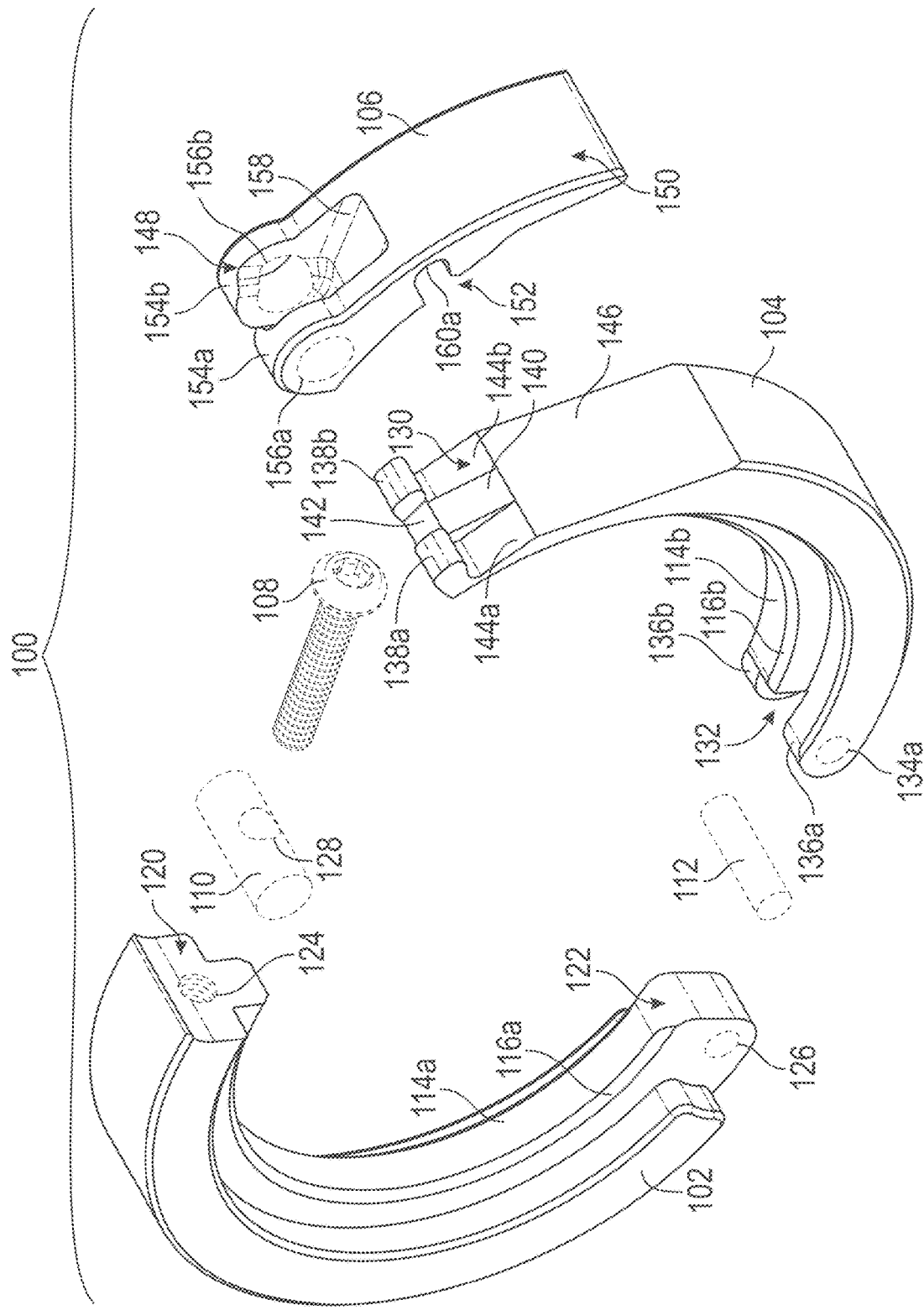
FIG. 16 shows an exploded front perspective view of an alternative embodiment of an adjustable clamp.

FIG. 16 shows an exploded front perspective view of an alternative embodiment of adjustable clamp 100. As shown in FIG. 16, the form, type, size, and shape of fine adjustment mechanism 108, pin 112, pin 110, and openings 124, 126, 134a, 134b (not shown), 156a, 156b and 128 may vary. Although not shown, in one or more embodiments, the form, type, size and shape of base member 102, catch member 104, and latch member 106 may vary.

Figure 17:
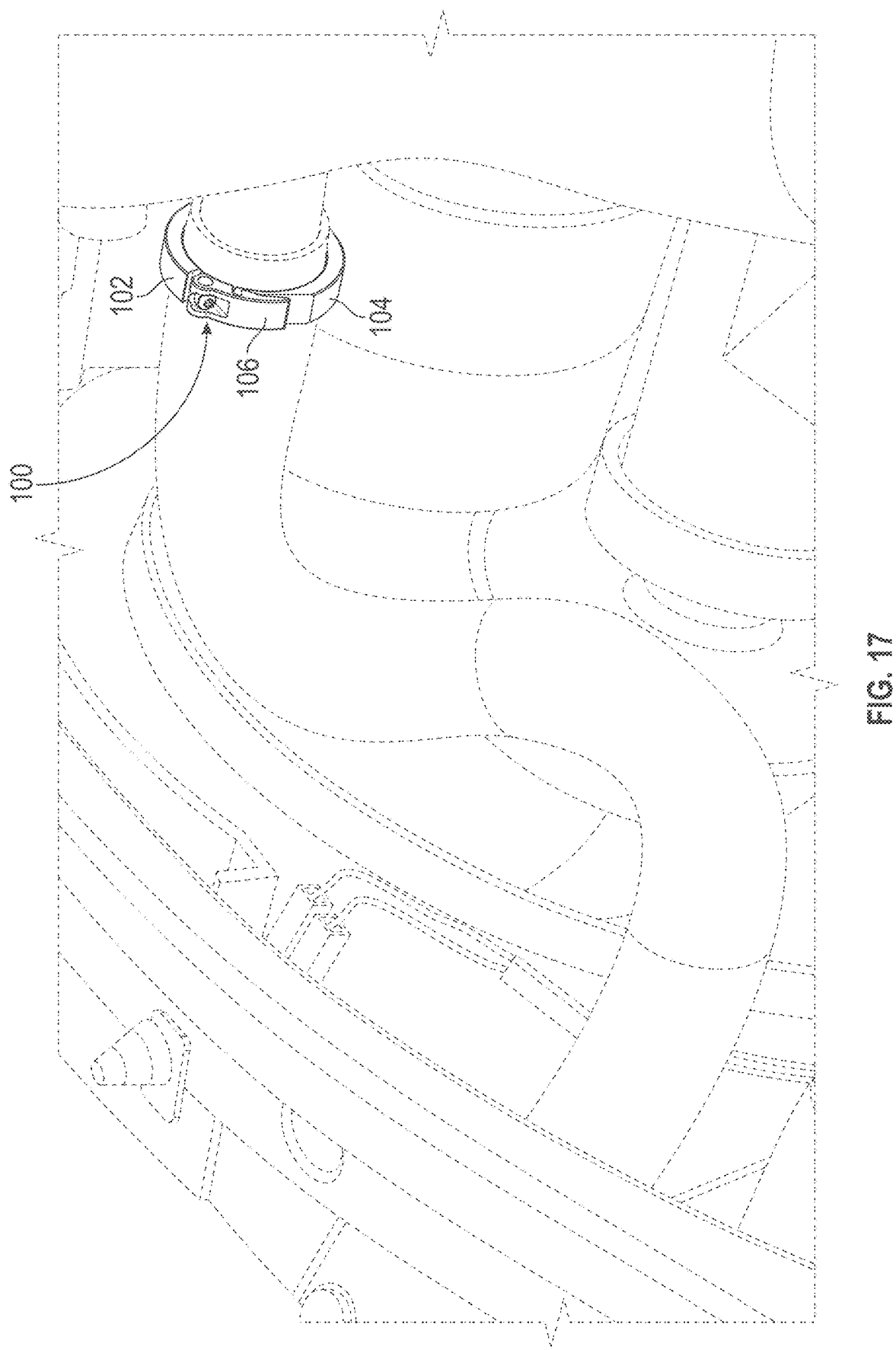
FIG. 17 shows a front perspective view of the clamp of FIG. 1 securing or gripping one embodiment of a radiator hose.

FIG. 17 shows a front perspective view of the embodiment of clamp 100 of FIG. 1 securing or gripping one embodiment of a radiator hose. FIG. 17 also shows other structural elements of a motor and related parts.

Figure 18:
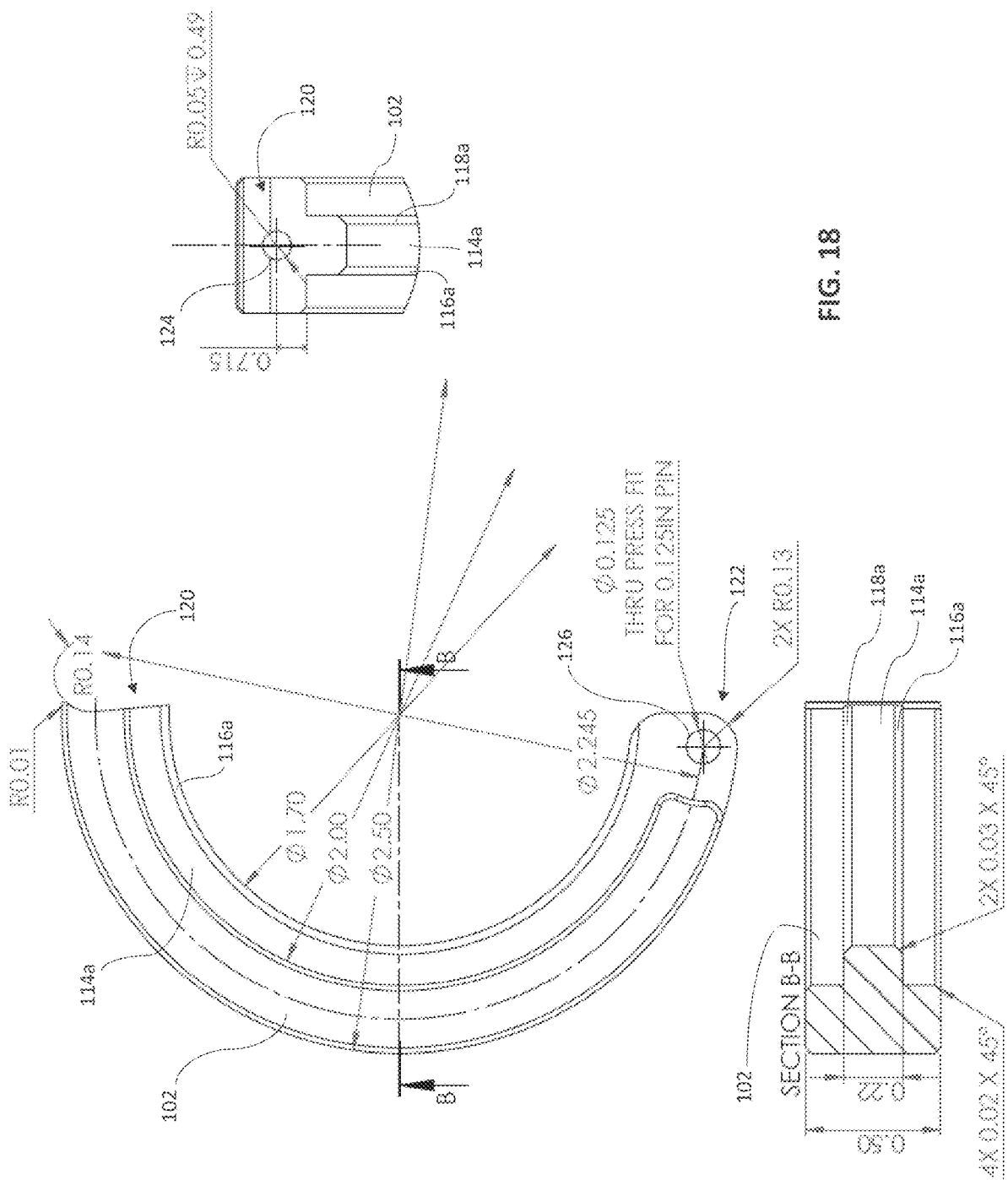
FIG. 18 shows various views of one embodiment of a base member.

FIG. 18 shows a side view and two sectional views of one embodiment of base member 102 and other aspects of clamp 100, along with certain dimensions associated with the same. As shown in FIG. 18, in one embodiment, in the locked position the inside diameter of clamp 100 is about 1.70 inches, the outer diameter of clamp 100 is about 2.50 inches, and the diameter of base member 102, catch member 104 (not shown) and latch member 106 (not shown) from their shoulders is about 2.00 inches. As shown in FIG. 18, in one embodiment, the center of opening 126 is situated at a diameter of about 2.245 inches on base member 102, the diameter of opening 126 is about 0.125 inches, and opening 126 is configured through second end 122 of base member 102 such that a pin 112 that is about 0.125 inches in diameter is able to be press fitted through opening 126. As shown in FIG. 18, in one embodiment, the radius of the profile of first end 120 of base member 102 is about 0.14 inches. As shown in FIG. 18, in one embodiment, the radius of opening 124 is about 0.05 inches and opening 124 is about 0.49 inches deep. As shown in FIG. 18, in one embodiment, the width of base member 102 is about 0.50 inches, the width of rib 114a is about 0.22 inches, base member 102 has four chamfers that are about 0.02 inches and at about 45-degree angles, and rib 114a has two chamfers (chamfers 116a and 118a) that are about 0.03 inches and at about 45-degree angles.

Although FIG. 18 shows certain dimensions associated with the shown embodiment of base member 102 and other aspects of clamp 100, in other embodiments, base member 102 and other aspects of clamp 100 possess dimensions alternative to those shown in FIG. 18. For example, in one or more embodiments, the center of opening 126 is situated at any location on base member 102 that is appropriate. In one or more embodiments, the diameter of opening 126 is determined by the diameter of the pin 112 used. In one or more embodiments, the diameter of opening 126 is between about 0.062 inches to about 1.0 inch. In one or more embodiments, opening 126 is configured to engage a pin 112 that is about 0.062 inches to about 1.0 inch in diameter. In one or more embodiments, pin 112 engages opening 126 via something other than a press fit or interference fit, such as a slip fit. In one or more embodiments, pin 112 is in the form of a bolt with a nut, a threaded bolt, or some other device that is sufficient to allow base member 102 to pivot about pin 112. In one or more embodiments, the radius of the profile of first end 120 of base member 102 is about 0.001 inches to about 8 inches. In one or more embodiments, first end 120 has no radius and is flat. In one or more embodiments, first end 120 is ovular, concave, convex, asymmetric or some other configuration. In one or more embodiments, the radius of opening 124 is about 0.062 inches to about 1.0 inch in diameter and about 0.250 inches to about 1.5 inches deep.

Figure 19:
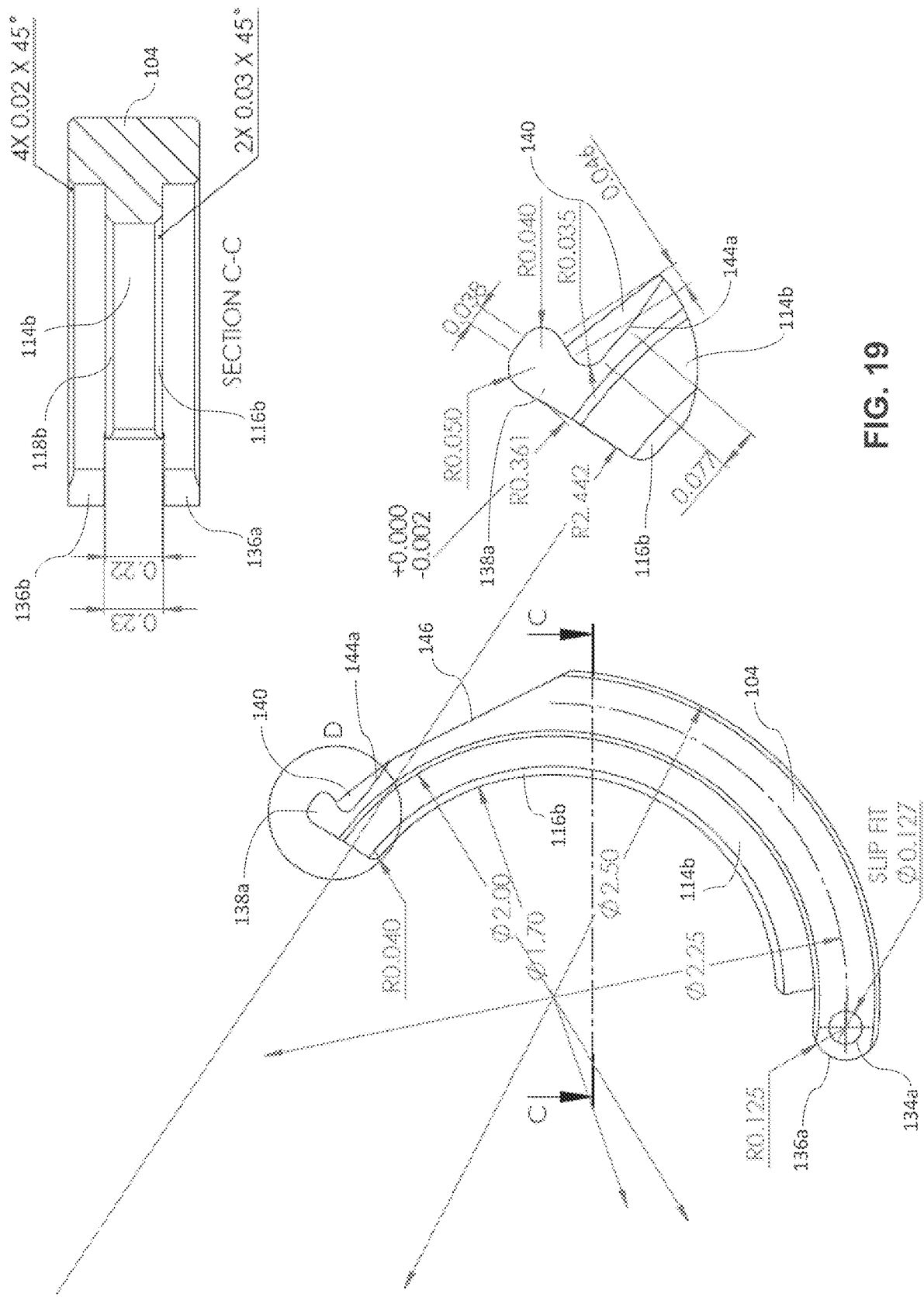
FIG. 19 shows various views of one embodiment of a catch member.

FIG. 19 shows a side view, a detailed view and a sectional view of one embodiment of catch member 104 and other aspects of clamp 100, along with certain dimensions associated with the same. As shown in FIG. 19, in one embodiment, in the locked position the inside diameter of clamp 100 is about 1.70 inches, the outer diameter of clamp 100 is about 2.50 inches, and the diameter of base member 102 (not shown), catch member 104 and latch member 106 (not shown) from their shoulders is about 2.00 inches. As shown in FIG. 19, in one embodiment, the center of opening 134a and opening 134b (not shown) are situated at a diameter of about 2.25 inches on catch member 104, the diameter of opening 134a and opening 134b (not shown) are about 0.125 inches, and opening 134a and opening 134b (not shown) are configured through wings 136a and 136b, respectively, of the second end 132 of catch member 104 such that a pin 112 that is about 0.127 inches in diameter can be press fitted through opening 134a and opening 134b (not shown). As shown in FIG. 19, in one embodiment, the width (not shown) of catch member 104 is about 0.50 inches, the width of rib 114b is about 0.22 inches, and the width of the space between wings 136a and 136b is about 0.23 inches. As shown in FIG. 19, in one embodiment, catch member 104 has four chamfers that are about 0.02 inches and at about 45-degree angles, and rib 114b has two chamfers (chamfers 116b and 118b) that are about 0.03 inches and at about 45-degree angles. As shown in FIG. 19, in one embodiment, lug 138a and lug 138b (not shown) possess multiple surfaces with multiple radiuses and dimensions.

Although FIG. 19 shows certain dimensions associated with the shown catch member 104 and other aspects of clamp 100, in other embodiments, catch member 104 and other aspects of clamp 100 possess dimensions alternative to those shown in FIG. 19. For example, in one or more embodiments, the center of opening 134a and opening 134b are situated at any location on catch member 104 that is appropriate. In one or more embodiments, the diameter of opening 134a and opening 134b are determined by the diameter of the pin 112 used. In one or more embodiments, the diameter of opening 134a and opening 134b are between about 0.062 inches to about 1.0 inch. In one or more embodiments, the diameter of opening 134a and opening 134b are configured to engage a pin 112 that is about 0.062 inches to about 1.0 inch in diameter. In one or more embodiments, pin 112 engages opening 134a and opening 134b via something other than a press fit or interference fit, such as a slip fit. In one or more embodiments, pin 112 is in the form of a bolt with a nut, a threaded bolt, or some other device that is sufficient to allow catch member 104 to pivot about pin 112. In one or more embodiments, the surfaces of lug 138a and lug 138b (not shown) possess other radiuses and dimensions that correspond to aspects of latch member 106 and aid in allowing clamp 100 to be placed in and remain in a locked position.

Figure 20:
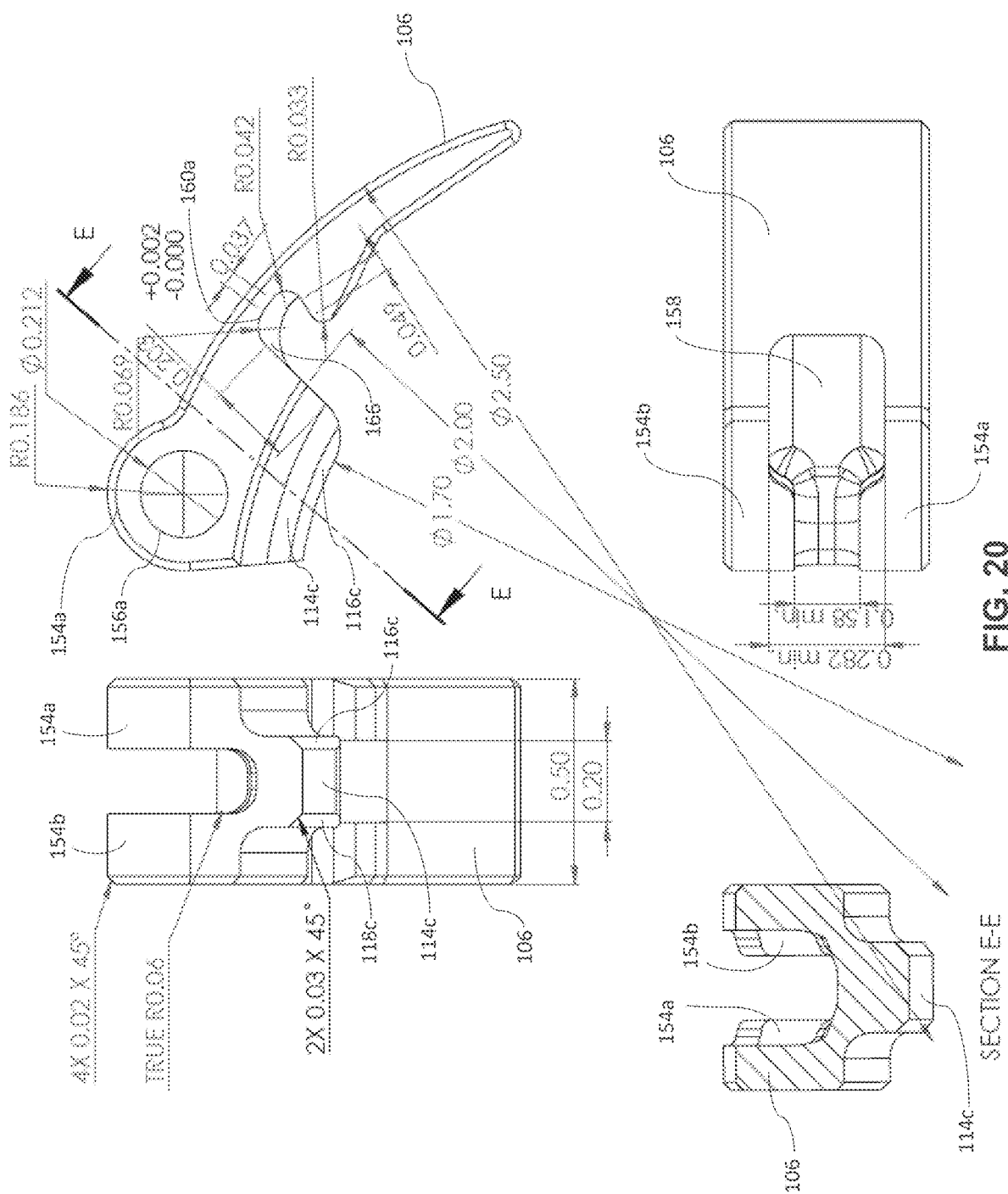
FIG. 20 shows various views of one embodiment of a latch member.

FIG. 20 shows a side view, a top view, a rear view, and a sectional view of one embodiment of latch member 106 and other aspects of clamp 100, along with certain dimensions associated with the same. As shown in FIG. 20, in one embodiment, in the locked position the inside diameter of clamp 100 is about 1.70 inches, the outer diameter of clamp 100 is about 2.50 inches, and the diameter of base member 102 (not shown), catch member 104 (not shown) and latch member 106 from their shoulders is about 2.00 inches. As shown in FIG. 20, in one embodiment, the diameter of opening 156a and opening 156b (not shown) of support member 154a and support members 154b (not shown), respectively, are about 0.212 inches. As shown in FIG. 20, in one embodiment, latch member 106 has four chamfers that are about 0.02 inches and at about 45-degree angles and rib 114c has two chamfers (chamfers 116c and 118c) that are about 0.03 inches and at about 45-degree angles. As shown in FIG. 20, in one embodiment, the width of the relief cut 158 of latch member 106 is about 0.158 inches and the space between support member 154a and support members 154b is about 0.282 inches. As shown in FIG. 20, in one embodiment, relief cut 158 includes a true radius of 0.06 inches. As shown in FIG. 20, in one embodiment, latch member 106 possesses multiple surfaces with multiple radiuses and dimensions.

Although FIG. 20 shows certain dimensions associated with the shown latch member 106 and other aspects of clamp 100, in other embodiments, latch member 106 and other aspects of clamp 100 possess dimensions alternative to those shown in FIG. 20. For example, in one or more embodiments, the diameter of opening 156a and opening 156b of support member 154a and support members 154b, respectively, are determined by the diameter of the pin 110 used. In one or more embodiments, the diameter of opening 156a and opening 156b are between about 0.167 inches to about 1.25 inches. In one or more embodiments, the width of the space between support member 154a and support members 154b is determined by the diameter of the shaft of the fine adjustment mechanism 108 used. In one or more embodiments, the width of the relief cut 158 is determined by the diameter of the head of the fine adjustment mechanism 108 used. In one or more embodiments, relief cut 158 is between about 0.200 inches to about 1.375 inches wide. In one or more embodiments, relief cut 158 includes a radius of between about 0.015 inches to about 0.5 inches. In one or more embodiments, pin 110 engages opening 156a and opening 156b. In one or more embodiments, pin 110 is something other than a dowel that is sufficient to allow latch member 106 to pivot about pin 110. In one or more embodiments, the surfaces of latch member 106 possess other radiuses and dimensions that correspond to aspects of catch member 104 and aid in allowing clamp 100 to be placed in and remain in a locked position.

Figure 21:
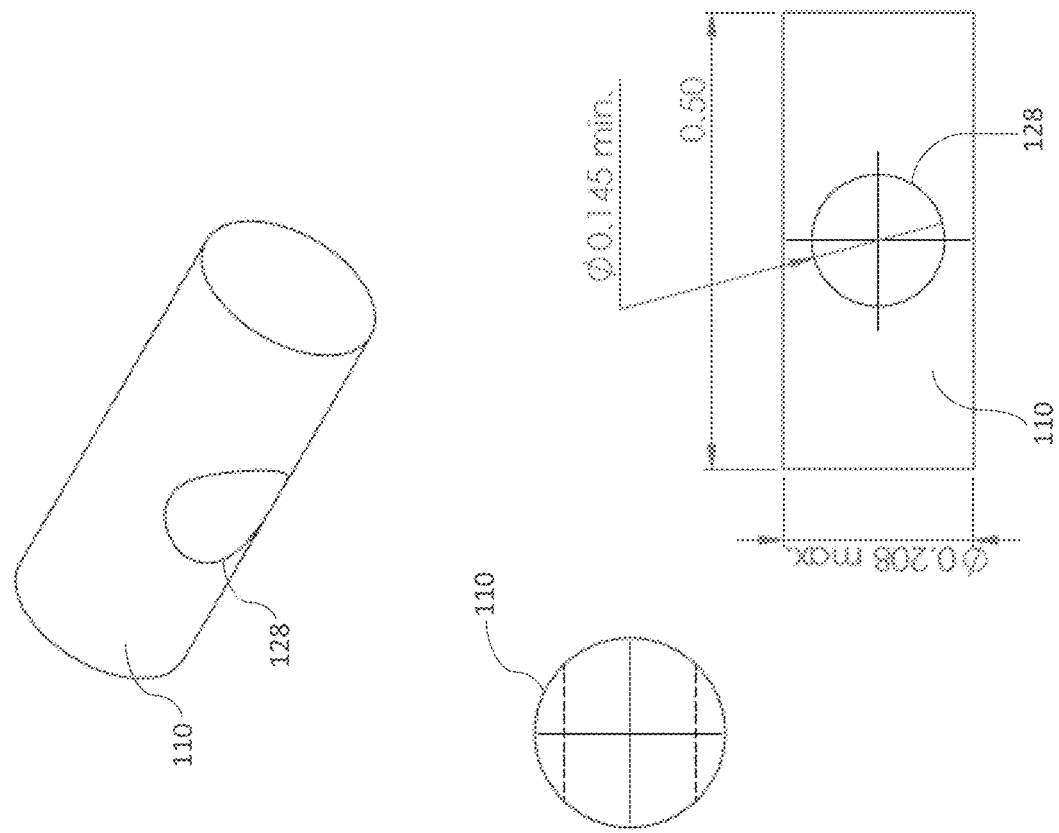
FIG. 21 shows various views of one embodiment of a second pin.

FIG. 21 shows a perspective view, a front view, and a side view of one embodiment of pin 110, along with certain dimensions associated with the same. As shown in FIG. 21, in one embodiment, the diameter of pin 110 is about 0.208 inches, the diameter of opening 128 of pin 110 is about 0.145 inches, and the length of pin 110 is about 0.50 inches. Although FIG. 21 shows certain dimensions associated with the shown pin 110, in other embodiments, pin 110 possesses dimensions alternative to those shown in FIG. 21. For example, in one or more embodiments, the diameter of pin 110 is between about 0.167 inches to about 1.25 inches. In one or more embodiments, the diameter of opening 128 of pin 110 is determined by the size of the fine adjustment mechanism 108 used. In one or more embodiments, fine adjustment mechanism 108 is slip fitted through pin 110. In one or more embodiments, fine adjustment mechanism 108 is threaded through pin 110. In one or more embodiments, the diameter of opening 128 of pin 110 is between about 0.062 inches to about 1.0 inch, and the length of pin 110 is between about 0.25 inches to about 3.0 inches.

Figure 22:
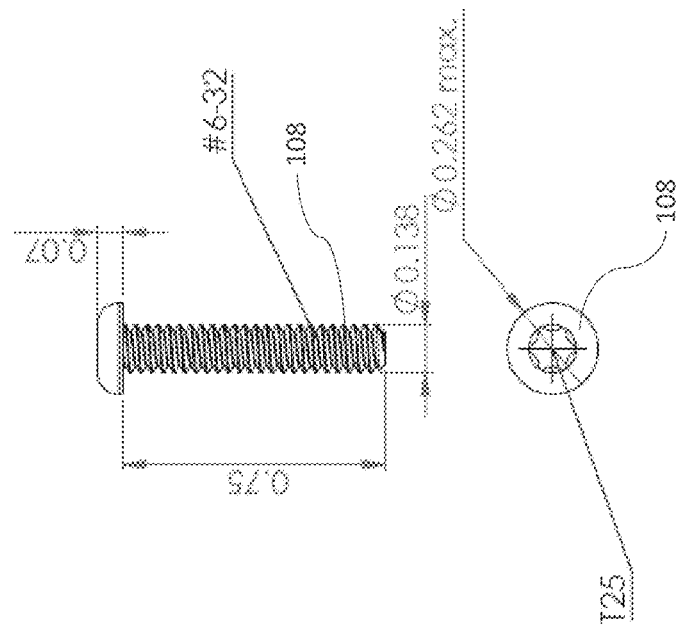
FIG. 22 shows various views of one embodiment of a fine adjustment mechanism.

FIG. 22 shows a side view and a front view of one embodiment of fine adjustment mechanism 108, along with certain dimensions associated with the same. As shown in FIG. 22, in one embodiment, fine adjustment mechanism 108 is in the form of a #6-32 screw, its entire length is about 0.82 inches, the length of its shaft is about 0.75 inches, the length of its head is about 0.07 inches, the diameter of its threaded portion is about 0.138 inches, and the diameter of its head is about 0.262 inches. Although FIG. 22 shows certain dimensions associated with the shown fine adjustment mechanism 108, in other embodiments, fine adjustment mechanism 108 possesses dimensions alternative to those shown in FIG. 22. For example, in one or more embodiments, fine adjustment mechanism 108 is in the form of some other screw, bolt or thing that aids clamp 100 in being able to be micro or fine adjusted. In one or more embodiment, as with other aspects of clamp 100, the dimensions of fine adjustment mechanism 108 can vary. For example, in one or more embodiment, the diameter of the threaded portion of fine adjustment mechanism 108 is between about 0.062 inches to about 1.0 inch, the length the shaft of fine adjustment mechanism 108 is between about 0.250 inches to about 1.5 inches, and the diameter of the head fine adjustment mechanism 108 is between about 0.200 inches and about 1.375 inches. In one or more embodiment, the diameter of the head of fine adjustment mechanism 108 is determined by the width of relief cut 158. In one or more embodiment, the length of the shaft of fine adjustment mechanism 108 is determined by the depth of opening 124 of base member 102. In one or more embodiment, the diameter of fine adjustment mechanism 108 is determined by the diameter of opening 124 of base member 102.

Although FIGS. 18-22 show various aspects of clamp 100 possessing certain dimensions, in other embodiments, those aspects of clamp 100 possess dimensions alternative to those shown in FIGS. 18-22. For example, in one or more embodiments, in the locked position the inner diameter of clamp 100 is between about 0.375 inches to about 8 feet, the outer diameter of clamp 100 is between about 0.375 inches to any appropriate size (such as about 9 feet), and the diameter from the shoulders of base member 102, catch member 104 and latch member 106 is between about 0.375 inches to about 8.5 feet. In one or more embodiments, the width of clamp 100 is about 0.25 inches to about 3.0 inches and the width of rib 114a, rib 114b, and rib 114c is about 0.25 inches to about 3.0 inches. In one or more embodiments, clamp 100 has one or more chamfers (such as chamfers 116a, 116b, 116c, 118a, 118b, and 118c) that are about 0.001 inches to about 0.062 inches. In one or more embodiments, any chamfer associated with clamp 100 may be configured at any angle. In one or more embodiments, clamp 100 does not have any chamfers. Although FIGS. 18-22 show various maximum and minimum values and limits, in one or more embodiments, such values and limits are increased, decreased, or eliminated.

FIG. 23 is a flow diagram that depicts one embodiment of a method 1000 for using clamp 100. The method 1000 for using clamp 100 as illustrated in flow diagram FIG. 23 may be customized, flexible, and adapted to various circumstances and situations.

In step 1002, a user enters method 1000. In one or more embodiments, a user enters method 1000 at step 1002 possessing a clamp 100 and desiring to place it around a targeted object (such as a hose on an engine) in a locked position, as well as possessing a common vice grip, channel lock, needle nose pliers or other pliers or tool that will be used to squeeze clamp 100 into place during its installation or adjustment.

In step 1004, the user wraps clamp 100 around the targeted object and squeezes it around the targeted object with the vice grip or other tool such that ribs 114a and 114b engage the targeted object.

In step 1006, the user, while continuing to squeeze clamp 100 around the targeted object with the vice grip or other tool, causes latch member 106 to snap onto or otherwise engage catch member 104 in the locked position such that rib 114c engages the targeted object and such that lugs 138a and 138b are respectively situated in grooves 160a and 160b in the locked position.

In step 1008, the user adjusts clamp 100 by turning the head of fine adjustment mechanism 108 until the diameter or circumference of the clamp 100 around the targeted object ensures that the clamp 100 has a tight grip on the targeted object. In one or more embodiments, in step 1008, the user adjusts the fine adjustment mechanism 108 to ensure that the clamp 100 is not over or under tightened. In one or more embodiments, step 1008 is optional. In one or more embodiments, step 1008 is not necessary.

In step 1010, the user removes clamp 100 by disengaging latch member 106 from catch member 104 and removing clamp 100 from around the targeted object. In one or more embodiments, clamp 100 is removed by placing a screwdriver, flat tool (such as a flat headed screwdriver) or other device in between the bottom surface of latch member 106 and top surface of catch member 104 in order to lift, pry or pop or otherwise unlock or release latch member 106 from catch member 104. The user repeats steps 1004-1010 as desired and, when done, the process ends at step 1012. In one or more embodiments, step 1010 is optional. In one or more embodiments, step 1010 is not necessary.

In one or more embodiments, method 1000 includes none or some of the steps stated herein, or additional steps not specifically stated herein. In one or more embodiments, the steps of method 1000 are performed in an alternative sequence as compared to that which is stated herein.

FIG. 24 is a flow diagram that depicts one embodiment of a method 1500 for using clamp 100. The method 1500 for using clamp 100 as illustrated in flow diagram FIG. 24 may be customized, flexible, and adapted to various circumstances and situations.

In step 1502, a user enters method 1500. In one or more embodiments, a user enters method 1500 at step 1502 possessing a clamp 100 and desiring to place it around a targeted object (such as a hose on an engine) in a locked position, as well as possessing a common vice grip, channel lock, needle nose pliers or other pliers or tool that will be used to squeeze clamp 100 into place during its installation or adjustment.

In step 1504, the user adjusts clamp 100 by turning the head of fine adjustment mechanism 108 until the diameter or circumference of the clamp 100 (that will be placed around the targeted object) is sized sufficient to ensure that the clamp 100 will have a tight grip on the targeted object. In one or more embodiments, in step 1504, the user adjusts the fine adjustment mechanism 108 to ensure that the clamp 100 is not over or under tightened. In one or more embodiments, step 1504 is optional. In one or more embodiments, step 1504 is not necessary.

In step 1506, the user wraps clamp 100 around the targeted object and squeezes it around the targeted object with the vice grip or other tool such that ribs 114a and 114b engage the targeted object.

In step 1508, the user, while continuing to squeeze clamp 100 around the targeted object with the vice grip or other tool, causes latch member 106 to snap onto or otherwise engage catch member 104 in the locked position such that rib 114c engages the targeted object and such that lugs 138a and 138b are respectively situated in grooves 160a and 160b in the locked position.

In step 1510, the user removes clamp 100 by disengaging latch member 106 from catch member 104 and removing clamp 100 from around the targeted object. In one or more embodiments, clamp 100 is removed by placing a screwdriver, flat tool (such as a flat headed screwdriver) or other device in between the bottom surface of latch member 106 and top surface of catch member 104 in order to lift, pry or pop or otherwise unlock or release latch member 106 from catch member 104. The user repeats steps 1504-1510 as desired and, when done, the process ends at step 1512. In one or more embodiments, step 1510 is optional. In one or more embodiments, step 1510 is not necessary.

In one or more embodiments, method 1500 includes none or some of the steps stated herein, or additional steps not specifically stated herein. In one or more embodiments, the steps of method 1500 are performed in an alternative sequence as compared to that which is stated herein.

FIGS. 25-43 show views of various embodiments of a quick release clamp 200 and embodiments of aspects thereof that provide users the ability to quickly release clamp 200 from around a targeted object and the ability to easily adjust its location on the targeted object after it has initially been installed around the targeted object. Clamp 200 is designed to be secured around surfaces of various shapes, such as circular, oval, or other shaped objects. Clamp 200 is manufacturable to various sizes depending on the size of the targeted object. For example, the standard roll bar for RZR's® and Can-Am's® is 1.75 inches in diameter. In addition, RZR's® and Can-Am's® include cross member pipes that are typically 1.5 inches in diameter. One embodiment of clamp 200 is designed to be secured around the 1.75 inched standard roll bar for RZR's® and Can-Am's® and another embodiment of clamp 200 is designed to be secured around the 1.5 inched cross member pipes. In another example, the standard roll bar for Jeeps is 2.25 inches in diameter. One embodiment of clamp 200 is designed to be secured around the 2.25 inched standard roll bar for Jeeps. In one or more embodiments, clamp 200 is designed to fit around objects of any diameter between about 0.13 inches to about 96 inches. Clamp 200 is designed to allow numerous accessories, such as fire extinguishers, GoPro's®, speakers, wires, light bars, safety nets, water containers, first aid or safety kits, windshields, range finders, hunting accessories, racks, mirrors, handles, hooks, eye bolts, cargo nets, gas tanks, tools, and equipment (such as shovels, lifts, tool boxes, etc.), storage boxes, flags, license plates, spare tires, and other accessories, to be operably connected to it. Clamp 200 is designed to provide users the ability to quickly remove it from the object it is clamped to for various purposes. For example, once a user has mounted a GoPro® to clamp 200 and installed clamp 200 around a roll bar of a RZR®, the user may wish to quickly remove the GoPro® from the roll bar or adjust its location on the roll bar for any number of reasons, such as to prevent theft or to change its view point. In another example, once a user has mounted a fire extinguisher to clamp 200, and installed clamp 200 around a roll bar of a RZR®, the user may need to quickly remove the fire extinguisher to put out a fire. In another example, once a user has mounted Bose® speakers to clamp 200, and installed clamp 200 around a roll bar of a RZR®, the user may need to quickly remove the speakers when he or she is done using the RZR® in order to prevent theft or to protect the speakers when hauling the RZR®.

Figure 25:
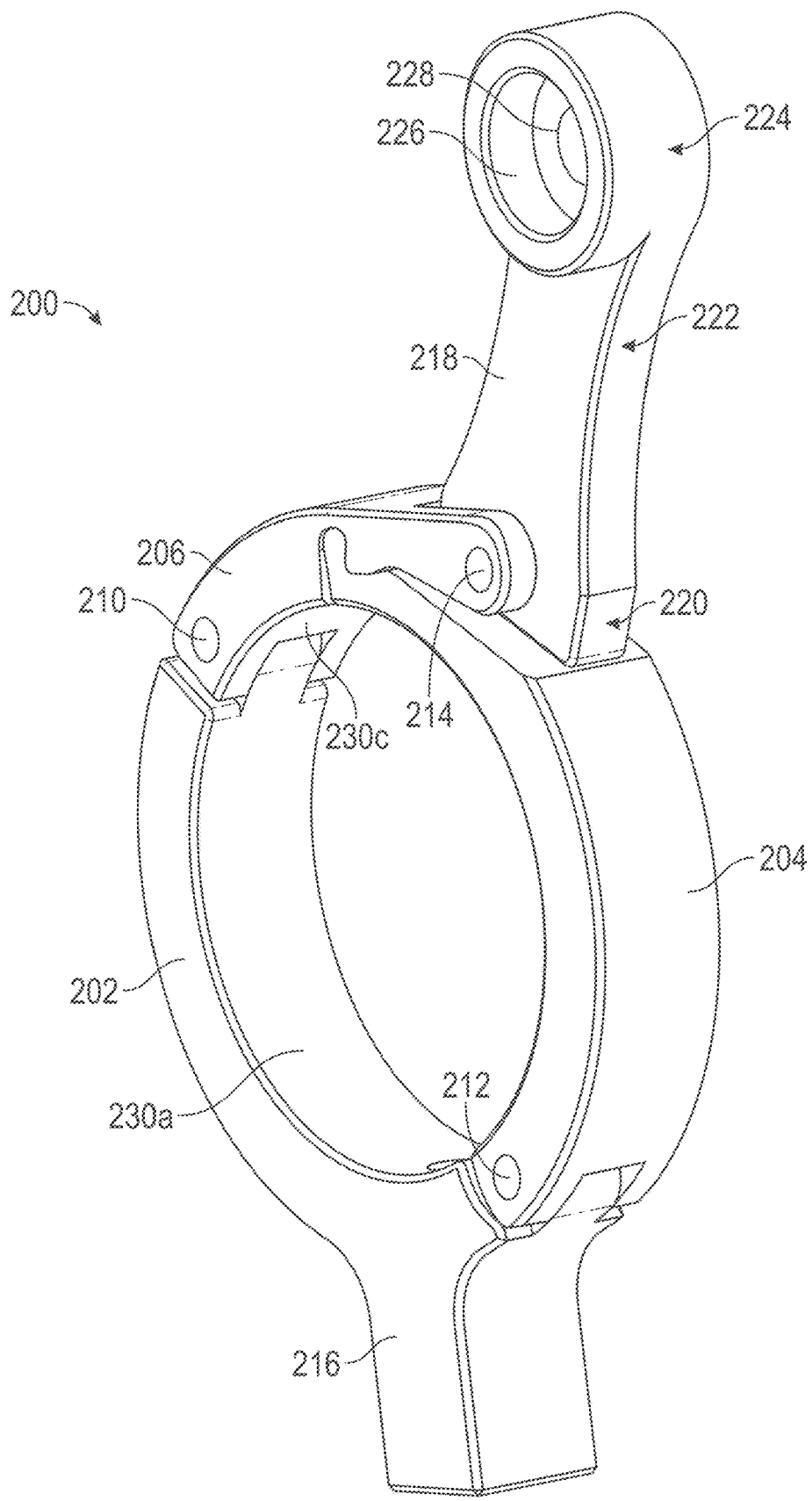
FIG. 25 shows a front perspective view of one embodiment of a quick release clamp.

FIG. 25 shows a front perspective view of one embodiment of clamp 200. Clamp 200 includes a base member 202, a catch member 204, a latch member 206, a pin 210, a pin 212, a quick release mechanism 218 and a pin 214. Like clamp 100, clamp 200 is designed to hinge or pivot open so that it is easily placed around a targeted object without requiring the targeted object to be removed prior to installing clamp 200. For example, as shown in FIG. 25, catch member 204 is operably connected to base member 202 via pin 212 in such a way that allows catch member 204 and base member 202 to pivot about pin 212 so that it can be easily placed around a targeted object without first requiring the targeted object to be removed before installing clamp 200 around it. In other embodiments, catch member 204 is operably connected to base member 202 via something other than pin 212. Latch member 206 is operably connected to base member 202 via pin 210 in such a way that allows latch member 206 and base member 202 to pivot about pin 210 so that it can be easily placed around a targeted object without first requiring the targeted object to be removed before installing clamp 200. In other embodiments, latch member 206 is operably connected to base member 202 via something other than pin 210.

Unlike in clamp 100, base member 202, catch member 204 and latch member 206 of clamp 200 do not include ribs 114*a*, 114*b* and 114*c*. Rather, each said member of clamp 200 includes a flat inner surface. Base member 202 includes inner surface 230*a*, catch member 204 includes inner surface 230*b* (see FIG. 26), and latch member 206 includes inner surface 230*c*. Inner surfaces 230*a*, 230*b* and 230*c* are situated on the inside surface of their respective members such that when clamp 200 is in a locked position, the inner surfaces 230*a*, 230*b* and 230*c* form a circumference of at least a partial circle designed to contact and substantially encircle at least a portion of a targeted object. Clamp 200 is designed to grip metal, plastic, wood, or other hard surfaces. In other embodiments, clamp 200 is intended to grip rubber or other malleable surfaces. In other embodiments, clamp 200 also includes ribs 114*a*, 114*b* and 114*c*, which aid in gripping rubber or other malleable surfaces. In one or more embodiments, gripping material (such as rubber, plastic, Plasti Dip®, Flexall®, rhino lining, duct tape, or any other material) is applied to inner surfaces 230*a*, 230*b* and 230*c* in order to aid clamp 200 in gripping targeted objects.

Base member 202 includes a mount member 216 that extends from its top surface and which is proximal to second end 242 (see FIG. 29) and which is designed to provide users the ability to operably connect clamp 200 to other devices or things, such as fire extinguishers, fire extinguisher retainers (such as fire extinguisher retainer 302), GoPro's®, speakers, wires, light bars, safety nets, water containers, first aid or safety kits, windshields, range finders, hunting accessories, racks, mirrors, handles, hooks, eye bolts, cargo nets, gas tanks, tools and equipment (such as shovels, lifts, tool boxes, etc.), storage boxes, flags, license plates, spare tires, and other accessories. Mount member 216 is customizable and may assume various forms, shapes, and sizes for various purposes, such as to operably connect to various other devices or things.

Quick release mechanism 218 provides users the ability to quickly release clamp 200 from engaging a targeted object or surface. Quick release mechanism 218 is customizable and can assume various shapes, forms and sizes depending on the need. As shown in FIG. 25, quick release mechanism 218 includes a base portion 220, an arm portion 222, and a handle portion 224. The handle portion 224 of quick release mechanism 218 includes a recess 226 and an opening 228 for receiving and operably connecting screws, bolts, rope, carabineers, poles, bars (such as bar 308 shown in FIG. 43) or other objects to clamp 200 for various purposes, such as for providing users additional leverage for unlocking clamp 200.

In one or more embodiments, clamp 200 does not include fine adjustment mechanism 208. In other embodiments, clamp 200 includes a fine adjustment mechanism 208. In other embodiments, clamp 200 is designed without a mount member 216. Although not shown in FIGS. 1-22, in other embodiments, clamp 100 includes at least one of the following: mount member 216 or quick release mechanism 218. In one or more embodiments, clamp 200 is machined to the size of the targeted object so that it cannot be over or under tightened. In one or more embodiments, pin 212, pin 214 and pin 210 assume the form of dowels. In other embodiments, pin 212, pin 214 and pin 210 assume the form of something other than dowels. In other embodiments, at least one of the following assume the form of something other than a dowel: pin 212, pin 214 and pin 210.

Figure 26:
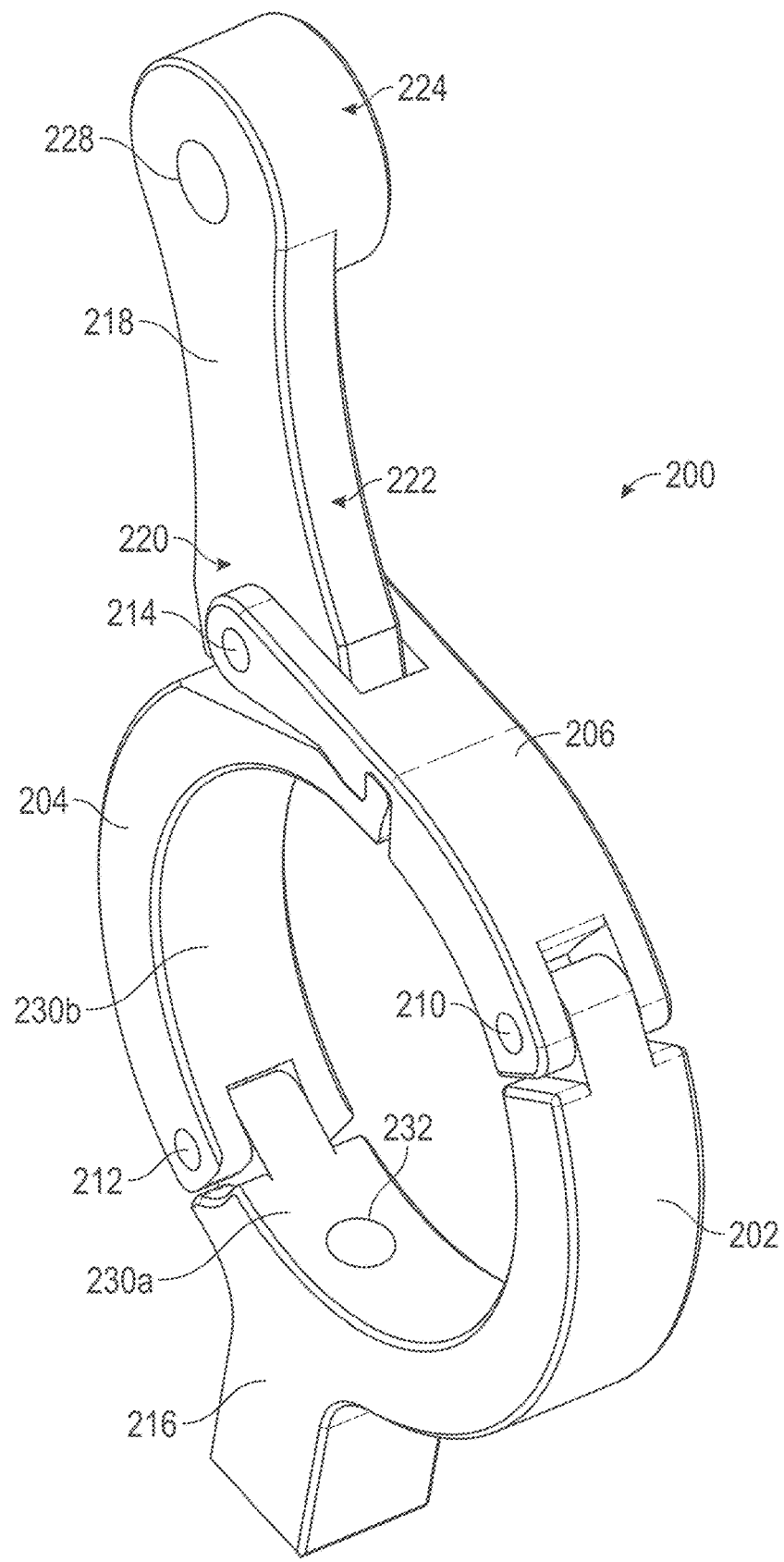
FIG. 26 shows a rear perspective view of the clamp of FIG. 25.

FIG. 26 shows a rear perspective view of the embodiment of clamp 200 of FIG. 25. Base member 202 includes an opening 232 which runs from inner surface 230a of base member 202 continuously through and out of mount member 216 such that a user may insert a bolt or other item through opening 232 to operably connect or mount various devices or things to clamp 200.

Figure 27:
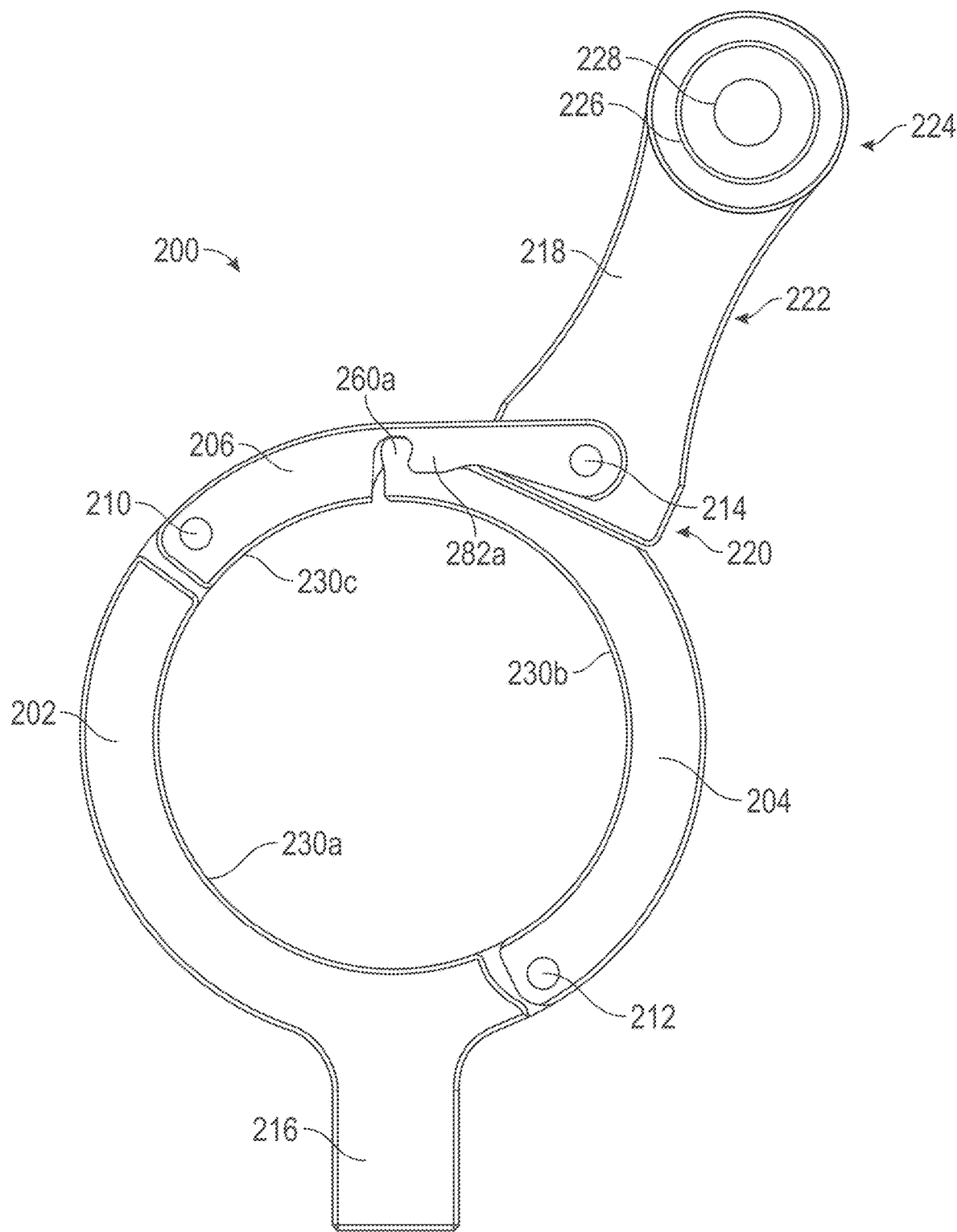
FIG. 27 shows a right side view of the clamp of FIG. 25.

FIG. 27 shows a right side view of the embodiment of clamp 200 of FIG. 25.

Figure 28:
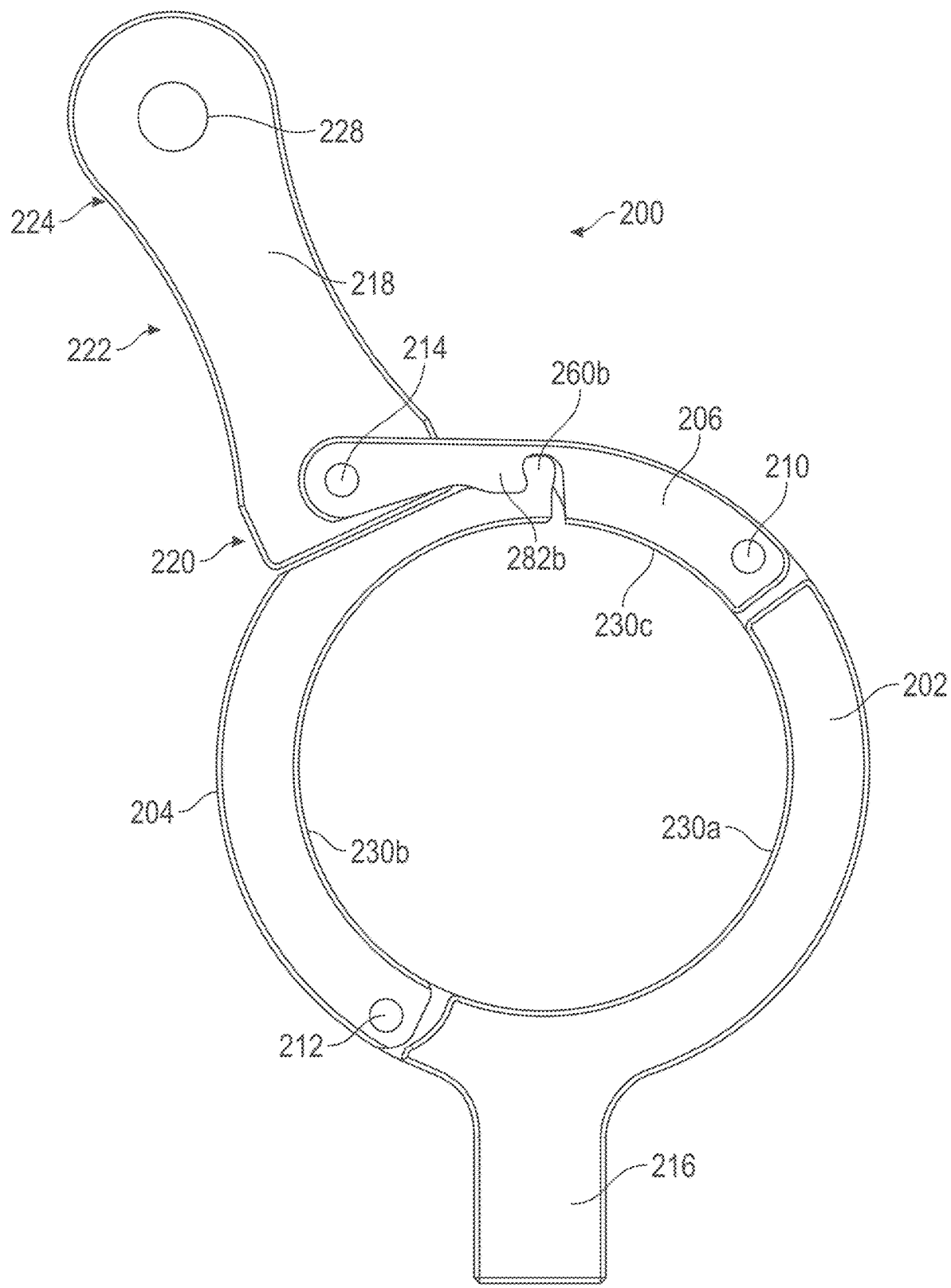
FIG. 28 shows a left side view of the clamp of FIG. 25.

FIG. 28 shows a left side view of the embodiment of clamp 200 of FIG. 25.

Figure 29:
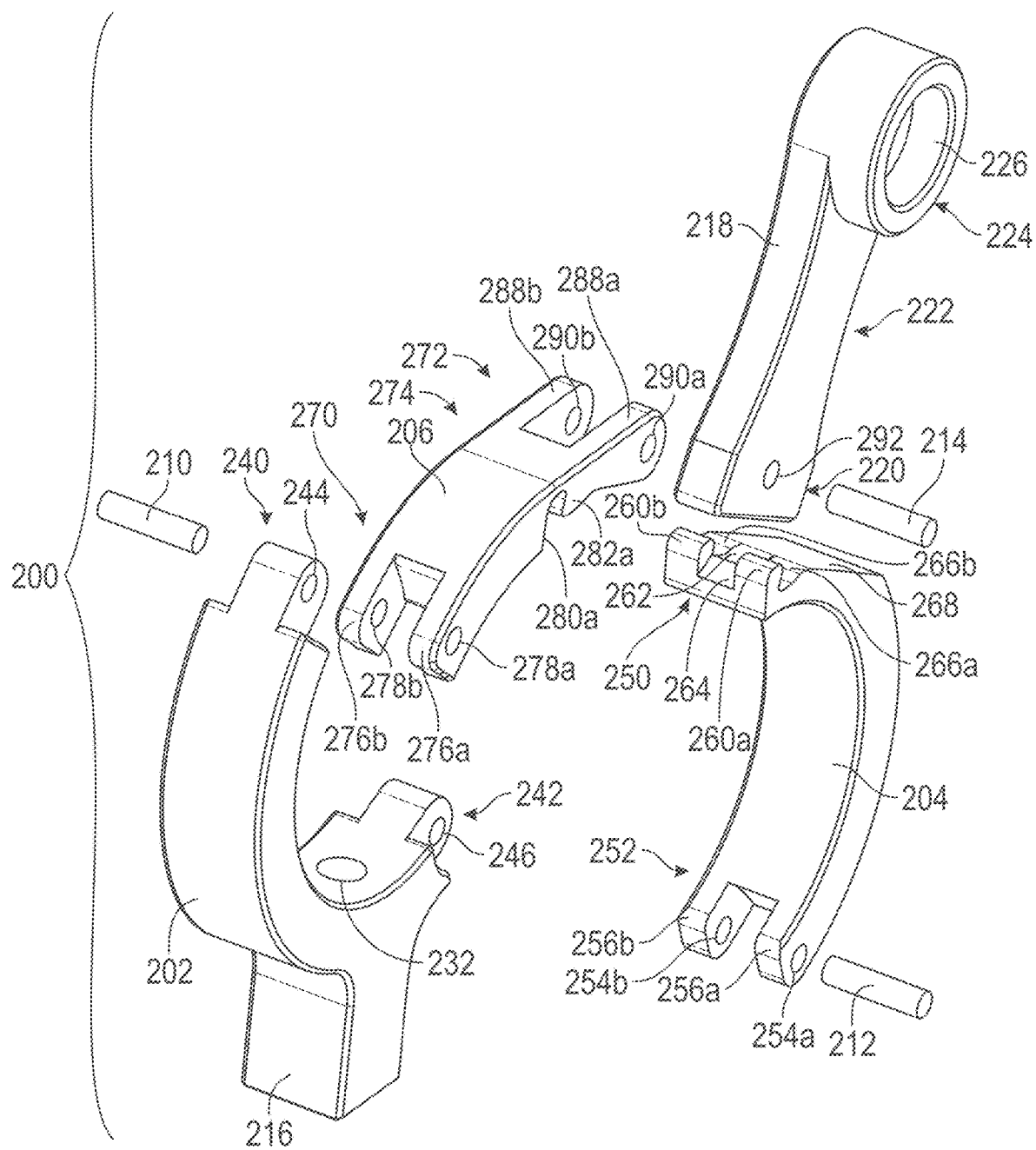
FIG. 29 shows an exploded rear perspective view of the clamp of FIG. 25.

FIG. 29 shows an exploded rear perspective view of the embodiment of clamp 200 of FIG. 25. Base member 202 includes a first end 240 and a second end 242. First end 240 of base member 202 includes an opening 244 situated on the first end 240 for receiving and pivoting about pin 210. Second end 242 of base member 202 includes an opening 246 situated on its second end 242 for receiving and pivoting about pin 212.

Catch member 204 includes a first end 250 and a second end 252. First end 250 of catch member 204 includes two rounded lugs (a lug 260a and a lug 260b), a ramp 262, a landing 264, a right side surface 266a, and a left side surface 266b, all of which are situated on the top surface of catch member 204. A releasing surface 268 is situated on the top surface of catch member 204 and assumes an angle or plane designed (see FIGS. 27 and 28) for providing a surface upon which base portion 220 of quick release mechanism 218 rests at an angel that aids the user in (i) placing clamp 200 in the locked position, (ii) maintaining the clamp 200 in the locked position and (iii) quickly being able to unlock clamp 200. Clamp 200 is designed to be capable of being repeatedly opened without damaging clamp 200. The structural integrity of other clamps is generally compromised with repeated use of the clamps. In one or more embodiments, clamp 200 is easy to repeatedly remove and install as often as required and its structural integrity is not compromised with repeated use.

Second end 252 of catch member 204 includes two wings—wing 256a and wing 256b. Wing 256a includes an opening 254a and wing 256b includes an opening 254b. Opening 254a and opening 254b are designed for receiving and pivoting about pin 212. Wing 256a and wing 256b operably connect to the second end 242 of base member 202 when the openings 254a and 254b of catch member 204 are aligned with the opening 246 of base member 202 and pin 212 is inserted through all three said openings. Pin 212, when situated through opening 254a, opening 254b and opening 246, allows catch member 204 and base member 202 to pivot about pin 212. Pin 212 assumes substantially a cylinder shape. In one or more embodiments, pin 212 assumes a shape other than substantially a cylinder shape. Openings 246, 254a and 254b assume substantially a circular shape. In one or more embodiments, openings 246, 254a and 254b assume a shape other than substantially a circular shape.

Latch member 206 includes a first end 270, a second end 272 and a middle section 274. Latch member 206 operably connects to base member 202, quick release mechanism 218 and catch member 204. First end 270 of latch member 206 includes two wings—a wing 276a and a wing 276b. Wing 276a includes an opening 278a and wing 276b includes an opening 278b for receiving and pivoting about pin 210. Wing 276a and wing 276b operably connect to the first end 240 of base member 202 when the openings 278a and 278b of latch member 206 are aligned with the opening 244 of base member 202 and pin 210 is inserted through all three said openings. Pin 210, when situated through opening 278a, opening 278b and opening 244, allows latch member 206 and base member 202 to pivot about pin 210. Pin 210 assumes substantially a cylinder shape. In one or more embodiments, pin 210 may assume a shape other than substantially a cylinder shape. Openings 244, 278a and 278b assume substantially a circular shape. In one or more embodiments, openings 244, 278a and 278b assume a shape other than substantially a circular shape. In one or more embodiments, pin 210 does not have an opening. In other embodiments, pin 210 has an opening.

Second end 272 of latch member 206 includes two wings—a wing 288a and a wing 288b. Wing 288a includes an opening 290a and wing 288b includes an opening 290b for receiving and pivoting about pin 214. The base portion 220 of quick release mechanism 218 includes an opening 292 for receiving and pivoting about pin 214. Wing 288a and wing 288b operably connect to the base portion 220 of quick release mechanism 218 when the openings 290a and 290b of latch member 206 are aligned with the opening 292 of quick release mechanism 218 and pin 214 is inserted through all three said openings. Pin 214, when situated through openings 292, 290a and 290b, allows latch member 206 and quick release mechanism 218 to pivot about pin 214. Pin 214 assumes substantially a cylinder shape. In one or more embodiments, pin 214 assumes a shape other than substantially a cylinder shape. Openings 292, 290a and 290b assume substantially a circular shape. In one or more embodiments, openings 292, 290a and 290b assume a shape other than substantially a circular shape.

Figure 30:
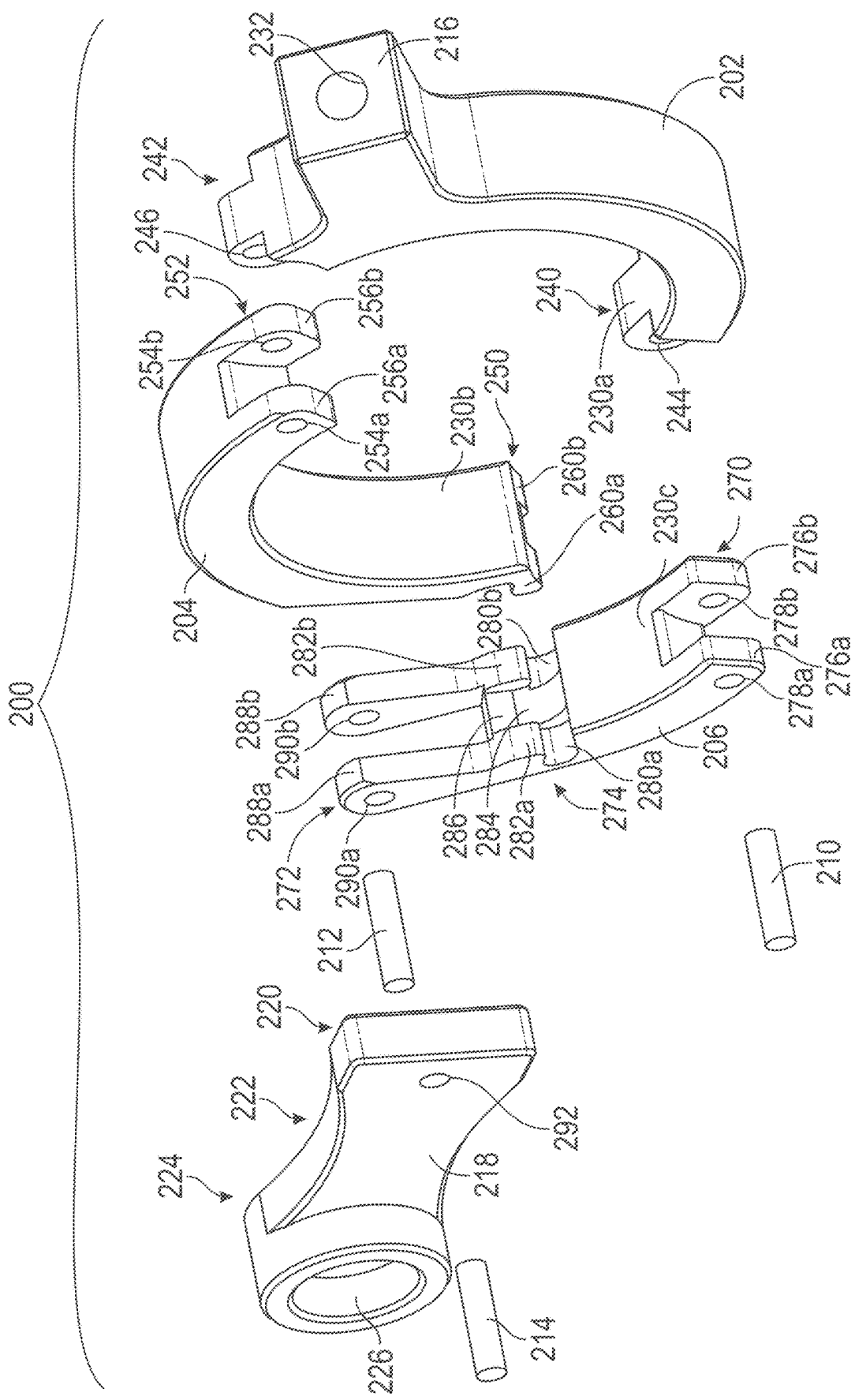
FIG. 30 shows an exploded bottom perspective view of the clamp of FIG. 25.

FIG. 30 shows an exploded bottom perspective view of the embodiment of clamp 200 of FIG. 25. Middle section 274 of latch member 26 includes a groove 280a, a groove 280b, a right protrusion 282a, a left protrusion 282b, a ramp 284, and a channel 286, all of which are situated on the bottom surface of the middle section 274 of latch member 206. Groove 280a and lug 260a correspond with each other, and groove 280b and lug 260b correspond with each other, such that as grooves 280a and 280b are positioned over lugs 260a and 260b and latch member 206 is pressed down on catch member 204, lugs 260a and 260b go into grooves 280a and 280b and, when properly positioned, secure clamp 200 around the targeted object. When lugs 260a and 260b are secured into grooves 280a and 280b, lugs 260a and 260b apply opposing force against grooves 280a and 280b. For example, in order to have clamp 200 snuggly grip a targeted object in the locked position, a user needs to snap or otherwise secure latch member 206 onto catch member 204. When in the locked position, forces pull latch member 206 and catch member 204 in opposite directions. The design and interaction of groove 280a with lug 260a and groove 280b with lug 260b at least reduces the likelihood of or prevents clamp 200 from unlocking unless a user lifts or otherwise disengages latch member 206 from catch member 204. In one or more embodiments, latch member 206 and catch member 204 lock by using negative angles that have an interference fit and once locked, outward pressure from the object being clamped by clamp 200 causes the negative angles of latch member 206 and catch member 204 to tighten.

Ramp 262 corresponds with channel 286 such that ramp 262 fits into channel 286 when clamp 200 is in the locked position. Ramp 262 is raised from the top surface of the first end 250 of catch member 204 such that it rests in between right protrusion 282a and left protrusion 282b and at least reduces the likelihood of or prevents latch member 206 from moving horizontally or laterally when clamp 200 is in the locked position. Landing 264 is situated in between lug 260a and lug 260b and corresponds with ramp 284 such that ramp 284 fits in between lug 260a and lug 260b and onto landing 264 when clamp 200 is in the locked position and at least reduces the likelihood of or prevents latch member 206 from moving horizontally or laterally when clamp 200 is in the locked position. Right side surface 266a corresponds with right protrusion 282a such that right protrusion 282a is at least near right side surface 266a when clamp 200 is in the locked position. Left side surface 266b corresponds with left protrusion 282b such that left protrusion 282b is at least near left side surface 266b when clamp 200 is in the locked position.

Figure 31:
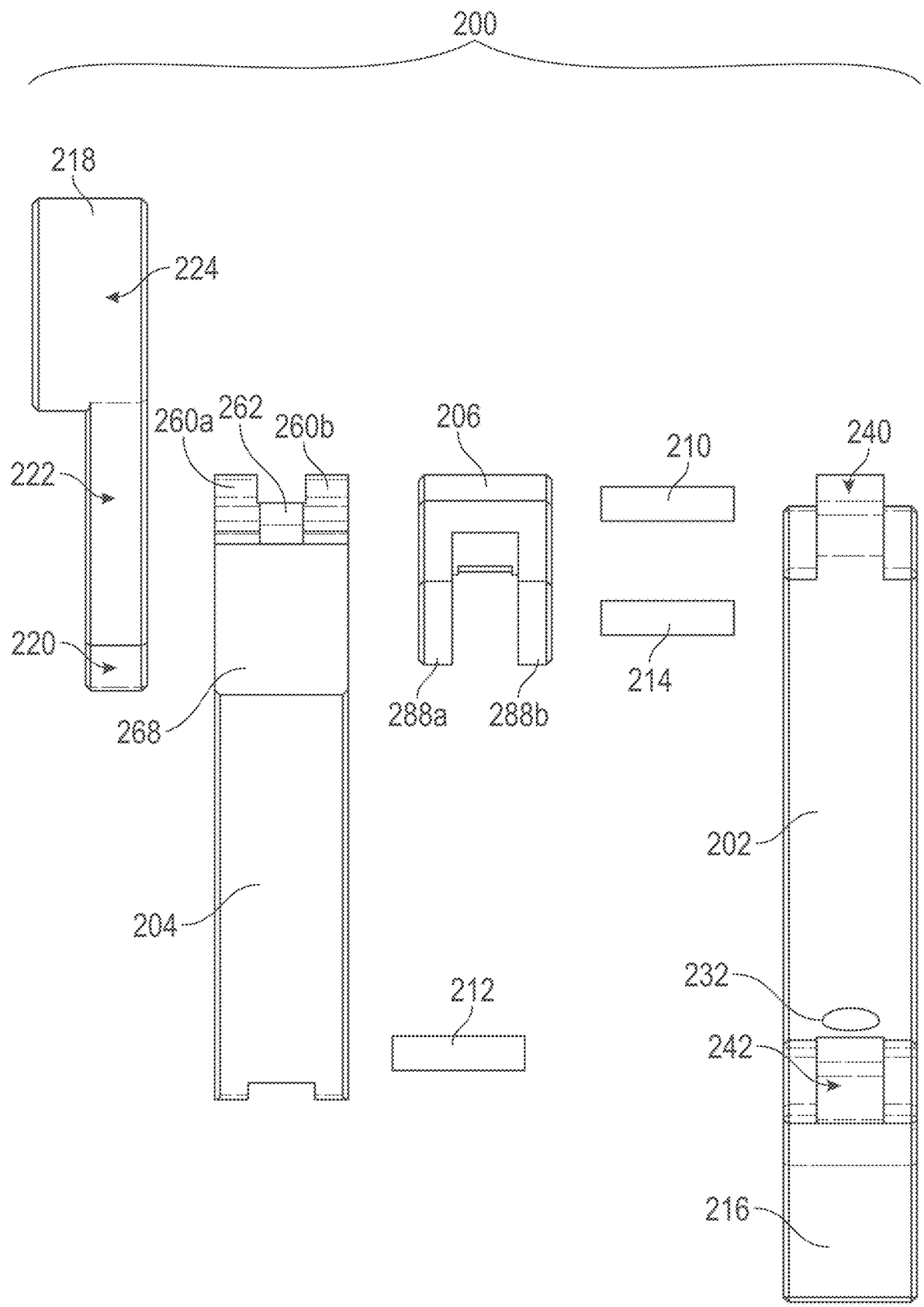
FIG. 31 shows an exploded front view of the clamp of FIG. 25.

FIG. 31 shows an exploded front view of the embodiment of clamp 200 of FIG. 25.

Figure 32:
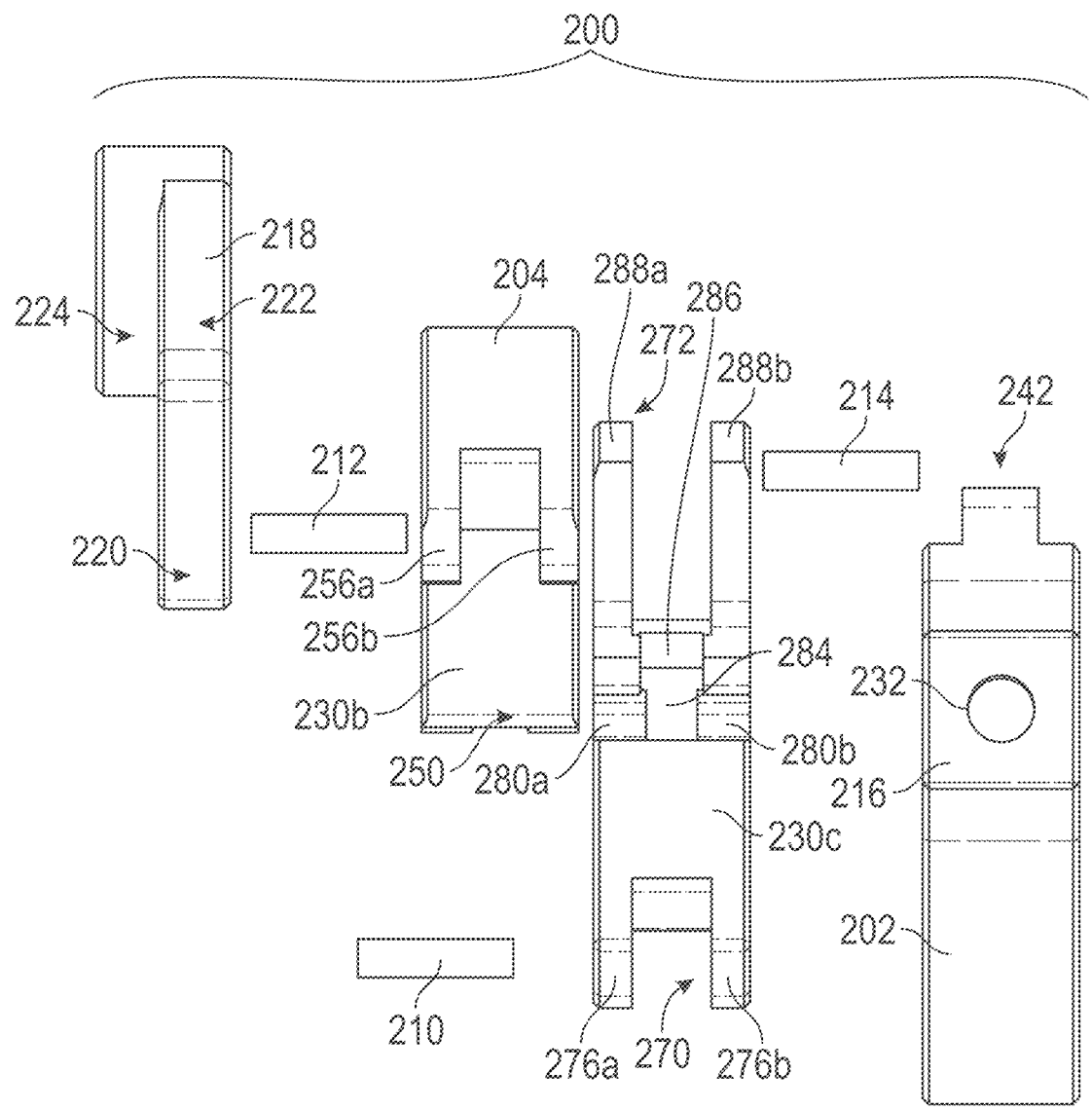
FIG. 32 shows an exploded bottom view of the clamp of FIG. 25.

FIG. 32 shows an exploded bottom view of the embodiment of clamp 200 of FIG. 25.

Figures 33, 34:
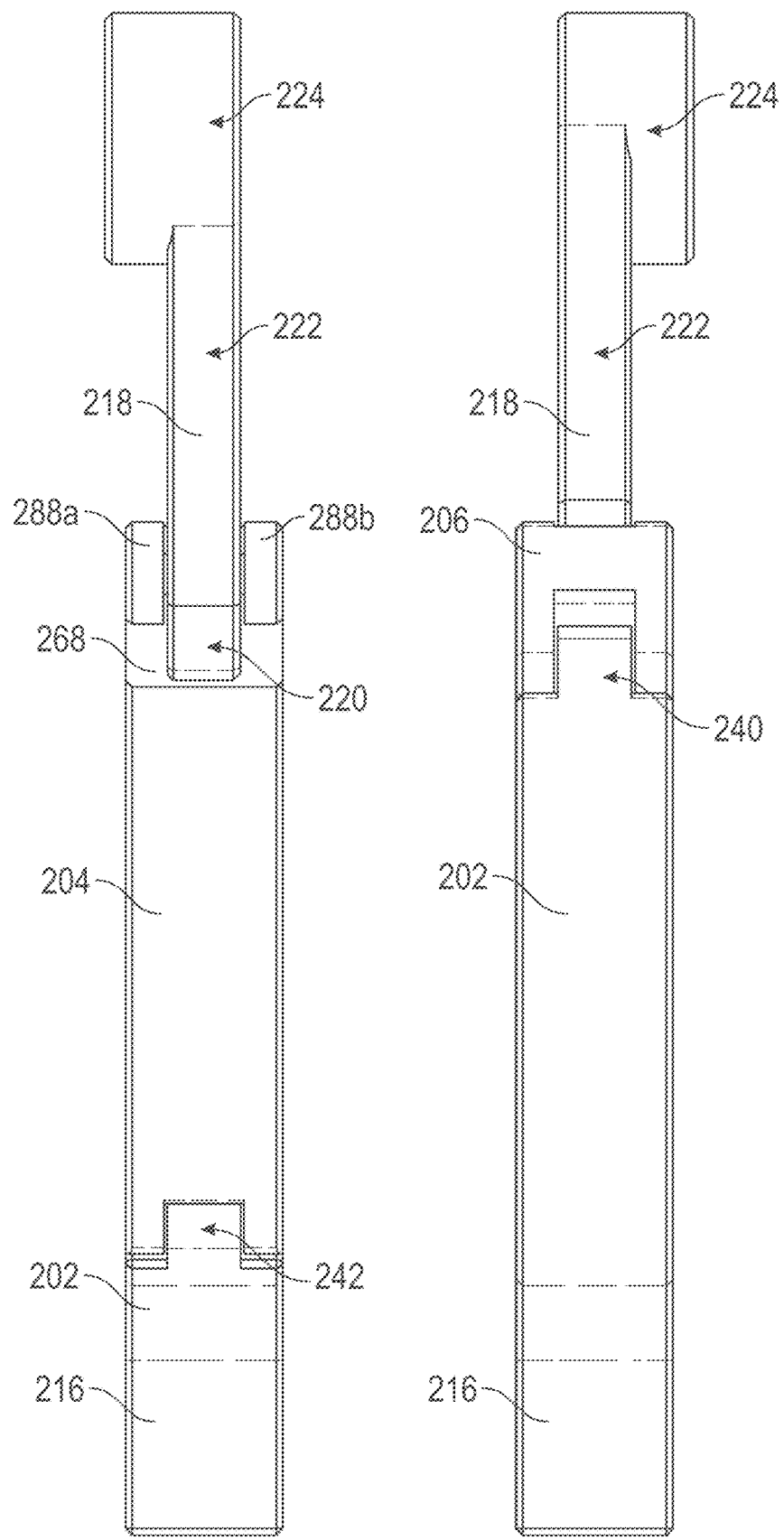
FIG. 33 shows a front view of the clamp of FIG. 25.
FIG. 34 shows a rear view of the clamp of FIG. 25.

FIG. 33 shows a front view of the embodiment of clamp 200 of FIG. 25.

FIG. 34 shows a rear view of the embodiment of clamp 200 of FIG. 25.

Figure 35:
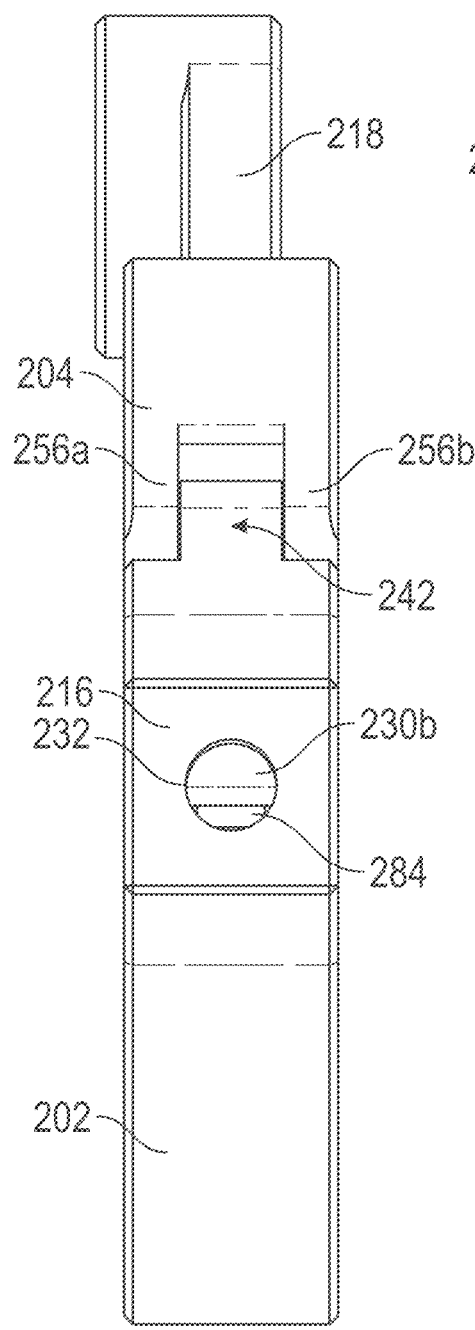
FIG. 35 shows a bottom view of the clamp of FIG. 25.

FIG. 35 shows a bottom view of the embodiment of clamp 200 of FIG. 25.

Figure 36:
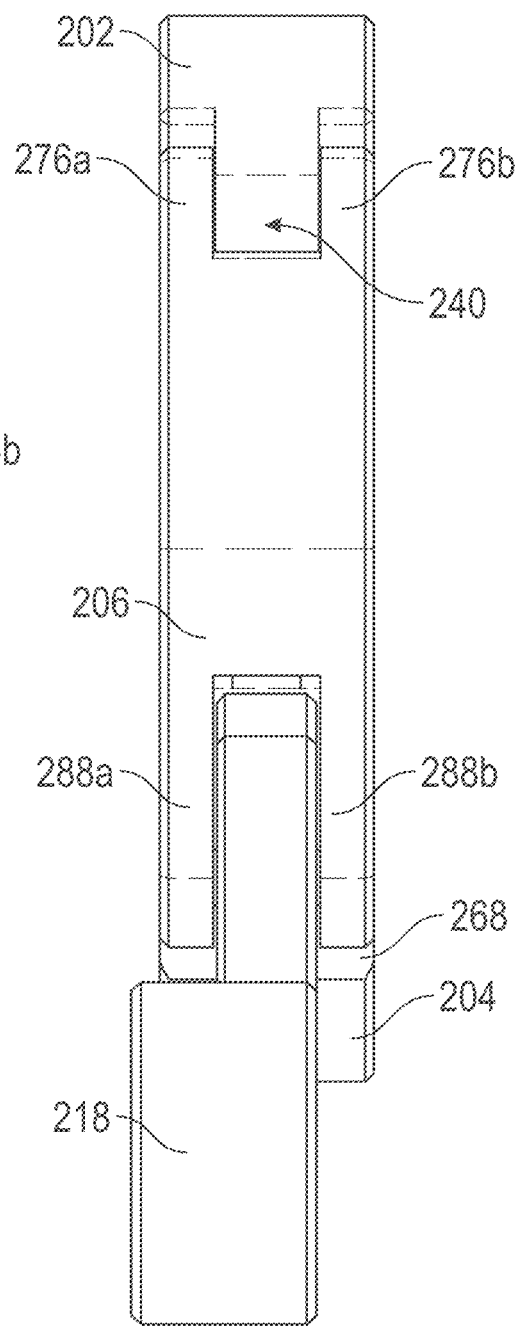
FIG. 36 shows a top view of the clamp of FIG. 25.

FIG. 36 shows a top view of the embodiment of clamp 200 of FIG. 25.

Figure 37:
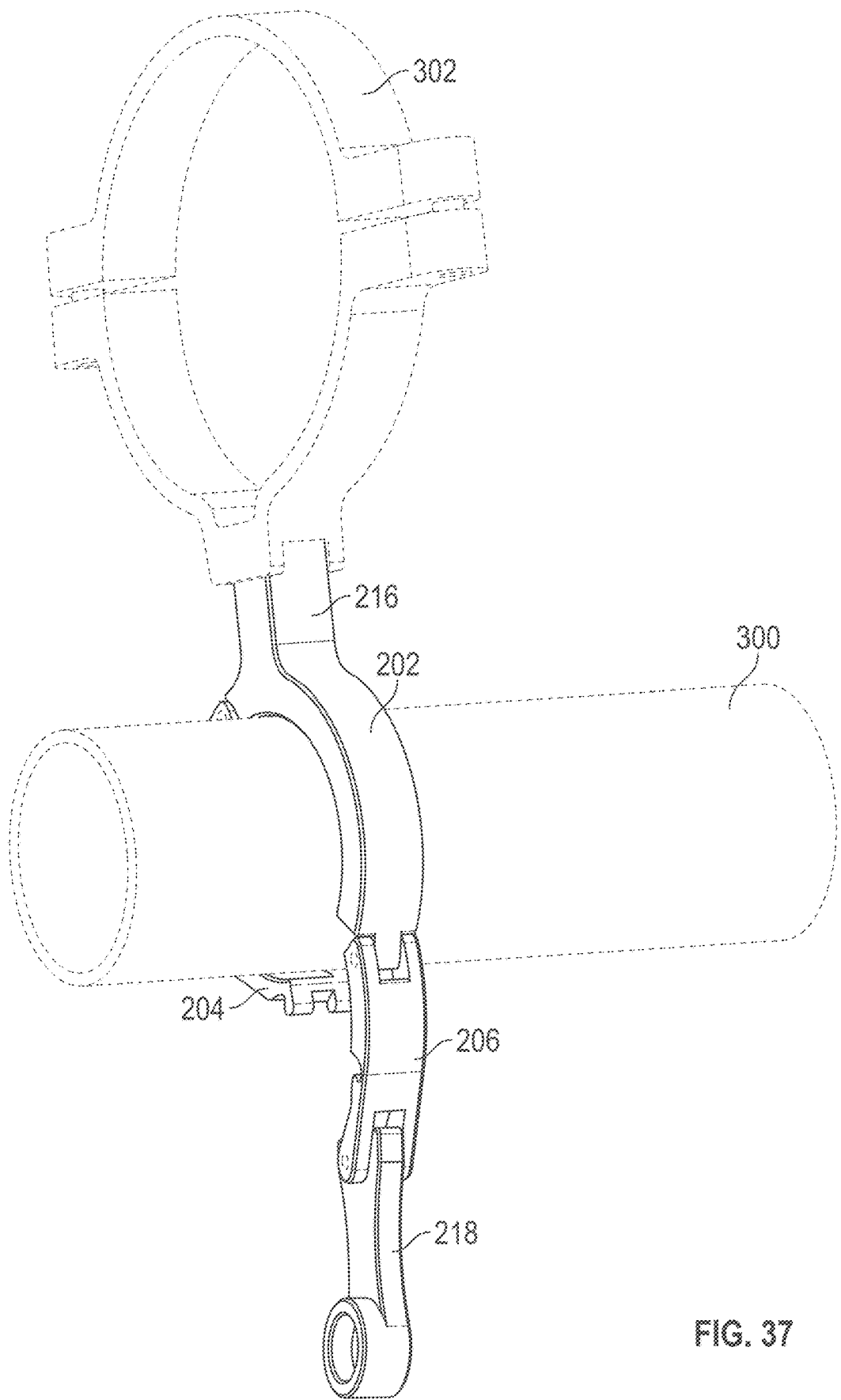
FIG. 37 shows a view of the clamp of FIG. 25 securing or gripping a pipe and a fire extinguisher retainer operably attached to the clamp.

FIG. 37 shows a view of the embodiment of clamp 200 of FIG. 25 securing or gripping a pipe 300, wherein a fire extinguisher retainer 302 has been operably attached to mount member 216.

Figure 38:
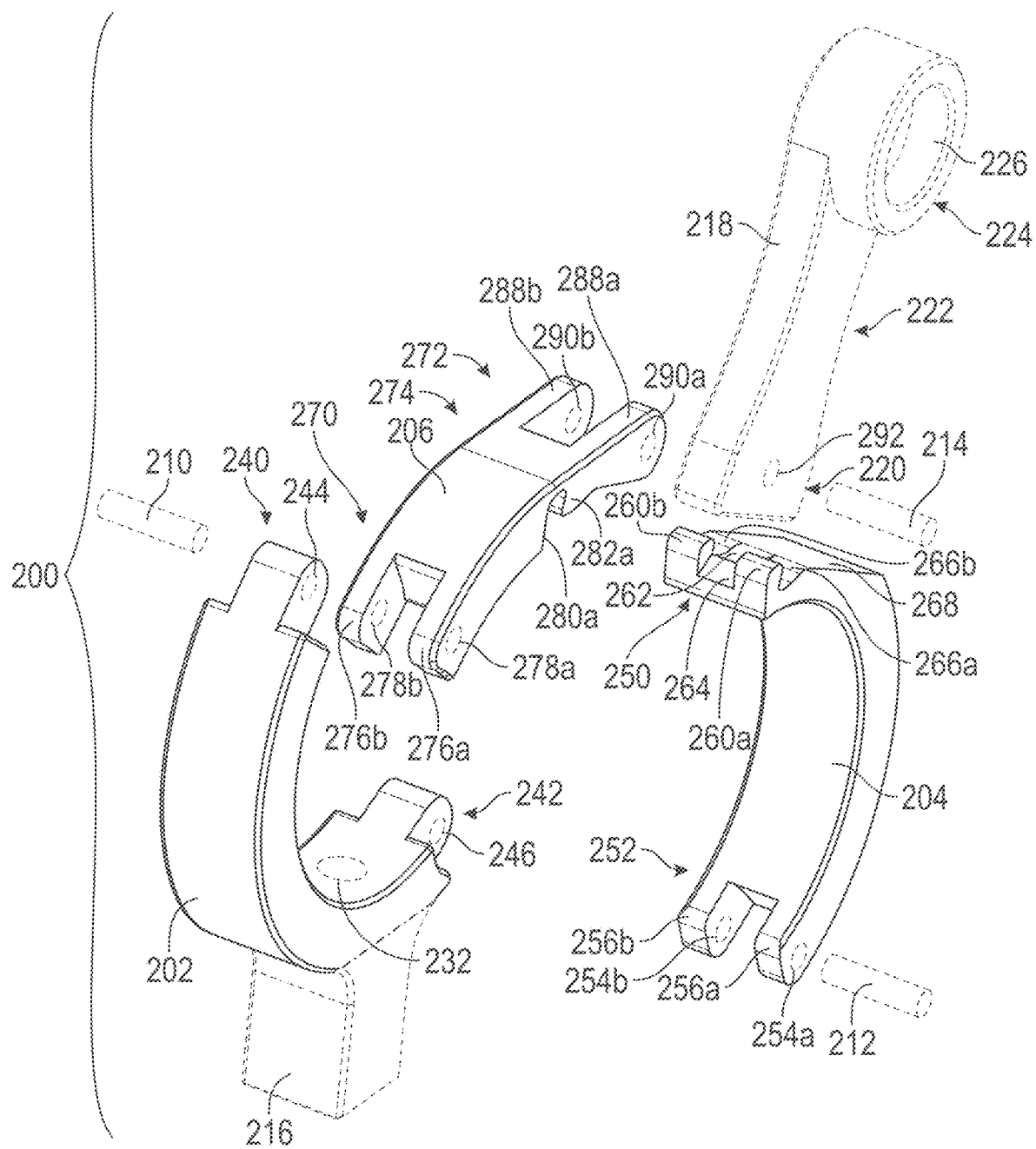
FIG. 38 shows an exploded rear perspective view of an alternative embodiment of a quick release clamp.

FIG. 38 shows an exploded rear perspective view of an alternative embodiment of quick release clamp 200. As shown in FIG. 38, the form, type, size, and shape of quick release mechanism 218, pin 210, pin 212, pin 214, mount member 216, and openings 244, 246, 254a, 254b, 278a, 278b, 290a, 290b, 292, 228 (not shown) and 232 may vary. Although not shown, in one or more embodiments, the form, type, size and shape of base member 202, catch member 204, and latch member 206 may vary.

Figure 39:
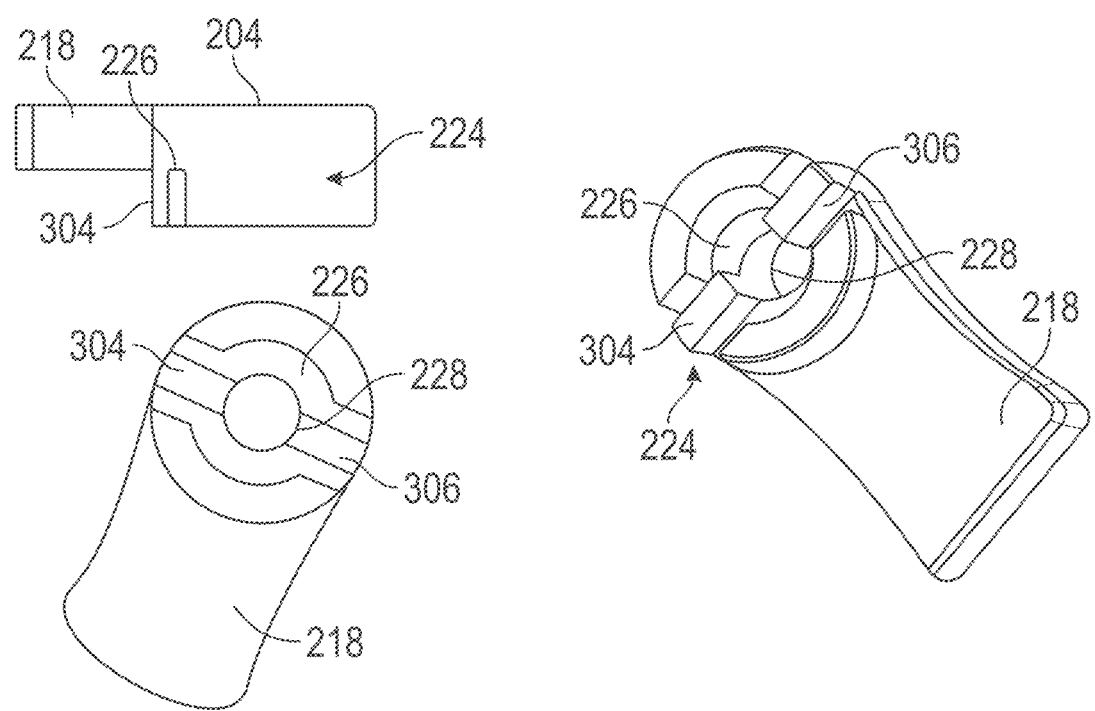
FIG. 39 shows various views of one embodiment of a quick release mechanism.

FIG. 39 shows an alternative embodiment of quick release mechanism 218 with a handle portion 224 that includes a left protrusion 304, a right protrusion 306, a recess 226 and an opening 228. Although not shown in FIG. 39, in one or more embodiments, the form, type, size and shape of quick release mechanism 218 may vary.

Figure 40:
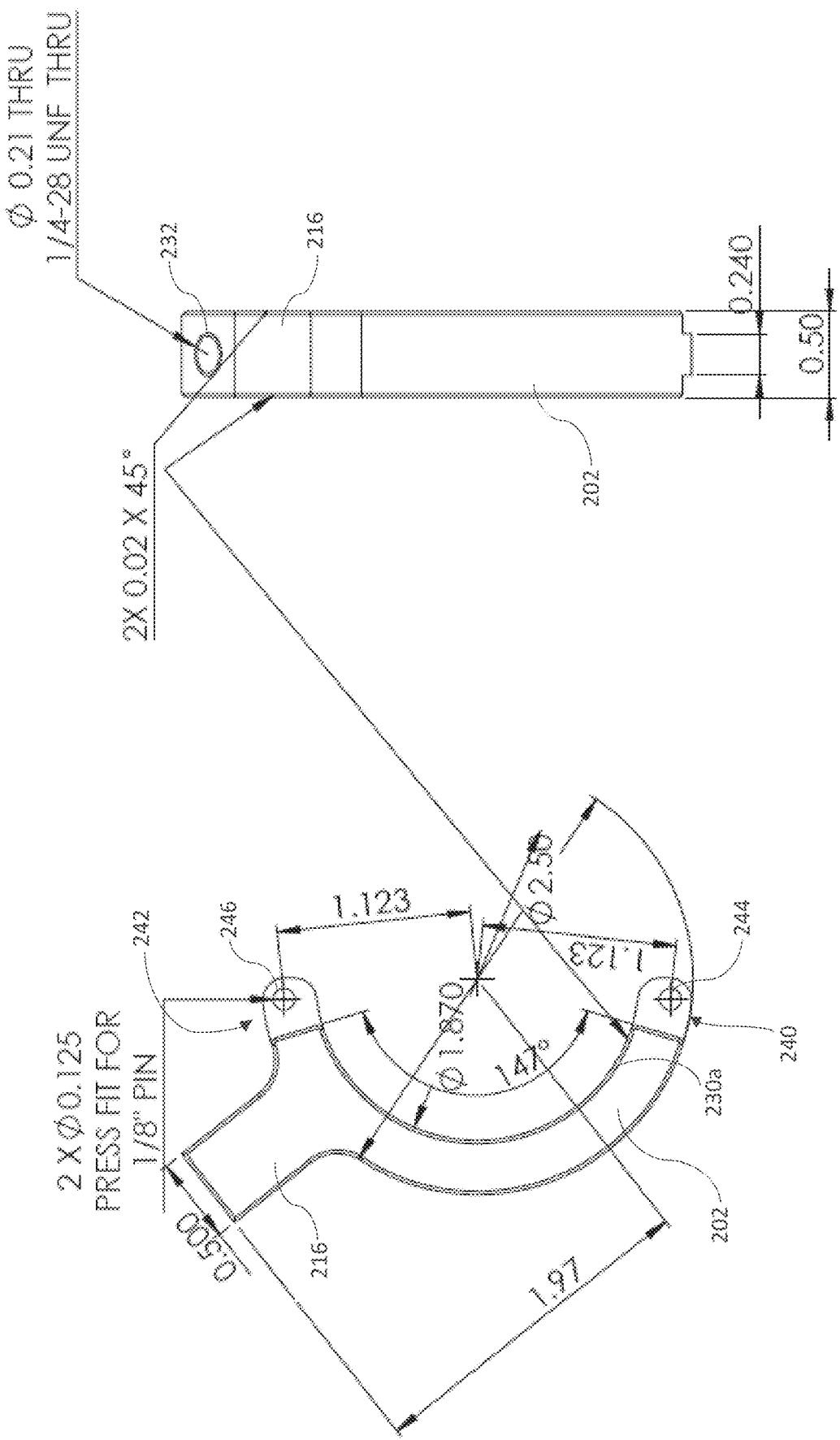
FIG. 40 shows various views of one embodiment of a base member.

FIG. 40 shows a side view and bottom view of one embodiment of base member 202 and other aspects of clamp 200, along with certain dimensions associated with the same. As shown in FIG. 40, in one embodiment, in the locked position the inside diameter of clamp 200 is about 1.870 inches and the outer diameter of clamp 200 is about 2.50 inches. As shown in FIG. 40, in one embodiment, the diameter of opening 246 of the second end 242 of base member 202 is about 0.125 inches and is configured to receive a pin 212 that is about ⅛ inches in diameter. In one embodiment, the diameter of opening 244 of the first end 240 of base member 202 is about 0.125 inches and is configured to receive a pin 210 that is about ⅛ inches in diameter. As shown in FIG. 40, in one embodiment, the width of base member 202 is about 0.50 inches, the width of first end 240 is about 0.240 inches, base member 202 has two chamfers that are about 0.02 inches and at about 45-degree angles. As shown in FIG. 40, in one embodiment, the diameter of the opening 232 corresponding to mount member 216 is about 0.21 inches and is configured to receive an about ¼-28 UNF screw.

Although FIG. 40 shows certain dimensions associated with this embodiment of base member 202 and other aspects of clamp 200, in other embodiments, base member 202 and other aspects of clamp 200 possess dimensions alternative to those shown in FIG. 40. For example, in one or more embodiments, the diameter of opening 246 of the second end 242 of base member 202 is determined by the diameter of the pin 212 used. In one or more embodiments, the diameter of opening 246 is between about 0.062 inches to about 1.0 inch. In one or more embodiments, opening 246 is configured to receive a pin 212 that is between about 0.062 inches to about 1.0 inch in diameter. In one or more embodiments, the diameter of opening 244 of the first end 240 of base member 202 is determined by the diameter of the pin 210 used. In one or more embodiments, the diameter of opening 244 is between about 0.062 inches to about 1.0 inch. In one or more embodiments, opening 244 is configured to receive a pin 210 that is between about 0.062 inches to about 1.0 inch in diameter. In one or more embodiments, the width of base member 202 is between about 0.25 inches to about 3.0 inches. In one or more embodiments, the width of second end 242 is between about 0.25 inches to about 3.0 inches. In one or more embodiments, base member 202 has two chamfers that are between about 0.001 inches to about 0.062 inches and at about 45-degree angles. In one or more embodiments, the diameter of opening 232 of mount member 216 is determined by the diameter of the object being attached to it. In one or more embodiments, the diameter of opening 232 of mount member 216 is between about 0.062 inches to about 1.0 inch and is configured to receive various types of screws or other objects. In one or more embodiments, pin 212 engages opening 246 via something other than press fit or interference fit, such as slip fit. In one or more embodiments, pin 212 is in the form of a bolt with a nut, a threaded bolt, or some other device that is sufficient to allow base member 202 to pivot about pin 212. In one or more embodiments, pin 210 engages opening 244 via something other than press fit or interference fit, such as slip fit. In one or more embodiments, pin 210 is in the form of a bolt with a nut, a threaded bolt, or some other device that is sufficient to allow base member 202 to pivot about pin 244.

FIG. 41 shows a side view, rear view, a sectional view and a detailed view of aspects of one embodiment of catch member 204 and other aspects of clamp 200, along with certain dimensions associated with the same. As shown in FIG. 41, in one embodiment, in the locked position the inside diameter of clamp 200 is about 1.870 inches and the outer diameter of clamp 200 is about 2.50 inches. As shown in FIG. 41, in one embodiment, the diameter of opening 254a and opening 254b (not shown) are about 0.127 inches. As shown in FIG. 41, in one embodiment, opening 254a and opening 254b (not shown) are configured through wings 256a and 256b, respectively, of the second end 252 of catch member 204 such that a pin 212 that is about 0.125 inches in diameter can be press fitted through opening 254a and opening 254b (not shown). As shown in FIG. 41, in one embodiment, the width of catch member 204 is about 0.50 inches and the width of the space between wings 256a and 256b is about 0.250 inches. As shown in FIG. 41, in one embodiment, lug 260a, lug 260b (not shown), ramp 262, landing 264 (not shown), right side surface 266a, and left side surface 266b (not shown) possess multiple surfaces with multiple radiuses and dimensions.

Although FIG. 41 shows certain dimensions associated with this embodiment of catch member 204 and other aspects of clamp 200, in other embodiments, catch member 204 and other aspects of clamp 200 possess dimensions alternative to those shown in FIG. 41. For example, in one or more embodiments, the diameter of opening 254a and opening 254b are determined by the diameter of the pin 212 used. In one or more embodiments, the diameter of opening 254a and opening 254b are between about 0.062 inches to about 1.0 inch. In one or more embodiments, the diameter of opening 254a and opening 254b are configured to engage a pin 212 that is about 0.062 inches to about 1.0 inch. In one or more embodiments, pin 212 engages opening 254a and opening 254b via something other than slip fit, such as a press fit or interference fit. In one or more embodiments, pin 212 is in the form of a bolt with a nut, a threaded bolt, a screw, or some other device that is sufficient to allow catch member 204 to pivot about pin 212. In one or more embodiments, the width of catch member 204 is between about 0.25 inches to about 3.0 inches and the width of the space between wings 256a and 256b is about 0.20 inches to about 2.8 inches. In one or more embodiments, the surfaces of lug 260a, lug 260b (not shown), ramp 262, landing 264 (not shown), right side surface 266a, and left side surface 266b (not shown) possess other radiuses and dimensions that correspond to aspects of latch member 206 and aid in allowing clamp 200 to be placed in and remain in a locked position.

Figure 42:
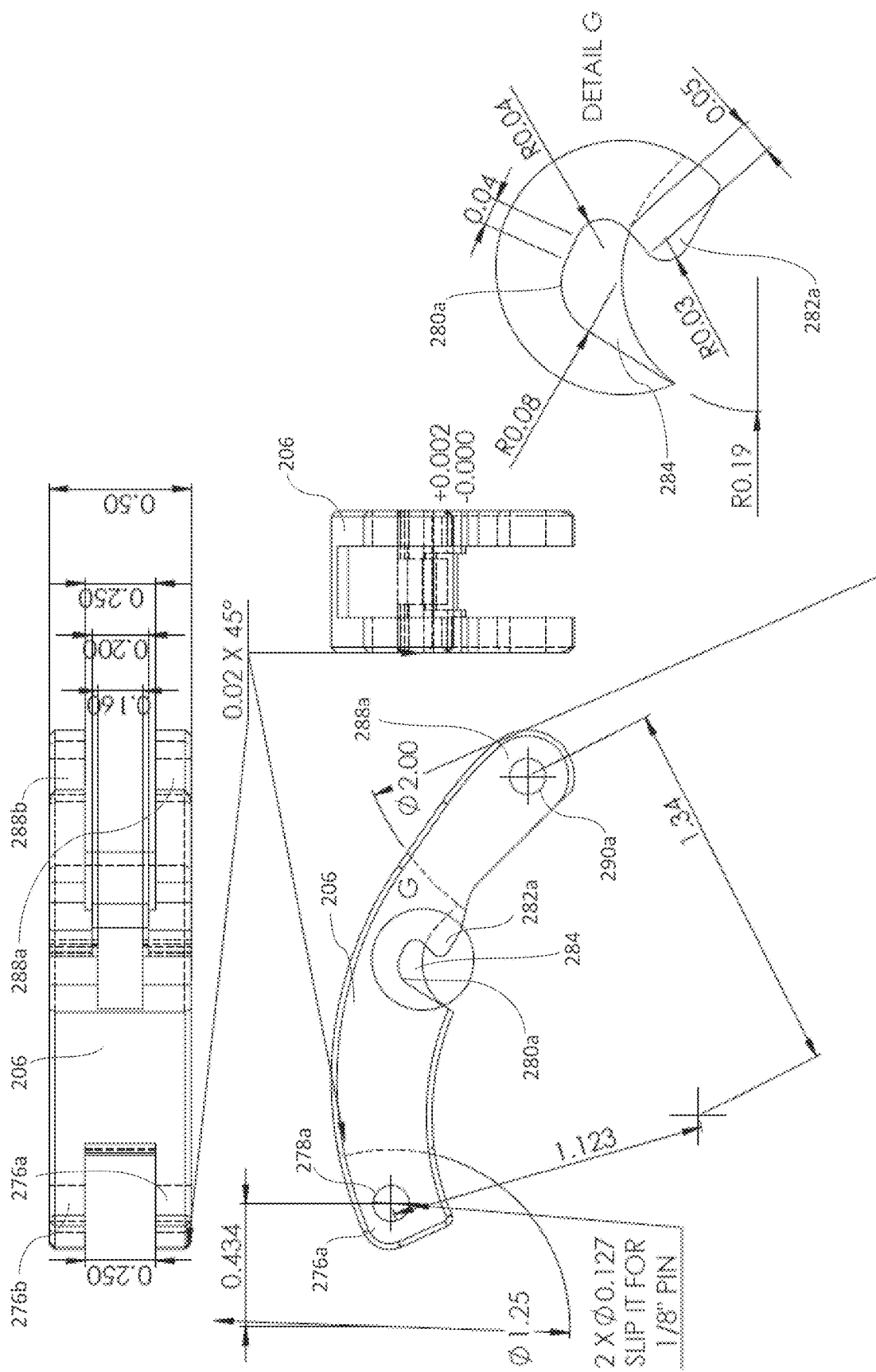
FIG. 42 shows various views of one embodiment of a latch member.

FIG. 42 shows a side view, top view, front view, and a detailed view of aspects of one embodiment of latch member 206 and other aspects of clamp 200, along with certain dimensions associated with the same. As shown in FIG. 42, in one embodiment, the diameter of opening 278a and opening 278b (not shown) of support member 276a and support members 276b, respectively, are about 0.127 inches for receiving a pin 210 that is about 0.125 inches in diameter. As shown in FIG. 42, in one embodiment, the diameter of opening 290a and opening 290b (not shown) of support member 288a and support members 288b, respectively, are about 0.127 inches for receiving a pin 214 that is about 0.125 inches in diameter. As shown in FIG. 42, in one embodiment, latch member 106 has at least one chamfer that is about 0.02 inches and at about 45-degree angles. As shown in FIG. 42, in one embodiment, latch member 206 possesses multiple surfaces with multiple radiuses and dimensions.

Although FIG. 42 shows certain dimensions associated with this embodiment of latch member 206 and other aspects of clamp 200, in other embodiments, latch member 206 and other aspects of clamp 200 possess dimensions alternative to those shown in FIG. 42. For example, in one or more embodiments, the diameter of opening 278a and opening 278b of support member 276a and support members 276b, respectively, are determined by the diameter of the pin 210 used. In one or more embodiments, the diameter of opening 278a and opening 278b are between about 0.167 inches to about 1.25 inches for receiving a pin 210 that is between about 0.167 inches to about 1.25 inches in diameter. In one or more embodiments, pin 210 engages opening 278a and opening 278b. In one or more embodiments, pin 210 is in the form of something other than a dowel that is sufficient to allow latch member 206 to pivot about pin 210. In one or more embodiments, the diameter of opening 290a and opening 290b of support member 288a and support members 288b, respectively, are determined by the diameter of the pin 214 used. In one or more embodiments, the diameter of opening 290a and opening 290b are between about 0.167 inches to about 1.25 inches for receiving a pin 214 that is between about 0.167 inches to about 1.25 inches in diameter. In one or more embodiments, pin 214 engages opening 290a and opening 290b. In one or more embodiments, pin 214 is in the form of something other than a dowel that is sufficient to allow latch member 206 and quick release mechanism 218 (not shown) to pivot about pin 214. In one or more embodiments, the surfaces of latch member 206 possess other radiuses and dimensions that correspond to aspects of catch member 204 and aid in allowing clamp 200 to be placed in and remain in a locked position.

Although FIGS. 40-42 show various aspects of clamp 200 possessing certain dimensions, in other embodiments, those aspects of clamp 200 possess dimensions alternative to those shown in FIGS. 40-42. For example, in one or more embodiments, in the locked position the inside diameter of clamp 200 is between about 0.375 inches to about 8 feet and the outer diameter of clamp 200 is between about 0.375 inches to any appropriate size (such as about 9 feet). In one or more embodiments, the width of clamp 200 is about 0.25 inches to about 3.0 inches. In one or more embodiments, clamp 200 has one or more chamfers that are about 0.001 inches to about 0.062 inches. In one or more embodiments, any chamfer associated with clamp 200 may be configured at any angle. In one or more embodiments, clamp 200 does not have any chamfers. Although FIGS. 32-40 show various maximum and minimum values and limits, in one or more embodiments, such values and limits are increased, decreased, or eliminated.

Although not shown in FIGS. 40 and 42, in one or more embodiments, clamp 200 includes a means for micro or fine adjusting it similar to that of clamp 100. For example, in one or more embodiments, instead of having an opening 244 where pin 210 is inserted, the first end 240 of base member 202 of clamp 200 is designed substantially similar to the first end 120 of base member 102 of clamp 100, such that it includes an opening through which a fine adjustment mechanism 108 is placed and can be manipulated to tighten or diminish clamp's 200 grip on the targeted object. In one or more embodiments, the first end 270 and middle section 274 of latch member 206 of clamp 200 are designed substantially similar to the first end 148 and middle section 152 of latch member 106 of clamp 100, such that latch member 206 includes two openings through which a pin is placed and pivoted about and a relief cut 158 wherein a fine adjustment mechanism 108 is seated. Such configuration allows latch member 206 to be adjustably and pivotably connected to base member 202. Thus, in one or more embodiment, clamp 200 not only includes quick release mechanism 218 but also fine adjustment mechanism 108 and their corresponding functionality. In one or more embodiments, the aspects of latch member 106 and base member 102 that are necessary to provide such functionality to clamp 200 are incorporated by reference into clamp 200.

Figure 43:
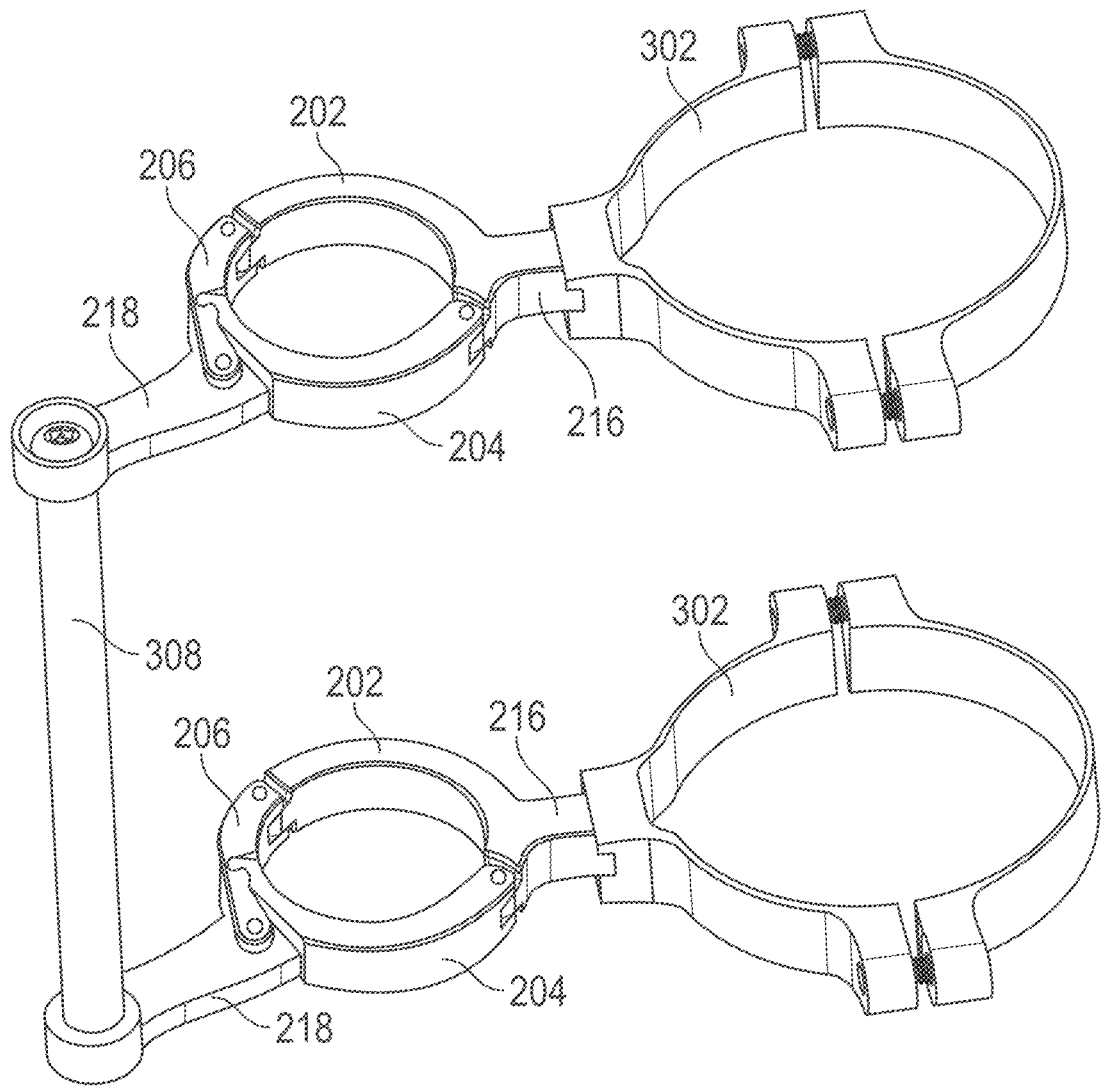
FIG. 43 shows two embodiments of the clamp of FIG. 25 operably connected to each other via a bar and a separate fire extinguisher retainer operably connected to each clamp.

FIG. 43 shows a view of two embodiments of clamp 200 operably connected to each other via a bar 308 and a screw operably connecting bar 308 to one clamp 200 and another screw operably connecting bar 308 to the other clamp 200, wherein a separate fire extinguisher retainer 302 is operably connected to each clamp 200.

Figure 44:
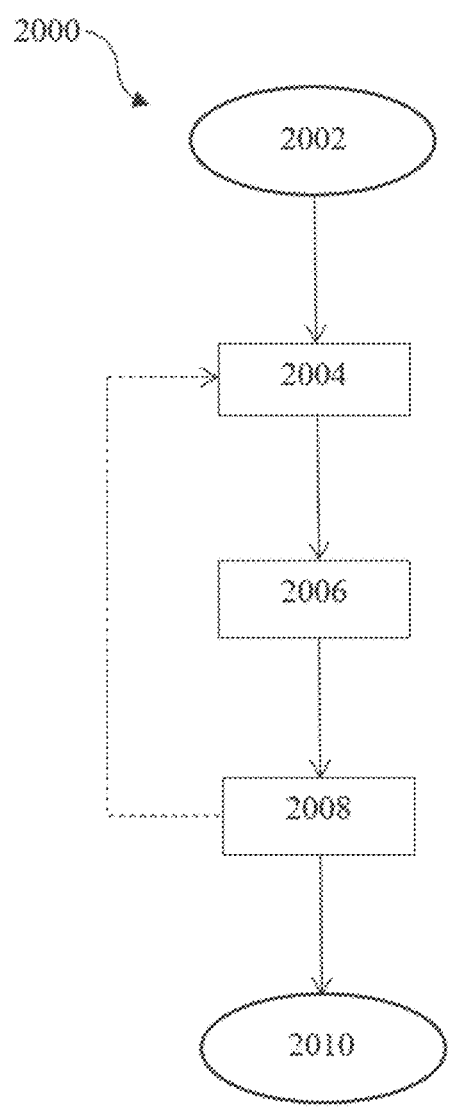
FIG. 44 shows a flow diagram that depicts a second alternative embodiment of a method for using a clamp.

FIG. 44 is a flow diagram that depicts one embodiment of a method 2000 for using clamp 200. The method 2000 for using clamp 200 as illustrated in flow diagram FIG. 44 may be customized, flexible and adapted to various circumstances and situations.

In step 2002, a user enters method 2000. In one or more embodiments, a user enters method 2000 at step 2002 possessing a clamp 200 and desiring to place it around a targeted object (such as a roll bar on a RZR®) in a locked position, as well as possessing a common vice grip, channel lock, needle nose pliers or other pliers or tool that will be used to squeeze clamp 200 into place during its installation or adjustment.

In step 2004, the user wraps clamp 200 around the targeted object and squeezes it around the targeted object with the vice grip or other tool such that inner surfaces 230a and 230b engage the targeted object.

In step 2006, the user, while continuing to squeeze clamp 200 around the targeted object with the vice grip or other tool, articulates quick release mechanism 218 towards catch member 204 and causes latch member 206 to snap onto or otherwise engage catch member 204 in the locked position such that inner surface 230c engages the targeted object, such that lugs 260a and 260b are respectively situated in grooves 280a and 280b in the locked position, and such that base portion 220 is resting on releasing surface 268.

In step 2008, the user removes clamp 200 by articulating quick release mechanism 218 away from catch member 204, thereby causing latch member 206 to disengage from catch member 204 and allowing the user to remove clamp 200 from around the targeted object. The user repeats steps 2004-2008 as desired and, when done, the process ends at step 2010. In one or more embodiments, step 2008 is optional. In one or more embodiments, step 2008 is not necessary.

In one or more embodiments, method 2000 includes none or some of the steps stated herein, or additional steps not specifically stated herein. In one or more embodiments, the steps of method 2000 are performed in an alternative sequence as compared to that which is stated herein.

Figure 45:
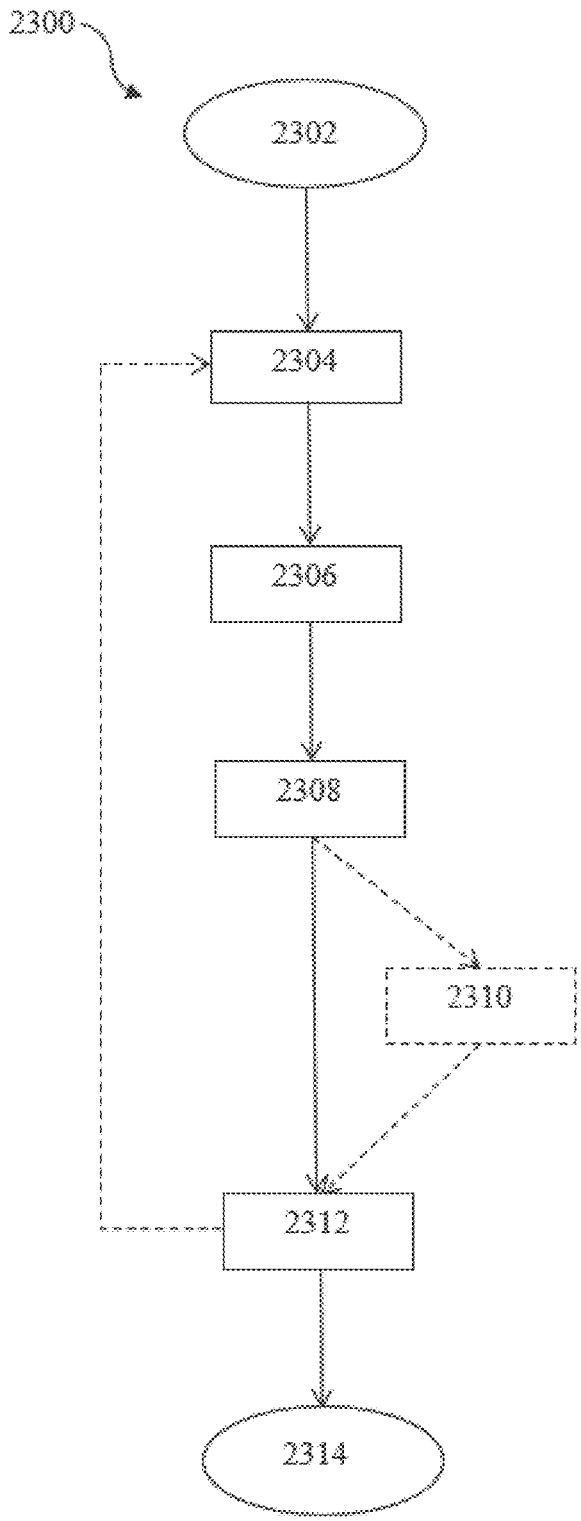
FIG. 45 shows a flow diagram that depicts a third alternative embodiment of a method for using a clamp.

FIG. 45 is a flow diagram that depicts one embodiment of a method 2300 for using clamp 200. The method 2300 for using clamp 200 as illustrated in flow diagram FIG. 45 may be customized, flexible and adapted to various circumstances and situations.

In step 2302, a user enters method 2300. In one or more embodiments, a user enters method 2300 at step 2302 possessing a clamp 200 and desiring to place it around a targeted object (such as a roll bar on a RZR®) in a locked position, as well as possessing a common vice grip, channel lock, needle nose pliers or other pliers or tool that will be used to squeeze clamp 200 into place during its installation or adjustment. In addition, the user also possesses at least one item or accessory he or she desires to mount to the targeted object via clamp 200 (such as a fire extinguisher, GoPro®, speaker, light bar, gas tank, tool and equipment, storage box, flag, license plate, etc.).

In step 2304, the user operably connects the item or accessory to clamp 200 by operably connecting it to mount member 216 or to some other device operably connectable to mount member 216. In one or more embodiments, the actions performed in step 2304 are performed after the actions taken in steps 2306 and 2308—that is, clamp 200 is fully secured to the targeted object before the item or accessory is operably connected to clamp 200.

In step 2306, the user wraps clamp 200 around the targeted object (with the item accessory already attached to mount member 216) and squeezes clamp 200 around the targeted object with the vice grip or other tool such that inner surfaces 230a and 230b engage the targeted object.

In step 2308, the user, while continuing to squeeze clamp 200 around the targeted object with the vice grip or other tool, articulates quick release mechanism 218 towards catch member 204 and causes latch member 206 to snap onto or otherwise engage catch member 204 in the lock position such that inner surface 230c engages the targeted object, such that lugs 260a and 260b are respectively situated in grooves 280a and 280b in the locked position, and such that base portion 220 is resting on releasing surface 268.

In step 2310, the user removes clamp 200 by articulating quick release mechanism 218 away from catch member 204, thereby causing latch member 206 to disengage from catch member 204 and allowing the user to remove clamp 200 from around the targeted object. In one or more embodiments, step 2310 is optional. In one or more embodiments, step 2310 is not necessary.

In step 2312, the user removes the item or accessory from clamp 200. The user repeats steps 2304-2312 as desired and, when done, the process ends at step 2314. In one or more embodiments, step 2312 is optional. In one or more embodiments, step 2312 is not necessary.

In one or more embodiments, method 2300 includes none or some of the steps stated herein, or additional steps not specifically stated herein. In one or more embodiments, the steps of method 2300 are performed in an alternative sequence as compared to that which is stated herein.

Different embodiments of the disclosure may implement the above scenario(s) or variations of the above scenario(s). In one or more embodiment, any of the structures, functions, or features of any aspect of the disclosure expressly or inherently described or illustrated herein may be combined with any of the structures, functions, or features of any other aspect of the disclosure expressly or inherently described or illustrated herein. In one or more embodiments, each component of the disclosures may be provided in any color.

In one or more embodiments, other modifications may be made to the embodiments illustrated in the drawings or otherwise disclosed herein or equivalents, which may include or have the capacity to utilize abilities, systems, devices, articles, means, functionality, features, methods or uses not expressly or impliedly described herein or illustrated in the drawings to this application, whether developed later or known at the time of filing.

It should be understood that the present systems, devices, means, methods and structures are not intended to be limited to the particular forms disclosed; rather, they are to cover all combinations, modifications, equivalents and alternatives. A system, device, article, means, method or structure that is configured in a certain way may be configured in at least that way, but may also be configured in ways that are not described or illustrated. The disclosure may be configured to function with a variety of systems, devices, means, methods, and structures. Different materials may be used for individual components. Different materials may be combined in a single component.

The present disclosure may be embodied in other specific forms without departing from its spirit or essential characteristics. It is appreciated that various features of the above described examples and embodiments may be mixed and matched to form a variety of other combinations and alternatives. It is also appreciated that devices, methods and systems disclosed herein should not be limited simply to adjustable clamping and quick release clamping devices, methods and systems. The described embodiments are to be considered in all respects as illustrative and not restrictive. Other embodiments or implementations are within the scope of the following claims and at least all changes which come within the meaning and range of equivalency of the claims are to be embraced within their scope. The scope of the disclosure may be indicated by the appended claims rather than by any of the foregoing description.

The following claims may add additional clarity to this disclosure. Future applications claiming priority to or the benefit of this application may or may not include the following claims, and may or may not include claims broader, narrower, or entirely different from the following claims.

What is claimed is:

1. A quick release clamp device, comprising:
    a catch member pivotably connected to a base member by a first pin;
    a latch member adjustably and pivotably connected to the base member by a fine adjustment mechanism and a second pin;
    a quick release mechanism pivotably connected to the latch member by a third pin;
    wherein the quick release clamp device is capable of clamping to a targeted object in a secure fashion and being quickly removable from the targeted object; and
    wherein the catch member comprises:
        a first end comprising: a first lug, a second lug, a ramp, a landing situated between the two lugs, a right side surface, and a left side surface, all of which are situated on a top surface of the catch member; wherein the right side surface is located on one side of the ramp and the left side surface is located on an alternate side of the ramp; and
        a second end comprising: a first wing and a second wing, with a cut between the two wings for receiving the base member; wherein the first wing comprises a first opening and the second wing comprises a second opening for receiving and pivoting about the first pin.

2. The quick release clamp device of claim 1, wherein the base member comprises a mount member that extends from a top surface of the base member; wherein the mount member is capable of allowing accessories to be operably connected to the quick release clamp device.

3. The quick release clamp device of claim 1, wherein the quick release clamp device is designed to pivot open so that it is easily placed around the targeted object without requiring the removal of the targeted object prior to installing the quick release clamp device.

4. The quick release clamp device of claim 1, wherein the quick release mechanism comprises a base portion, an arm portion, and a handle portion; wherein the base portion is contiguous with the arm portion and the arm portion is contiguous with the handle portion.

5. The quick release clamp device of claim 4, wherein the handle portion of the quick release mechanism comprises a recess and an opening for receiving and operably connecting objects to the quick release clamp device.

6. The quick release clamp device of claim 1,
    wherein the base member comprises an opening capable of receiving and pivoting about the first pin.

7. The quick release clamp device of claim 1, wherein the fine adjustment mechanism comprises a threaded surface, wherein an opening in the base member is capable of receiving the threaded surface of the fine adjustment mechanism.

8. The quick release clamp device of claim 7, wherein when the threaded surface of the fine adjustment mechanism is placed within the opening in the base member and twisted, the distance between the latch member and the base member is changed.

9. The quick release clamp device of claim 1,
    wherein the latch member comprises a middle section comprising: a first groove and a second groove, all of which are situated on a bottom surface of the middle section of the latch member.

10. The quick release clamp device of claim 9, wherein the first groove of the middle section of the latch member is capable of receiving the first lug of the first end of the catch member and the second groove of the middle section of the latch member is capable of receiving the second lug of the first end of the catch member.

11. A quick release clamp device, comprising:
    a catch member pivotably connected to a base member by a first pin;
    a latch member adjustably and pivotably connected to the base member by a fine adjustment mechanism and a second pin;
    a quick release mechanism pivotably connected to the latch member by a third pin;
    wherein the quick release clamp device is capable of clamping to a targeted object in a secure fashion and being quickly removable from the targeted object;
    wherein the latch member comprises a first end comprising: a first support member, a second support member, and a relief cut that runs between the first support member and the second support member;
    wherein the relief cut is situated on a top surface of the latch member and provides space for the fine adjustment mechanism to be seated;
    wherein the first support member comprises a first opening and the second support member comprises a second opening for receiving and pivoting about the second pin; and
    wherein the relief cut is designed to allow the fine adjustment mechanism to be inserted through an opening in the second pin when the second pin is seated in the first opening and the second opening of the first support member and the second support member, respectively, of the latch member.

12. The quick release clamp device of claim 11,
    wherein the latch member further comprises a second end comprising: a first wing and a second wing, which said wings operably connect with the quick release mechanism; and
    wherein the first wing comprises a first opening and the second wing comprises a second opening for receiving and pivoting about the third pin.

13. The quick release clamp device of claim 12, wherein the first wing and the second wing of the second end of the latch member operably connect to a base portion of the quick release mechanism when the first opening and the second opening of the first wing and the second wing, respectively, are aligned with an opening of the base portion of the quick release mechanism and the third pin is inserted through said opening of the base portion, said first opening of the first wing, and said second opening of the second wing.

14. The quick release clamp device of claim 11, wherein the latch member further comprises a middle section comprising: a first groove and a second groove, all of which are situated on a bottom surface of the middle section of the latch member.

15. The quick release clamp device of claim 14, wherein the catch member comprises a first end comprising: a first lug and a second lug situated on a top surface of the catch member.

16. The quick release clamp device of claim 15, wherein the first groove of the middle section of the latch member is capable of receiving the first lug of the first end of the catch member and the second groove of the middle section of the latch member is capable of receiving the second lug of the first end of the catch member.

17. A quick release clamp device, comprising:
a catch member pivotably connected to a base member by a first pin;
a latch member pivotably connected to the base member by a second pin;
a quick release mechanism pivotably connected to the latch member by a third pin;
a fine adjustment mechanism comprises a threaded surface;
wherein an opening in the base member is capable of receiving the threaded surface of the fine adjustment mechanism;
wherein the quick release clamp device is capable of clamping to a targeted object in a secure fashion and being quickly removable from the targeted object;
wherein the catch member comprises a first end comprising: a first lug and a second lug situated on a top surface of the catch member;
wherein the latch member comprises a middle section comprising: a first groove and a second groove, all of which are situated on a bottom surface of the middle section of the latch member; and
wherein the first groove of the middle section of the latch member is capable of receiving the first lug of the first end of the catch member and the second groove of the middle section of the latch member is capable of receiving the second lug of the first end of the catch member.

18. The quick release clamp device of claim 17, wherein the latch member is adjustably connected to the base member by the fine adjustment mechanism.

19. The quick release clamp device of claim 18, wherein the latch member further comprises a first end comprising: a first support member, a second support member, and a relief cut that runs between the first support member and the second support member; and
wherein the relief cut is situated on a top surface of the latch member and provides space for the fine adjustment mechanism to be seated.

20. The quick release clamp device of claim 19, wherein the first support member of the first end of the latch member comprises a first opening and the second support member of the first end of the latch member comprises a second opening capable of receiving and pivoting about the second pin.

* * * * *